US012720561B2

(12) United States Patent
Lei et al.

(10) Patent No.: US 12,720,561 B2

(45) **Date of Patent: *Aug. 25, 2026**

(54) MULTIPLE CONFIGURED GRANT SMALL DATA TRANSMISSION CONFIGURATIONS

(71) Applicant: QUALCOMM Incorporated, San Diego, CA (US)

(72) Inventors: Jing Lei, San Diego, CA (US); Ruiming Zheng, Beijing (CN); Linhai He, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 221 days.

This patent is subject to a terminal disclaimer.

(21) Appl. No.: 18/529,672

(22) Filed: Dec. 5, 2023

(65) Prior Publication Data

US 2024/0107551 A1 Mar. 28, 2024

Related U.S. Application Data

(63) Continuation of application No. 18/165,298, filed on Feb. 6, 2023, now Pat. No. 11,877,298, which is a (Continued)

(51) Int. Cl.

*H04W 72/23* (2023.01)
*H04L 1/1812* (2023.01)

(Continued)

(52) U.S. Cl.

CPC ........... *H04W 72/23* (2023.01); *H04L 1/1812* (2013.01); *H04W 8/24* (2013.01);

(Continued)

(58) Field of Classification Search

CPC ....... H04W 72/23; H04W 8/24; H04W 76/27; H04W 72/0453; H04W 72/1268;

(Continued)

(56) References Cited

U.S. PATENT DOCUMENTS

| | | | | |
|---|---|---|---|---|
| 11,877,298 | B2 * | 1/2024 | Lei | H04W 8/24 |
| 12,092,151 | B2 * | 9/2024 | Trzaskos | F16C 11/04 |

(Continued)

FOREIGN PATENT DOCUMENTS

| | | | |
|---|---|---|---|
| CN | 113068236 | A | 7/2021 |
| CN | 113784386 | A | 12/2021 |

(Continued)

OTHER PUBLICATIONS

Asia Pacific Telecom, et al., "Discussion on CG-SDT Configuration", R2-2101835, 3GPP TSG-RAN WG2 Meeting #113 electronic, Feb. 5, 2021, 4 Pages, Sections 1 to 3.

(Continued)

*Primary Examiner* — Omar J Ghowrwal
(74) *Attorney, Agent, or Firm* — Holland & Hart LLP

(57) ABSTRACT

Methods, systems, and devices for wireless communications are described. A user equipment (UE) may transmit a capability message indicating support for multiple configured grant small data transmission (CG-SDT) configurations and may receive one or more downlink messages that collectively indicate a downlink bandwidth part (BWP), an uplink BWP and a set of CG-SDT configurations based on transmitting the capability message. Each CG-SDT configuration may be associated with respective time and frequency resources for use in one or more CG-SDTs. The UE may transition out of a radio resource control (RRC) connected state based on receiving the one or more downlink messages. The UE may transmit an initial CG-SDT that includes a common control channel (CCCH) message using time and frequency resources associated with one or more of the set of CG-SDT configurations based on comparing the respective time and frequency resources associated with the each of the CG-SDT configurations.

30 Claims, 22 Drawing Sheets

Related U.S. Application Data continuation of application No. PCT/CN2022/075791, filed on Feb. 10, 2022.

(51) Int. Cl.

| | |
|---|---|
| ***H04W 8/24*** | (2009.01) |
| ***H04W 28/02*** | (2009.01) |
| ***H04W 52/36*** | (2009.01) |
| ***H04W 72/0457*** | (2023.01) |
| ***H04W 72/115*** | (2023.01) |
| ***H04W 72/1268*** | (2023.01) |
| ***H04W 76/27*** | (2018.01) |
| *H04W 72/0453* | (2023.01) |
| *H04W 72/51* | (2023.01) |

(52) U.S. Cl.

CPC ..... *H04W 28/0278* (2013.01); *H04W 52/365* (2013.01); *H04W 72/0457* (2023.01); *H04W 72/115* (2023.01); *H04W 72/1268* (2013.01); *H04W 76/27* (2018.02); *H04W 72/0453* (2013.01); *H04W 72/51* (2023.01)

(58) Field of Classification Search

CPC ............... H04W 72/51; H04W 72/115; H04W 28/0278; H04W 52/365; H04W 72/0457; H04L 1/1812

See application file for complete search history.

(56) References Cited

U.S. PATENT DOCUMENTS

2019/0021058 A1 1/2019 Cheng et al.
2021/0337625 A1 10/2021 Tsai et al.
2021/0410180 A1 12/2021 Tsai et al.
2021/0410181 A1* 12/2021 Jeon .................. H04W 52/0258
2022/0022266 A1 1/2022 Agiwal
2022/0039146 A1 2/2022 Lei et al.
2023/0083841 A1* 3/2023 Wei ................... H04W 56/0045 455/450
2023/0121314 A1 4/2023 Tsai et al.
2023/0247721 A1* 8/2023 Kim ...................... H04W 76/30 370/329
2023/0300847 A1 9/2023 Lei
2023/0413371 A1* 12/2023 Godin ................... H04W 12/04

FOREIGN PATENT DOCUMENTS

| | | | |
|---|---|---|---|
| JP | 2023528594 | A | 7/2023 |
| TW | 202143790 | A | 11/2021 |
| WO | WO-2021259370 | A1 | 12/2021 |
| WO | WO2023065303 | A1 | 4/2023 |

OTHER PUBLICATIONS

International Search Report and Written Opinion—PCT/CN2022/075791—ISA/EPO—Oct. 28, 2022.
Supplementary European Search Report EP22925318 Search Authority the Hague Oct. 7, 2025.
Nokia, Nokia Shanghai Bell, Introduction of SCT, 3CPP TSC RAN VC2 #116 bis-e R2-2202014, Jan. 31, 2022.
Xiaoni Communications, Renaining issues of CC-SLT in RAN2, 3CPP TSC RAN VC2 #115-e R2-2108792, Aug. 6, 2021.
Taiwan Search Report—TW112100826—TIPO—Jun. 17, 2026.

* cited by examiner

1100

1500

1700

Figure 21:
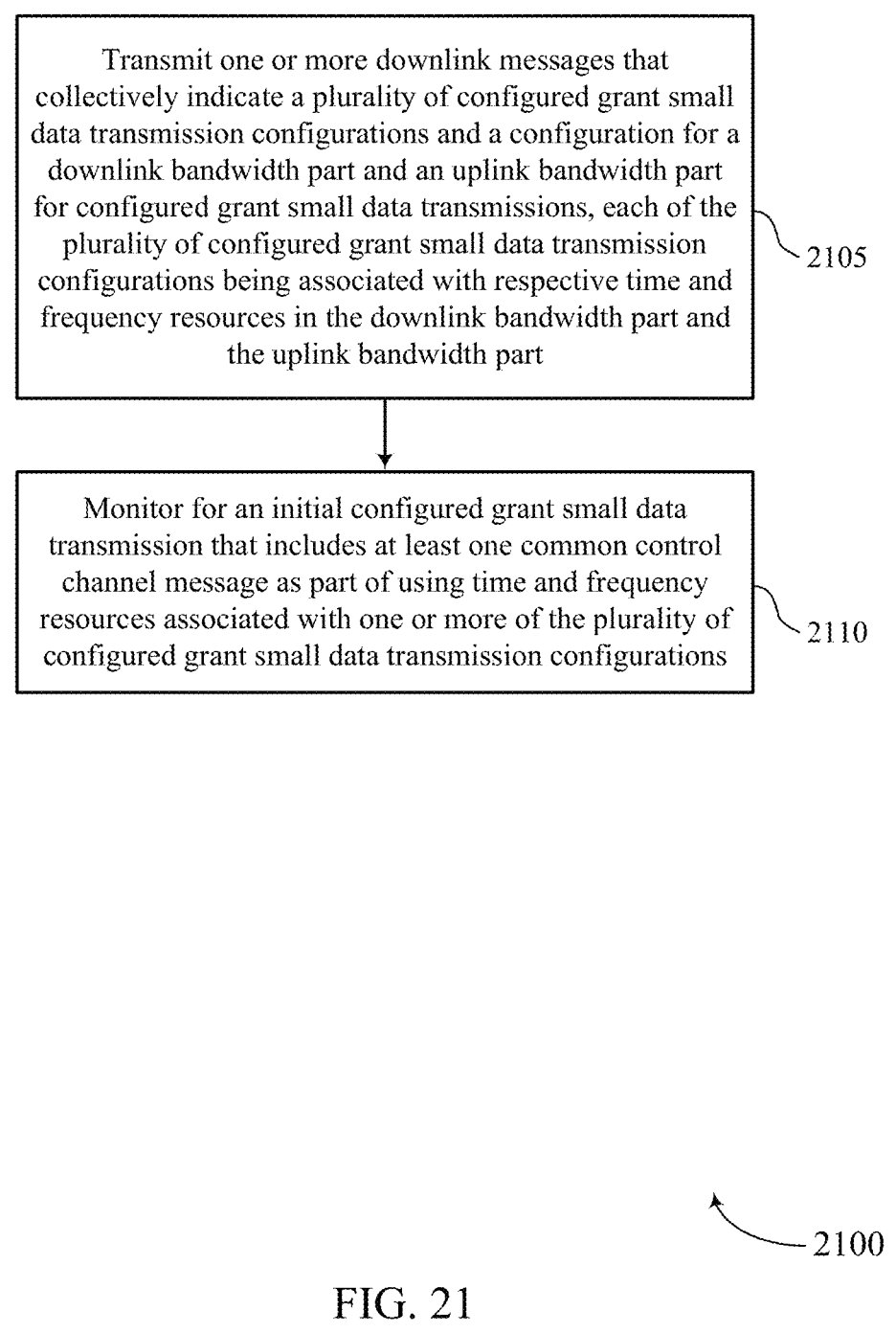

Transmit one or more downlink messages that collectively indicate a plurality of configured grant small data transmission configurations and a configuration for a downlink bandwidth part and an uplink bandwidth part for configured grant small data transmissions, each of the plurality of configured grant small data transmission configurations being associated with respective time and frequency resources in the downlink bandwidth part and the uplink bandwidth part

2105

Monitor for an initial configured grant small data transmission that includes at least one common control channel message as part of using time and frequency resources associated with one or more of the plurality of configured grant small data transmission configurations

Figure 22:
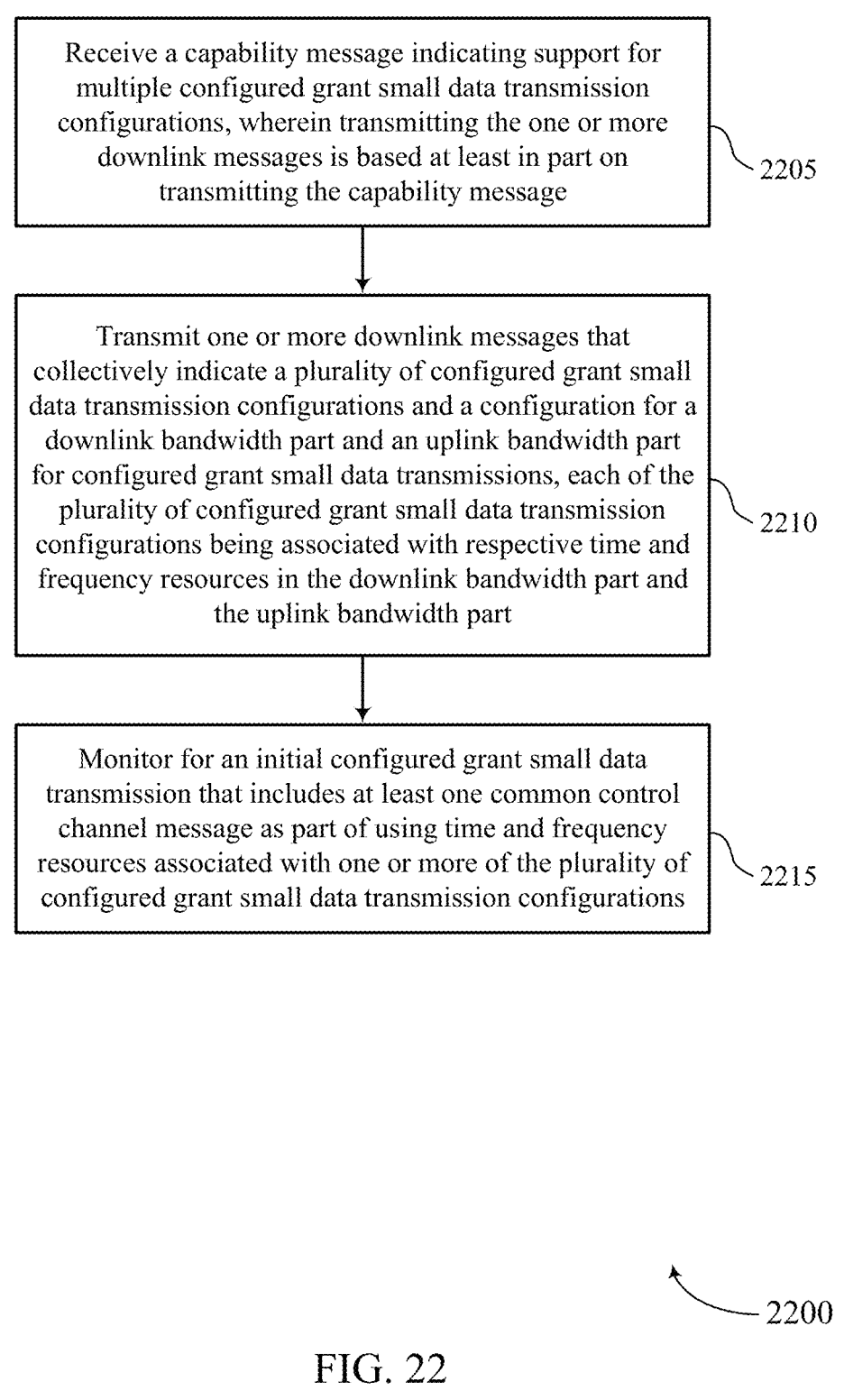

Receive a capability message indicating support for multiple configured grant small data transmission configurations, wherein transmitting the one or more downlink messages is based at least in part on transmitting the capability message

2205

Transmit one or more downlink messages that collectively indicate a plurality of configured grant small data transmission configurations and a configuration for a downlink bandwidth part and an uplink bandwidth part for configured grant small data transmissions, each of the plurality of configured grant small data transmission configurations being associated with respective time and frequency resources in the downlink bandwidth part and the uplink bandwidth part

2210

Monitor for an initial configured grant small data transmission that includes at least one common control channel message as part of using time and frequency resources associated with one or more of the plurality of configured grant small data transmission configurations

MULTIPLE CONFIGURED GRANT SMALL DATA TRANSMISSION CONFIGURATIONS

CROSS REFERENCE

The present application for patent is a Continuation of U.S. patent application Ser. No. 18/165,298 by LEI et al., entitled "MULTIPLE CONFIGURED GRANT SMALL DATA TRANSMISSION CONFIGURATIONS" filed Feb. 6, 2023, which is a Continuation of International Patent Application No. PCT/CN2022/075791 by LEI et al., entitled "MULTIPLE CONFIGURED GRANT SMALL DATA TRANSMISSION CONFIGURATIONS" filed Feb. 10, 2022, each of which are assigned to the assignee hereof, and expressly incorporated by reference in its entirety herein.

FIELD OF TECHNOLOGY

The following relates to wireless communications, including multiple configured grant small data transmission (CG-SDT) configurations.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more network devices or one or more network access nodes, each simultaneously supporting communication for multiple communication devices, which may be otherwise known as user equipment (UE).

SUMMARY

The described techniques relate to improved methods, systems, devices, and apparatuses that support multiple configured grant small data transmission (CG-SDT) configurations. Generally, the described techniques provide for a user equipment (UE) to transmit to a network entity a capability message indicating support for multiple CG-SDT configurations. As such, the UE may receive one or more downlink messages configuring multiple CG-SDT configurations. For example, the network device may transmit a radio resource control (RRC) release message that includes an indication for the UE to transition to the RRC inactive state and that includes multiple CG-SDT configurations multiplexed together. Additionally or alternatively, the network device may transmit a separate downlink message for each CG-SDT configuration, where a final downlink message may include the RRC release message.

In some cases, the UE may determine which of the CG-SDT configurations to use for a CG-SDT based on their respective frequency and time resources. For instance, if respective time and frequency resources for two CG-SDT configurations overlap in time, the UE may determine to transmit a CCCH message using one or both sets of time and frequency resources. Additionally or alternatively, if the respective frequency and time resources for the two CG-SDT configurations do not overlap in time, the UE may transmit respective CG-SDTs in accordance with the two CG-SDT configurations. In some examples, the network device may also transmit respective RRC-configured windows for each CG-SDT configuration, during which the UE may detect acknowledgment (ACK) or non-ACK (NACK) feedback from the network device. In some cases, the UE may not receive a feedback message from the UE during an RRC-configured window. As such, the UE may retransmit the one or more CG-SDTs autonomously using a next available and valid set of CG-SDT resources.

A method is described. The method may include receiving one or more downlink messages that collectively indicate a set of multiple CG-SDT configurations and a configuration for a downlink bandwidth part (BWP) and an uplink BWP for CG-SDTs, each of the set of multiple CG-SDT configurations being associated with respective time and frequency resources in the downlink BWP and the uplink BWP, transitioning out of a RRC connected state based on receiving at least one of the one or more downlink messages, transmitting an initial CG-SDT that includes at least one common control channel message using time and frequency resources associated with one or more of the set of multiple CG-SDT configurations in the uplink BWP, the one or more of the set of multiple CG-SDT configurations determined based on a comparison of the respective time and frequency resources associated with the set of multiple CG-SDT configurations, and monitoring for a response to the initial CG-SDT in the downlink BWP.

An apparatus is described. The apparatus may include at least on processor, memory coupled (e.g., operatively, communicatively, functionally, electronically, or electrically) with the at least on processor, and instructions stored in the memory. The instructions may be for the at least on processor to cause the apparatus to receive one or more downlink messages that collectively indicate a set of multiple CG-SDT configurations and a configuration for a downlink BWP and an uplink BWP for CG-SDTs, each of the set of multiple CG-SDT configurations being associated with respective time and frequency resources in the downlink BWP and the uplink BWP, transition out of a RRC connected state based on receiving at least one of the one or more downlink messages, transmit an initial CG-SDT that includes at least one common control channel message using time and frequency resources associated with one or more of the set of multiple CG-SDT configurations in the uplink BWP, the one or more of the set of multiple CG-SDT configurations determined based on a comparison of the respective time and frequency resources associated with the set of multiple CG-SDT configurations, and monitor for a response to the initial CG-SDT in the downlink BWP.

Another apparatus is described. The apparatus may include means for receiving one or more downlink messages that collectively indicate a set of multiple CG-SDT configurations and a configuration for a downlink BWP and an uplink BWP for CG-SDTs, each of the set of multiple CG-SDT configurations being associated with respective time and frequency resources in the downlink BWP and the uplink BWP, means for transitioning out of a RRC connected state based on receiving at least one of the one or more downlink messages, means for transmitting an initial CG-SDT that includes at least one common control channel message using time and frequency resources associated with one or more of the set of multiple CG-SDT configurations in the uplink BWP, the one or more of the set of multiple CG-SDT configurations determined based on a comparison of the respective time and frequency resources associated with the set of multiple CG-SDT configurations, and means for monitoring for a response to the initial CG-SDT in the downlink BWP.

A non-transitory computer-readable medium storing code is described. The code may include instructions for at least on processor to receive one or more downlink messages that collectively indicate a set of multiple CG-SDT configurations and a configuration for a downlink BWP and an uplink BWP for CG-SDTs, each of the set of multiple CG-SDT configurations being associated with respective time and frequency resources in the downlink BWP and the uplink BWP, transition out of a RRC connected state based on receiving at least one of the one or more downlink messages, transmit an initial CG-SDT that includes at least one common control channel message using time and frequency resources associated with one or more of the set of multiple CG-SDT configurations in the uplink BWP, the one or more of the set of multiple CG-SDT configurations determined based on a comparison of the respective time and frequency resources associated with the set of multiple CG-SDT configurations, and monitor for a response to the initial CG-SDT in the downlink BWP.

Some examples of the method, apparatuses, and non-transitory computer-readable medium described herein may further include operations, features, means, or instructions for transmitting a UE capability message indicating support for multiple CG-SDT configurations before transitioning out of the RRC connected state, where receiving the one or more downlink messages may be based on transmitting the UE capability message.

In some examples of the method, apparatuses, and non-transitory computer-readable medium described herein, receiving the one or more downlink messages may include operations, features, means, or instructions for receiving a RRC message including the set of multiple CG-SDT configurations and a RRC release message.

In some examples of the method, apparatuses, and non-transitory computer-readable medium described herein, receiving the one or more downlink messages may include operations, features, means, or instructions for receiving multiple RRC messages, where each RRC message of the multiple RRC messages includes a respective CG-SDT configuration of the set of multiple CG-SDT configurations, and where a last of the multiple RRC messages includes a RRC release message.

In some examples of the method, apparatuses, and non-transitory computer-readable medium described herein, receiving the one or more downlink messages may include operations, features, means, or instructions for receiving a first RRC message including a CG-SDT configuration from the set of multiple CG-SDT configurations and also including a RRC release message and receiving one or more additional RRC messages including each remaining CG-SDT configuration from the set of multiple CG-SDT configurations after the UE transitions out of the RRC connected state.

In some examples of the method, apparatuses, and non-transitory computer-readable medium described herein, transmitting the initial CG-SDT that includes the at least one common control channel message may include operations, features, means, or instructions for transmitting an indication of one or more small data transmission bearers, UE assistance information for a configured grant, a buffer status report, a power head room report, a measurements report, a request for on-demand delivery of system information or modified system information, a request for on-demand transmission of downlink reference signals, a request for a paging restriction, an access stratum (AS) security token exchange, an AS security verification, or a combination thereof, to be used for transmission of a remainder of the CG-SDTs.

In some examples of the method, apparatuses, and non-transitory computer-readable medium described herein, receiving the one or more downlink messages may include operations, features, means, or instructions for receiving the one or more downlink messages that collectively indicate the set of multiple CG-SDT configurations and the configuration for the downlink BWP and the uplink BWP for the CG-SDTs prior to the UE transitioning out of the RRC connected state.

Some examples of the method, apparatuses, and non-transitory computer-readable medium described herein may further include operations, features, means, or instructions for receiving a configuration for control resource sets and search space sets for use in monitoring a physical downlink control channel on the downlink BWP, receiving an indication to reduce an occurrence of radio resource measurements associated with radio resource management, and receiving configurations for one or more of downlink reference signals, downlink small data via unicast or multicast, paging early indications, or discontinuous reception.

In some examples of the method, apparatuses, and non-transitory computer-readable medium described herein, transmitting the initial CG-SDT may include operations, features, means, or instructions for determining that the respective time and frequency resources associated with two or more of the set of multiple CG-SDT configurations overlap for transmission of the initial CG-SDT and transmitting a set of multiple initial CG-SDTs on the respective time and frequency resources corresponding to the two or more of the set of multiple CG-SDT configurations, each of the set of multiple initial CG-SDTs being associated with a same uplink hybrid automatic repeat request (HARQ) process.

In some examples of the method, apparatuses, and non-transitory computer-readable medium described herein, transmitting the initial CG-SDT may include operations, features, means, or instructions for determining that the respective time and frequency resources associated with two or more of the set of multiple CG-SDT configurations overlap for transmission of the initial CG-SDT and transmitting the initial CG-SDT on only one of the respective time and frequency resources corresponding to the two or more of the set of multiple CG-SDT configurations, the initial CG-SDT being associated with a first uplink HARQ process.

In some examples of the method, apparatuses, and non-transitory computer-readable medium described herein, transmitting the initial CG-SDT may include operations, features, means, or instructions for determining that the respective time and frequency resources associated with the set of multiple CG-SDT configurations do not overlap for transmission of the initial CG-SDT, transmitting the initial CG-SDT using time and frequency resources associated with a first CG-SDT configuration of the set of multiple CG-SDT configurations, receiving an ACK feedback message in response to transmitting the initial CG-SDT, and transmitting a second initial CG-SDT without a common control channel message using time and frequency resources associated with a second CG-SDT configuration of the set of multiple CG-SDT configurations based on receiving the ACK feedback message.

In some examples of the method, apparatuses, and non-transitory computer-readable medium described herein, transmitting the initial CG-SDT may include operations, features, means, or instructions for determining that the respective time and frequency resources associated with the set of multiple CG-SDT configurations do not overlap for transmission of the initial CG-SDT, transmitting the initial CG-SDT using time and frequency resources associated with a first CG-SDT configuration of the set of multiple CG-SDT configurations, failing to receive an ACK feedback message in response to transmitting the initial CG-SDT, and transmitting a second initial CG-SDT with a second common control channel message using time and frequency resources associated with a second CG-SDT configuration of the set of multiple CG-SDT configurations based on failing to receive the ACK feedback message.

In some examples of the method, apparatuses, and non-transitory computer-readable medium described herein, transmitting the initial CG-SDT may include operations, features, means, or instructions for determining that the respective time and frequency resources associated with the set of multiple CG-SDT configurations do not overlap for transmission of the initial CG-SDT, transmitting the initial CG-SDT using time and frequency resources associated with a first CG-SDT configuration of the set of multiple CG-SDT configurations, and transmitting a second initial CG-SDT that includes a second common control channel message using time and frequency resources associated with a second CG-SDT configuration of the set of multiple CG-SDT configurations.

Some examples of the method, apparatuses, and non-transitory computer-readable medium described herein may further include operations, features, means, or instructions for triggering only a single HARQ processes associated with transmission of the initial CG-SDT, even if different HARQ processes may be associated with the set of multiple CG-SDT configurations.

Some examples of the method, apparatuses, and non-transitory computer-readable medium described herein may further include operations, features, means, or instructions for refraining from transmitting additional CG-SDTs after transmitting the initial CG-SDT in an absence of receiving an ACK message for the initial CG-SDT.

Some examples of the method, apparatuses, and non-transitory computer-readable medium described herein may further include operations, features, means, or instructions for retransmitting the initial CG-SDT based on not receiving a feedback message during a RRC configured window associated with the initial CG-SDT, the feedback message including either an ACK message associated with the initial CG-SDT or a dynamic retransmission grant.

In some examples of the method, apparatuses, and non-transitory computer-readable medium described herein, retransmitting the initial CG-SDT may include operations, features, means, or instructions for retransmitting the initial CG-SDT using a next available and valid time and frequency resources associated with the set of multiple CG-SDT configurations based on each of the set of multiple CG-SDT configurations being associated with a same small data transmission bearer.

In some examples of the method, apparatuses, and non-transitory computer-readable medium described herein, the set of multiple CG-SDT configurations may be associated with a same small data transmission bearer or different small data transmission bearers.

In some examples of the method, apparatuses, and non-transitory computer-readable medium described herein, transitioning out of the RRC connected state may include operations, features, means, or instructions for transitioning into a RRC inactive state or a RRC idle state.

In some examples of the method, apparatuses, and non-transitory computer-readable medium described herein, the at least one common control channel message indicates a RRC resume request message.

A method is described. The method may include transmitting one or more downlink messages that collectively indicate a set of multiple CG-SDT configurations and a configuration for a downlink BWP and an uplink BWP for CG-SDTs, each of the set of multiple CG-SDT configurations being associated with respective time and frequency resources in the downlink BWP and the uplink BWP and monitoring for an initial CG-SDT that includes at least one common control channel message as part of using time and frequency resources associated with one or more of the set of multiple CG-SDT configurations.

An apparatus is described. The apparatus may include at least on processor, memory coupled (e.g., operatively, communicatively, functionally, electronically, or electrically) with the at least on processor, and instructions stored in the memory. The instructions may be for the at least on processor to cause the apparatus to transmit one or more downlink messages that collectively indicate a set of multiple CG-SDT configurations and a configuration for a downlink BWP and an uplink BWP for CG-SDTs, each of the set of multiple CG-SDT configurations being associated with respective time and frequency resources in the downlink BWP and the uplink BWP and monitor for an initial CG-SDT that includes at least one common control channel message as part of using time and frequency resources associated with one or more of the set of multiple CG-SDT configurations.

Another apparatus is described. The apparatus may include means for transmitting one or more downlink messages that collectively indicate a set of multiple CG-SDT configurations and a configuration for a downlink BWP and an uplink BWP for CG-SDTs, each of the set of multiple CG-SDT configurations being associated with respective time and frequency resources in the downlink BWP and the uplink BWP and means for monitoring for an initial CG-SDT that includes at least one common control channel message as part of using time and frequency resources associated with one or more of the set of multiple CG-SDT configurations.

A non-transitory computer-readable medium storing code is described. The code may include instructions for at least on processor to transmit one or more downlink messages that collectively indicate a set of multiple CG-SDT configurations and a configuration for a downlink BWP and an uplink BWP for CG-SDTs, each of the set of multiple CG-SDT configurations being associated with respective time and frequency resources in the downlink BWP and the uplink BWP and monitor for an initial CG-SDT that includes at least one common control channel message as part of using time and frequency resources associated with one or more of the set of multiple CG-SDT configurations.

Some examples of the method, apparatuses, and non-transitory computer-readable medium described herein may further include operations, features, means, or instructions for receiving a capability message indicating support for multiple CG-SDT configurations, where transmitting the one or more downlink messages may be based on transmitting the capability message.

In some examples of the method, apparatuses, and non-transitory computer-readable medium described herein, transmitting the one or more downlink messages may include operations, features, means, or instructions for transmitting a RRC message including the set of multiple CG-SDT configurations and a RRC release message.

In some examples of the method, apparatuses, and non-transitory computer-readable medium described herein, transmitting the one or more downlink messages may include operations, features, means, or instructions for transmitting multiple RRC messages, where each RRC message of the multiple RRC messages includes a respective CG-SDT configuration of the set of multiple CG-SDT configurations, and where a last of the multiple RRC messages includes a RRC release message.

In some examples of the method, apparatuses, and non-transitory computer-readable medium described herein, transmitting the one or more downlink messages may include operations, features, means, or instructions for transmitting a first RRC message including a CG-SDT configuration from the set of multiple CG-SDT configurations and also including a RRC release message and transmitting one or more additional RRC messages including each remaining CG-SDT configuration from the set of multiple CG-SDT configurations after receiving the initial CG-SDT.

In some examples of the method, apparatuses, and non-transitory computer-readable medium described herein, monitoring for the initial CG-SDT that includes the at least one common control channel message may include operations, features, means, or instructions for receiving an indication of one or more small data transmission bearers, UE assistance information for a configured grant, a buffer status report, a power head room report, a measurements report, a request for on-demand delivery of system information or modified system information, a request for on-demand transmission of downlink reference signals, a request for a paging restriction, an AS security token exchange, an AS security verification, or a combination thereof, to be used for transmission of a remainder of the CG-SDTs.

In some examples of the method, apparatuses, and non-transitory computer-readable medium described herein, transmitting the one or more downlink messages may include operations, features, means, or instructions for transmitting, to a UE, the one or more downlink messages that collectively indicate the set of multiple CG-SDT configurations and the configuration for the downlink BWP and the uplink BWP for the CG-SDTs prior to the UE transitioning out of a RRC connected state.

Some examples of the method, apparatuses, and non-transitory computer-readable medium described herein may further include operations, features, means, or instructions for transmitting a configuration for control resource sets and search space sets for use in monitoring a physical downlink control channel on the downlink BWP, transmitting an indication to reduce an occurrence of radio resource measurements associated with radio resource management, and transmitting configurations for one or more of downlink reference signals, downlink small data via unicast or multicast, paging early indications, or discontinuous reception.

In some examples of the method, apparatuses, and non-transitory computer-readable medium described herein, the respective time and frequency resources associated with two or more of the set of multiple CG-SDT configurations overlap for transmission, by the UE, of the initial CG-SDT.

Some examples of the method, apparatuses, and non-transitory computer-readable medium described herein may further include operations, features, means, or instructions for receiving a set of multiple initial CG-SDTs on the respective time and frequency resources corresponding to the two or more of the set of multiple CG-SDT configurations, each of the set of multiple initial CG-SDTs being associated with a same uplink HARQ process.

Some examples of the method, apparatuses, and non-transitory computer-readable medium described herein may further include operations, features, means, or instructions for receiving the initial CG-SDT on only one of the respective time and frequency resources corresponding to the two or more of the set of multiple CG-SDT configurations, the initial CG-SDT being associated with a first uplink HARQ process.

In some examples of the method, apparatuses, and non-transitory computer-readable medium described herein, the respective time and frequency resources associated with the set of multiple CG-SDT configurations do not overlap for transmission, by the UE, of the initial CG-SDT.

Some examples of the method, apparatuses, and non-transitory computer-readable medium described herein may further include operations, features, means, or instructions for receiving the initial CG-SDT using time and frequency resources associated with a first CG-SDT configuration of the set of multiple CG-SDT configurations, transmitting an ACK feedback message in response to receiving the initial CG-SDT, and receiving a second initial CG-SDT without a common control channel message using time and frequency resources associated with a second CG-SDT configuration of the set of multiple CG-SDT configurations based on transmitting the ACK feedback message.

Some examples of the method, apparatuses, and non-transitory computer-readable medium described herein may further include operations, features, means, or instructions for receiving the initial CG-SDT using time and frequency resources associated with a first CG-SDT configuration of the set of multiple CG-SDT configurations, refraining from transmitting an ACK feedback message in response to transmitting the initial CG-SDT, and receiving a second initial CG-SDT with a second common control channel message using time and frequency resources associated with a second CG-SDT configuration of the set of multiple CG-SDT configurations based on refraining from transmitting the ACK feedback message.

Some examples of the method, apparatuses, and non-transitory computer-readable medium described herein may further include operations, features, means, or instructions for receiving the initial CG-SDT using time and frequency resources associated with a first CG-SDT configuration of the set of multiple CG-SDT configurations and receiving a second initial CG-SDT that includes a second common control channel message using time and frequency resources associated with a second CG-SDT configuration of the set of multiple CG-SDT configurations.

Some examples of the method, apparatuses, and non-transitory computer-readable medium described herein may further include operations, features, means, or instructions for refraining from transmitting a feedback message during a RRC configured window associated with the initial CG-SDT, the feedback message including either an ACK message associated with the initial CG-SDT or a dynamic retransmission grant and receiving a retransmission of the initial CG-SDT based on refraining from transmitting the feedback message.

In some examples of the method, apparatuses, and non-transitory computer-readable medium described herein, receiving the retransmission of the initial CG-SDT may include operations, features, means, or instructions for receiving the retransmission of the initial CG-SDT using a next available and valid time and frequency resources associated with the set of multiple CG-SDT configurations based on each of the set of multiple CG-SDT configurations being associated with a same small data transmission bearer.

In some examples of the method, apparatuses, and non-transitory computer-readable medium described herein, the set of multiple CG-SDT configurations may be associated with a same small data transmission bearer or different small data transmission bearers.

In some examples of the method, apparatuses, and non-transitory computer-readable medium described herein, at least one downlink message of the one or more downlink messages includes a RRC release message indicating for a receiving UE to transition from a RRC connected state to a RRC inactive state or a RRC idle state.

In some examples of the method, apparatuses, and non-transitory computer-readable medium described herein, the at least one common control channel message indicates a RRC resume request message.

BRIEF DESCRIPTION OF THE DRAWINGS

FIGS. 19 through 22 show flowcharts illustrating methods that support multiple CG-SDT configurations in accordance with aspects of the present disclosure.

DETAILED DESCRIPTION

Figure 1:
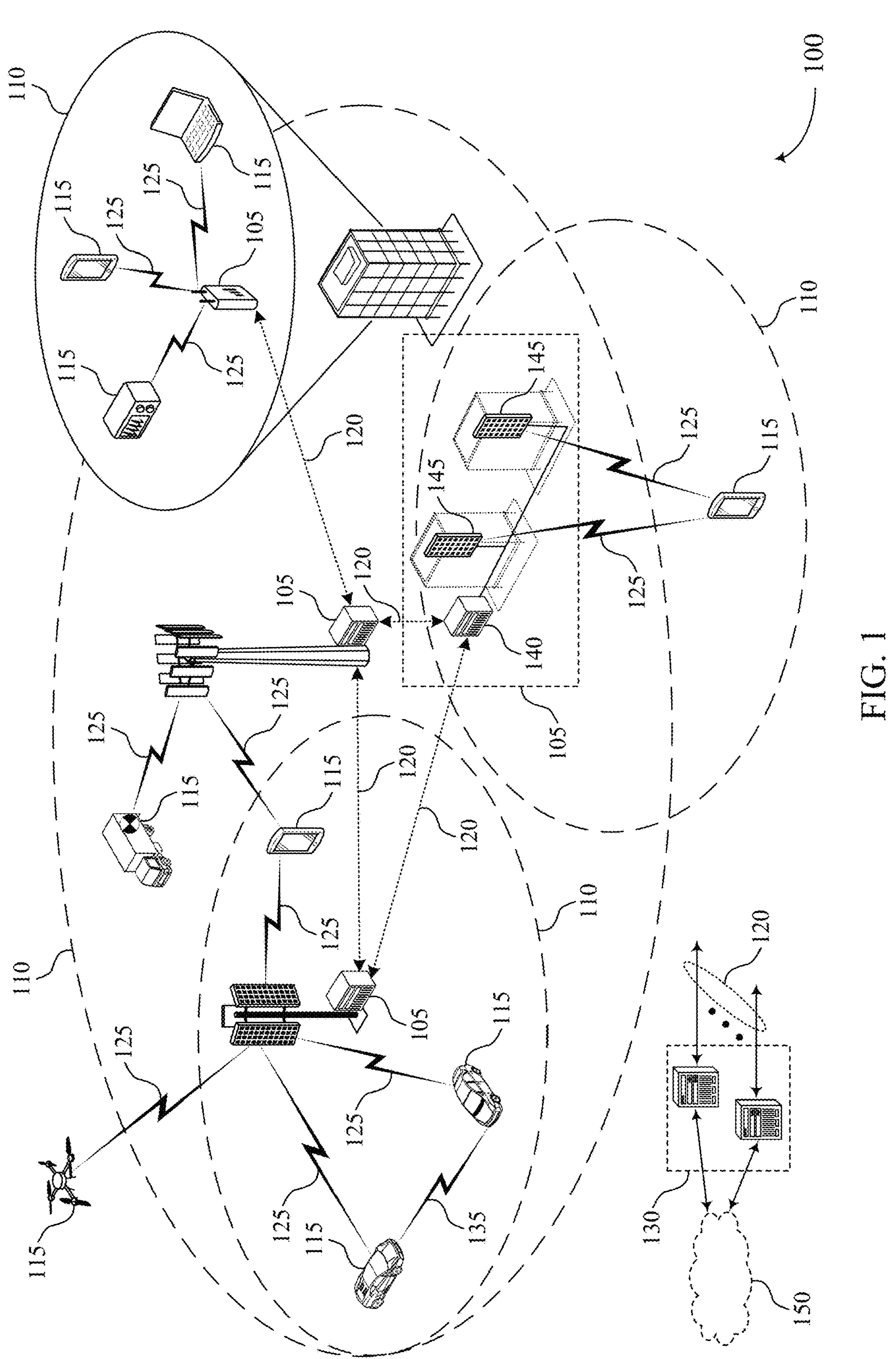
FIG. 1 illustrates an example of a wireless communications system that supports multiple configured grant small data transmission (CG-SDT) configurations in accordance with one or more aspects of the present disclosure.

In some examples of wireless communications, a wireless device (e.g., a user equipment (UE)) may transmit a small data transmission (SDT). In some examples of SDT, a UE may transmit one or more uplink messages to a network device while operating out of a radio resource control (RRC) connected state (e.g., in an RRC inactive state or and RRC idle state). Based on transmitting data out of the RRC connected state, the UE may benefit from a reduced signaling overhead when compared to data transmissions using an RRC connected state. In some examples, the network device may configure the UE with multiple SDT configurations via one or more configured grants (CGs) (e.g., multiple CG-SDT configurations). For instance, a first CG-SDT configuration may be associated with a lower coding rate and a higher coding gain to improve uplink transmission reliability and a second CG-SDT configuration may be associated with a higher coding rate to increase data capacity and spectral efficiency for the uplink transmission. In some examples, when the UE is configured with one CG-SDT configuration, the UE may transmit a common control channel (CCCH) message as part of an initial CG-SDT using time and frequency resources associated with the one CG-SDT configuration. The CCCH message may include one or more parameters used to configure an SDT session with the network device while operating outside of the RRC connected state (e.g., an RRC resume request, one or more SDT bearers, UE assistance information for configured grant, buffer status report, power head room report, measurements report, request for on-demand delivery of system information or modified system information, request for on-demand transmission of DL reference signals, request for paging restriction, or access stratum (AS) security token exchange and verification). However, multiple CG-SDT configurations at the UE may result in ambiguity of which CG-SDT configuration may be used for transmission of the CCCH message.

According to the techniques described herein, the UE may transmit to the network device a capability message indicating support for multiple CG-SDT configurations. As such, the UE may receive one or more downlink messages configuring multiple CG-SDT configurations. For example, the network device may transmit an RRC release message that includes an indication for the UE to transition to the RRC inactive state and that includes multiple CG-SDT configurations multiplexed together. Additionally or alternatively, the network device may transmit a separate downlink message for each CG-SDT configuration, where the final downlink message may include the RRC release message.

In some cases, the UE may determine which of the CG-SDT configurations to use for a CG-SDT based on their respective frequency and time resources. For instance, if respective frequency and time resources for two CG-SDT configurations overlap in time, the UE may determine to transmit a CCCH message using one or both sets of time and frequency resources. Additionally or alternatively, if the respective frequency and time resources for the two CG-SDT configurations do not overlap in time, the UE may transmit respective CG-SDTs in accordance with the two CG-SDT configurations. In some examples, the network device may also transmit respective RRC-configured windows for each CG-SDT configuration, during which the UE may detect acknowledgment (ACK) or non-ACK (NACK) feedback from the network device. In some cases, the UE may not receive a feedback message from the UE during an RRC-configured window. As such, the UE may retransmit the one or more CG-SDTs autonomously using a next available and valid set of CG-SDT resources.

Aspects of the disclosure are initially described in the context of wireless communications systems. Aspects of the disclosure are further illustrated by and described with reference to SDT bearer configurations, process flows, and CG-SDT resource diagrams. Aspects of the disclosure are further illustrated by and described with reference to apparatus diagrams, system diagrams, and flowcharts that relate to multiple CG-SDT configurations.

FIG. 1 illustrates an example of a wireless communications system 100 that supports multiple CG-SDT configurations in accordance with one or more aspects of the present disclosure. The wireless communications system 100 may include one or more network devices 105, one or more UEs 115, and a core network 130. In some examples, the one or more network devices 105 may be examples of network entities, access network entities, or base stations, among other examples. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The network devices 105 may be dispersed throughout a geographic area to form the wireless communications system 100 and may be devices in different forms or having different capabilities. The network devices 105 and the UEs 115 may wirelessly communicate via one or more communication links 125. Each network device 105 may provide a coverage area 110 over which the UEs 115 and the network device 105 may establish one or more communication links 125. The coverage area 110 may be an example of a geographic area over which a network device 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the network devices 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, network device 105, entity of a core network 130, apparatus, device, or computing system configured to perform any techniques described herein. For example, a network node may be a UE 115. As another example, a network node may be a network device 105. As another example, a first network node may be configured to communicate with a second network node or a third network node. In one aspect of this example, the first network node may be a UE 115, the second network node may be a network device 105, and the third network node may be a UE 115. In another aspect of this example, the first network node may be a UE 115, the second network node may be a network device 105, and the third network node may be a network device 105. In yet other aspects of this example, the first, second, and third network nodes may be different. Similarly, reference to a UE 115, a network device 105, an apparatus, a device, or a computing system may include disclosure of the UE 115, network device 105, apparatus, device, or computing system being a network node. For example, disclosure that a UE 115 is configured to receive information from a network device 105 also discloses that a first network node is configured to receive information from a second network node. In this example, consistent with this disclosure, the first network node may refer to a first UE 115, a first network device 105, a first apparatus, a first device, or a first computing system configured to receive the information; and the second network node may refer to a second UE 115, a second network device 105, a second apparatus, a second device, or a second computing system.

The network devices 105 may communicate with the core network 130, or with one another, or both. For example, the network devices 105 may interface with the core network 130 through one or more backhaul links 120 (e.g., via an S1, N2, N3, or other interface). The network devices 105 may communicate with one another over the backhaul links 120 (e.g., via an X2, Xn, or other interface) either directly (e.g., directly between network devices 105), or indirectly (e.g., via core network 130), or both. In some examples, the backhaul links 120 may be or include one or more wireless links.

One or more of the network devices 105 described herein may include or may be referred to by a person having ordinary skill in the art as a base transceiver station, a radio network device, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network devices 105 and the network equipment including macro eNBs or gNBs, small cell eNBs or gNBs, or relay network devices, among other examples, as shown in FIG. 1.

The UEs 115 and the network devices 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a network device 105, or downlink transmissions from a network device 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the network devices 105, the UEs 115, or both) may have hardware configurations that support communications over a particular carrier bandwidth or may be configurable to support communications over one of a set of carrier bandwidths. In some examples, the wireless communications system 100 may include network devices 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the network devices 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI)

may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a network device 105. Other UEs 115 in such a group may be outside the geographic coverage area 110 of a network device 105 or be otherwise unable to receive transmissions from a network device 105. In some examples, groups of the UEs 115 communicating via D2D communications may utilize a one-to-many (1:M) system in which each UE 115 transmits to every other UE 115 in the group. In some examples, a network device 105 facilitates the scheduling of resources for D2D communications. In other cases, D2D communications are carried out between the UEs 115 without the involvement of a network device 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network devices 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a network device 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or network device 105 may be distributed across various network devices (e.g., radio heads and ANCs) or consolidated into a single network device (e.g., a network device 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the network devices 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network device 105 or a UE 115 may be equipped with multiple antennas, which may be used to employ techniques such as transmit diversity, receive diversity, multiple-input multiple-output (MIMO) communications, or beamforming. The antennas of a network device 105 or a UE 115 may be located within one or more antenna arrays or antenna panels, which may support MIMO operations or transmit or receive beamforming. For example, one or more network device antennas or antenna arrays may be co-located at an antenna assembly, such as an antenna tower. In some examples, antennas or antenna arrays associated with a network device 105 may be located in diverse geographic locations. A network device 105 may have an antenna array with a number of rows and columns of antenna ports that the network device 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a network device 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the network devices 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples of wireless communications, a UE 115 may transmit a SDT to a network device 105. In some examples of SDT, a UE 115 may transmit one or more uplink messages to the network device 105 while operating out of an RRC connected state (e.g., in an RRC inactive state or an RRC idle state). In some examples, the network device may configure the UE 115 with multiple SDT configurations via one or more configured grants (CGs) (e.g., multiple CG-SDT configurations). For instance, a first CG-SDT configuration may be associated with a lower coding rate and a higher coding gain to improve uplink transmission reliability and a second CG-SDT configuration may be associated with a higher coding rate to increase data capacity and spectral efficiency for the uplink transmission. In some examples, when the UE is configured with one CG-SDT configuration, the UE may transmit a CCCH message as part of an initial CG-SDT using time and frequency resources associated with the one CG-SDT configuration.

According to the techniques described herein, the UE may transmit to the network entity a capability message indicating support for multiple CG-SDT configurations. As such, the UE may receive one or more downlink messages configuring multiple CG-SDT configurations. For example, the network device may transmit an RRC release message that includes an indication for the UE to transition to the RRC inactive state and that includes multiple CG-SDT configurations multiplexed together. Additionally or alternatively, the network entity may transmit a separate downlink message for each CG-SDT configuration, where the final downlink message may include the RRC release message.

In some cases, the UE may determine which of the CG-SDT configurations to use for a CG-SDT based on their respective frequency and time resources. For instance, if respective frequency and time resources for two CG-SDT configurations overlap in time, the UE may determine to transmit a CCCH message using one or both sets of time and frequency resources. Additionally or alternatively, if the respective frequency and time resources for the two CG-SDT configurations do not overlap in time, the UE may transmit respective CG-SDTs in accordance with the two CG-SDT configurations. In some examples, the network entity may also transmit respective RRC-configured windows for each CG-SDT configuration, during which the UE may monitor for feedback from the network device (e.g., ACK or NACK feedback). In some cases, the UE may not receive a feedback message from the UE during an RRC-configured window. As such, the UE may retransmit the one or more CG-SDTs autonomously using a next available and valid set of CG-SDT resources.

Figure 2:
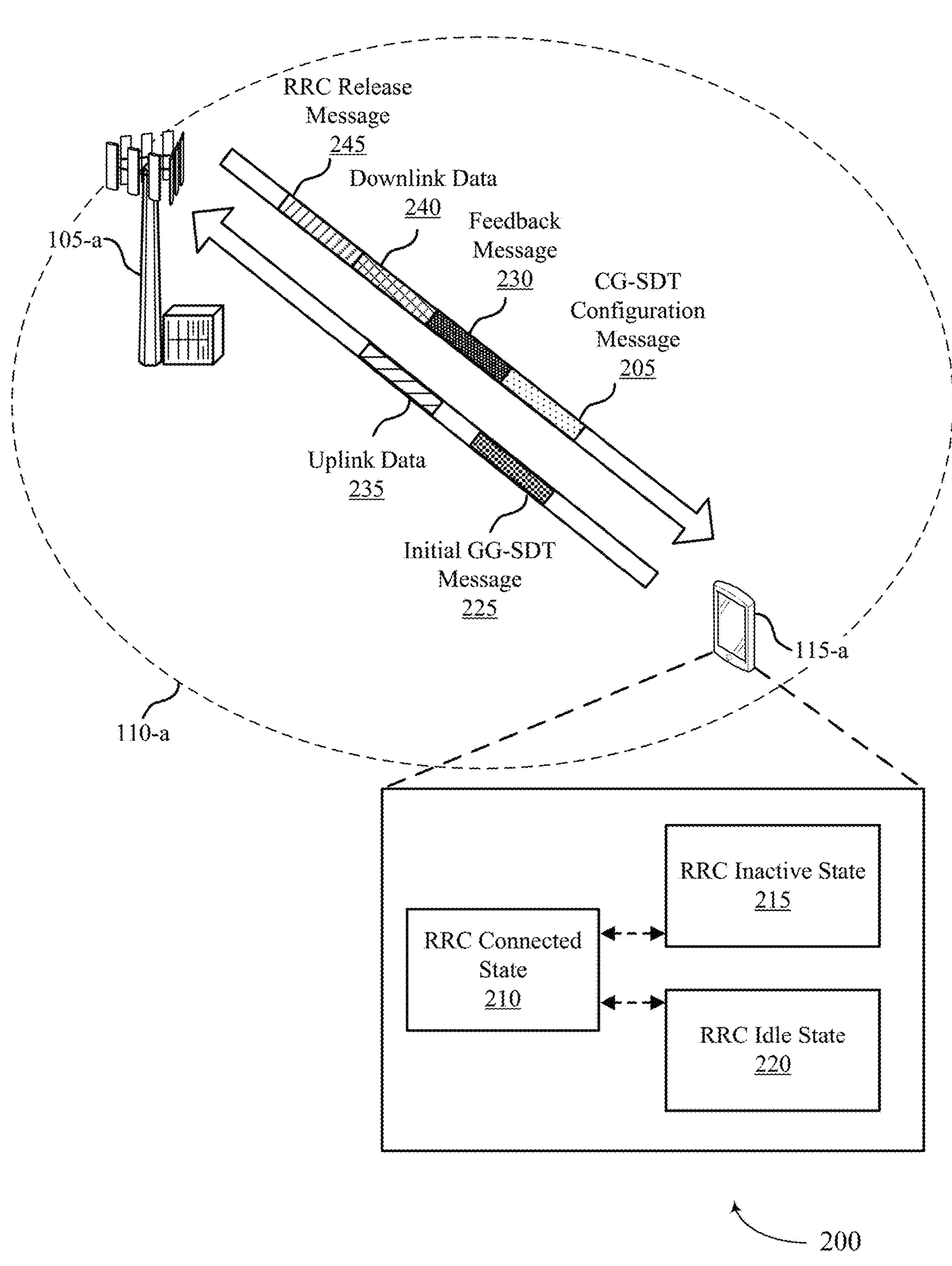
FIG. 2 illustrates an example of a wireless communications system that supports multiple CG-SDT configurations in accordance with aspects of the present disclosure.

FIG. 2 illustrates an example of a wireless communications system 200 that supports multiple CG-SDT configurations in accordance with aspects of the present disclosure. In some examples, wireless communications system 200 may implement one or more aspects of wireless communications system 100. For instance, a UE 115-*a*, a network device 105-*a*, and a geographic coverage are 110-*a* may be respective examples of a UE 115, a network device 105, and a geographic coverage area 110 as described with reference to FIG. 1. While examples are discussed herein, any number of devices and device types may be used to accomplish implementations described in the present disclosure. Wireless communications system 200 may support techniques to improve use of multiple CG-SDT configurations at the UE 115-*a* during an SDT session.

In some examples of wireless communications system 200, the UE 115-*a* may communicate with the network device 105-*a* while operating in accordance with an RRC connected state 210. While operating in the RRC connected state 210, the UE 115-*a* may receive from the network device 105-*a* a CG-SDT configuration message 205. For instance, the CG-SDT configuration message 205 may configure the UE 115-*a* with CG resources for use when the UE 115-*a* performs an SDT. In some cases, the CG-SDT configuration message 205 may be an example of an RRC release message that may include an RRC suspension configuration (e.g., SuspendConfig), indicating for the UE 115-*a* to transition out of the RRC connected state 210. As such, the UE 115-*a* may transition to an RRC inactive state 215 or an RRC idle state 220 based on receiving the RRC release message.

Based on transitioning out of the RRC connected state 210, the UE 115-*a* may also release one or more operations associated with the RRC connected state. For example, the UE 115-*a* support for MIMO operations and for carrier aggregation in the RRC connected state 210 may also be released. In some cases, the UE 115-*a* may perform one or more uplink transmissions while operating outside of the RRC connected state 210 by configuring an SDT session with the network device 105-*a*. For example, the UE 115-*a* may transmit an initial CG-SDT message 225 initiating an SDT session with the network device 105-*a*, which may include an RRC resume request (e.g., a CCCH message), uplink data, and signaling radio bearers (SRBs) used for transmission of RRC messages (e.g., SRB1 and SRB2). In some examples, the UE 115-*a* may transmit the initial CG-SDT message 225 using the CG resources configured in CG-SDT configuration message 205.

As such, the network device 105-*a* may receive the initial CG-SDT message 225 and transmit a feedback message 230 in response. In some examples, the feedback message 230 may indicate successful reception of the CCCH message included in the initial CG-SDT message 225. Based on receiving the feedback message 230, the UE 115-*a* and network device 105-*a* may perform one or more subsequent SDTs. For example, the UE 115-*a* may transmit uplink data 235 and receive downlink data 240 from the network device 105-*a* while operating outside of the RRC connected state. In some examples, the UE 115-*a* and the network device 105-*a* may conclude the SDT session based on the UE 115-*a* receiving an RRC release message 245 from the network device 105-*a*. Some examples, the RRC release message 245 may indicate for the UE 115-*a* to transition back to the RRC connected state 210. By transmitting SDT while operating outside of the RRC connected state, the UE 115-*a* may benefit from power saving, a reduction in spectral efficiency, a reduction in signaling overhead, and a reduction in latency.

In some examples of wireless communications system 200, a network may support multiple CG-SDT configurations and multiple HARQ processes for a given carrier. For example, a first and second CG-SDT configuration may use overlapping radio resources with different frequency bandwidths or different time resources. As such, the network device 105-*a* may include multiple CG-SDT configurations associated with respective frequency and time resources in the CG-SDT configuration message 205. In some cases, the UE 115-*a* may use a given CG-SDT configuration from the multiple CG-SDT configurations based on the composition of the uplink data 235 to transmit, channel characteristics, or a combination thereof. For example, the UE 115-*a* may use a first CG-SDT configuration for a relatively lower coding rate and relatively higher coding gain to improve reliability of data transmission. Additionally or alternatively, the UE 115-*a* may use a second CG-SDT configuration for a relatively higher coding rate to transmit a greater amount of data in a shorter amount of time to increase spectral efficiency.

To initiate an SDT session based on CG, the UE 115-*a* may include a CCCH message (e.g., an RRCResumeRequest with a UE ID) in the initial CG-SDT message 225 and wait for a response from the network device 105-*a* (e.g., the feedback message 230). In some examples, the CCCH message may set up connections between the UE 115-*a* and the network device 105-*a* for a user plane (e.g., a data radio bearer (DRB)) and an AS security token exchange and verification (e.g., an SRB). Additionally or alternatively, the CCCH message may include uplink data associated with the UE 115-*a* from the user plane. Based on the initial CG-SDT message 225 including the CCCH message, the UE may refrain from including additional CCCH in subsequent uplink transmissions (e.g., in the uplink data 235). As such, the UE 115-*a* may refrain from transmitting the uplink data 235 until the UE 115-*a* receives the feedback message 230, indicating that the CCCH message was successfully received at the network device 105-*a*. In some cases, the network device 105-*a* may transmit a dynamic grant (DG) in the feedback message 230, indicating for the UE to retransmit the initial CG-SDT message 225. In such cases, the UE 115-*a* may send a retransmission of the initial CG-SDT message 225 based on receiving the DG, which may increase reliability of the SDT connection setup.

In some cases, the UE 115-*a* may utilize multiple CG-SDT configurations and multiple HARQ processes during one or more SDT sessions, and as such, may utilize one or more techniques described herein to increase reliability of the CG-SDTs. In some examples, the UE 115-*a* may transmit a capability message (not illustrated in FIG. 2) indicating support for multiple CG-SDT configurations and receive one or more CG-SDT configuration messages based on transmitting the capability message, as described herein including with reference to FIGS. 4-6.

In some examples, the network device 105-*a* may transmit CG-SDT configurations that overlap in time and the UE 115-*a* may operate in accordance with the techniques described with reference to FIG. 7.

In some examples, the network device 105-*a* may transmit CG-SDT configurations that do not overlap in time and the UE 115-*a* may operate in accordance with the techniques described with reference to FIGS. 8 and 9.

In some examples, the UE 115-*a* may not receive the feedback message 230 for the initial CG-SDT message 225 during a configured window and may operate in accordance with the techniques described with reference to FIG. 10.

Figure 3:
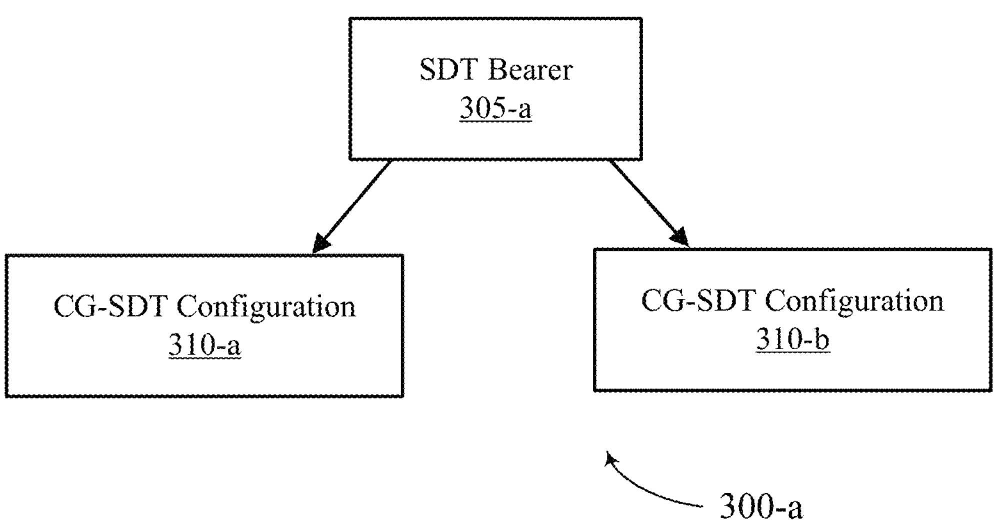
FIG. 3 illustrates an example of a SDT bearer configurations that support multiple CG-SDT configurations in accordance with aspects of the present disclosure.
Figure 3:
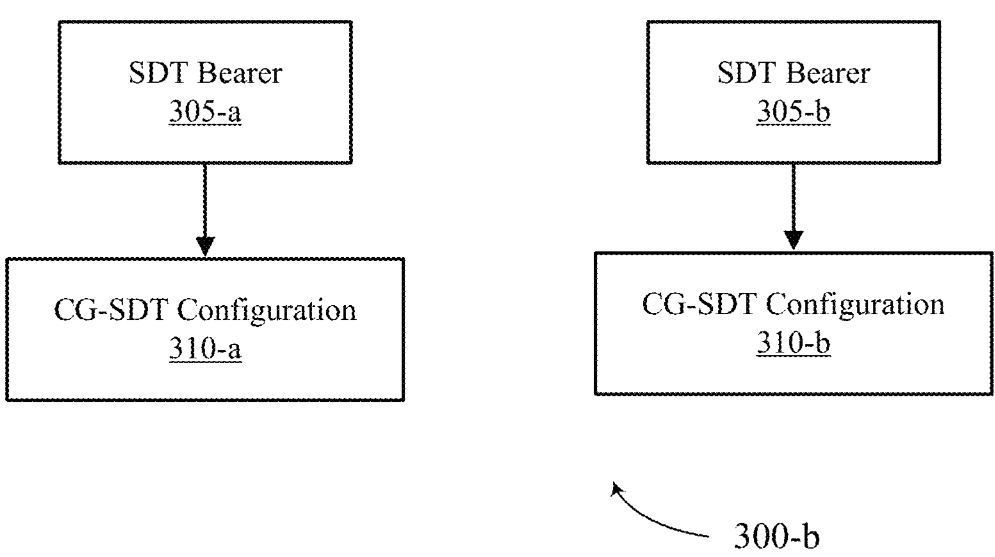

FIG. 3 illustrates an illustrates examples of SDT bearer configurations 300-*a* and 300-*b* that support multiple CG-SDT configurations in accordance with aspects of the present disclosure. In some examples, the SDT bearer configurations 300-*a* and 300-*b* may implement one or more aspects of the wireless communications system 100, the wireless communications system 200, or a combination thereof. For instance, an SDT bearers 305-*a* and 305-*b* and CG-SDT configurations 310-*a* and 310-*b* may be respective examples of SDT bearers and CG-SDT configurations as described with reference to FIG. 2. While examples are discussed herein, any number of devices and device types may be used to accomplish implementations described in the present disclosure. SDT bearer configuration 300-*a* may support techniques for multiple CG-SDT configurations 310 associated with a same SDT bearer 305. SDT bearer configuration 300-*b* may support techniques for multiple CG-SDT configurations 310 associated with respective SDT bearers 305.

In some examples of SDT bearer configuration 300-*a*, a network device 105 may configure a UE 115 (not illustrated in FIG. 3) with multiple CG-SDT configurations 310 associated with a same SDT bearer 305. For example, the CG-SDT configuration 310-*a* and the CG-SDT configuration 310-*b* may each be associated with the SDT bearer 305-*a*. The SDT bearer 305-*a* may be used for data associated with the UE 115 from the user plane, from the control plane, or both.

In some examples of SDT bearer configuration 300-*b*, a network device 105 may configure a UE 115 (not illustrated in FIG. 3) with multiple CG-SDT configurations 310 associated with respective SDT bearers 305. For example, the CG-SDT configuration 310-*a* may be associated with SDT bearer 305-*a* and the CG-SDT configuration 310-*b* may be associated with the SDT bearer 305-*b*. The SDT bearer 305-*a* and 305-*b* may both be used for data associated with the UE 115 from the user plane, from the control plane, or both.

In some examples of both SDT bearer configurations 300-*a* and 300-*b*, each of the CG-SDT configurations 310 may include a respective time and frequency resource allocation, a periodicity identifier, a scrambling identifier, a modulation coding scheme (MCS), a transport block size (TBS), an indication of repetition, slot aggregation, frequency hopping, demodulation reference signal (DMRS) bundling, procedures, timers and RRC parameters associated with timing advance (TA) validation, CG-SDT resource selection and resource validation, one or more HARQ processes, SDT failure detection, search space sets for downlink control information (DCI) (e.g., control resource sets (CORESETs)), or a combination thereof. Additionally or alternatively, each of the CG-SDT configurations 310 may also include one or more reference signal resources for quasi co-location (QCL), one or more spatial relations, TA validation, measurements, tracking loop, automatic gain control (AGC), or a combination thereof.

Figure 4:
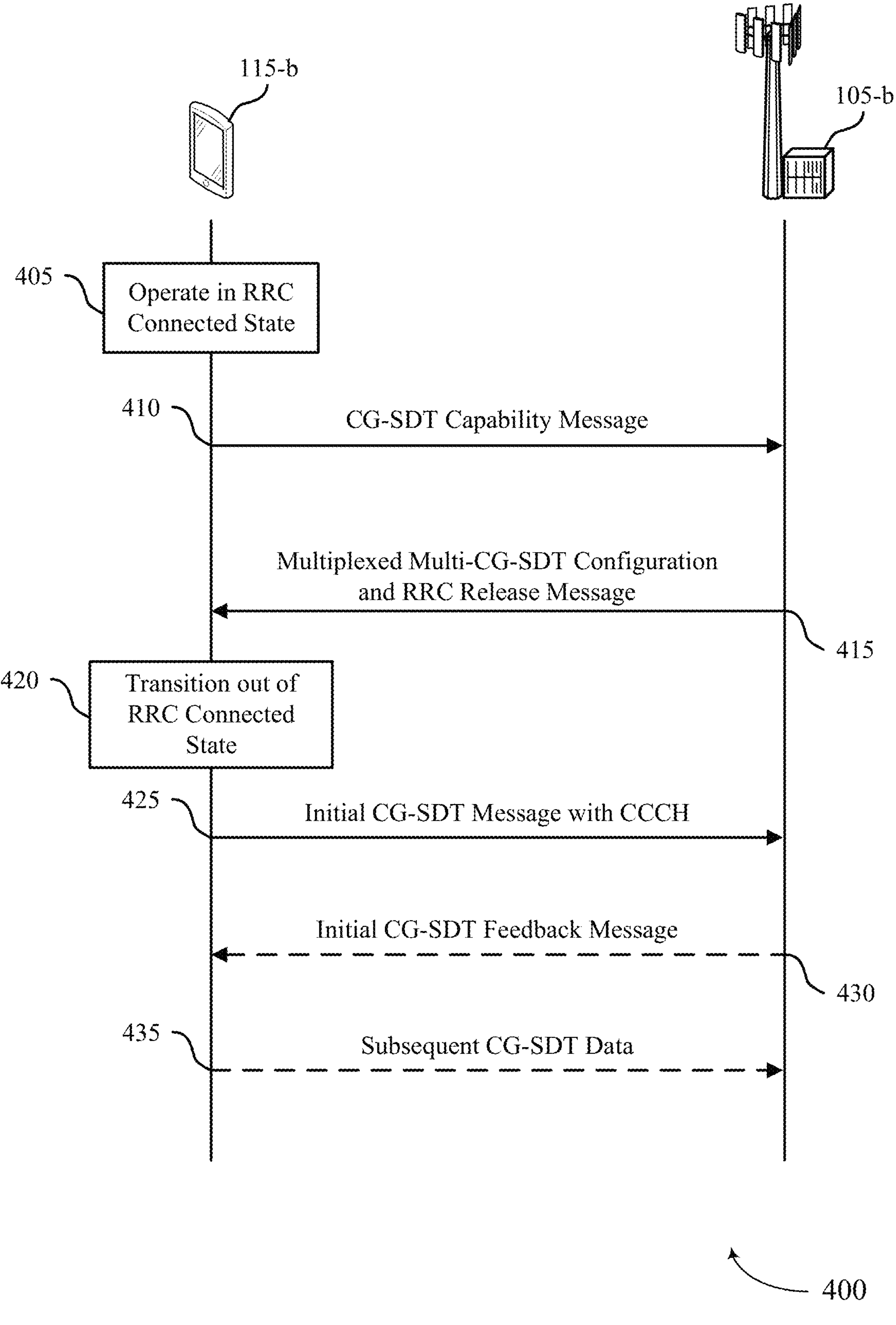
FIG. 4 illustrates an example of a process flow that supports multiple CG-SDT configurations in accordance with aspects of the present disclosure.

FIG. 4 illustrates an example of a process flow 400 that supports multiple CG-SDT configurations in accordance with aspects of the present disclosure. In some examples, process flow 400 may implement aspects of wireless communications system 100, wireless communications system 200, or a combination thereof. Process flow 400 includes a UE 115-*b* and a network device 105-*b* which may be respective examples of a UE 115 and a network device 105, as described with reference to FIGS. 1 and 2. Alternative examples of the following may be implemented, where some steps are performed in a different order than described or are not performed at all. In some cases, steps may include additional features not mentioned below, or further steps may be added. In addition, while process flow 400 shows processes between a single UE 115 and a single network device 105, it should be understood that these processes may occur between any number of network devices and network device types.

At 405, the UE 115-*b* may operate in accordance with an RRC connected state. For example, while operating in the RRC connected state, the UE 115-*b* may transmit to the network device 105-*b*, uplink control information (e.g., via a physical uplink control channel (PUCCH)) and uplink data (e.g., via a physical uplink shared channel (PUSCH)). Additionally or alternatively, the UE 115-*b* may also receive from the network device 105-*b*, downlink control data (e.g., via a physical downlink control channel (PDCCH)) and downlink data (e.g., via a physical downlink shared channel (PDSCH)).

At 410, the UE 115-*b* may transmit a CG-SDT capability message. In some examples, the CG-SDT capability message may indicate support for multiple CG-SDT configurations at the UE 115-*b*.

At 415, the UE 115-*b* may receive from the network device 105-*b* an RRC message (e.g., an RRCRelease message with a SuspendConfig), while operating in accordance with the RRC connected state. In some examples, the RRC message may also include multiple CG-SDT configurations for use at the UE 115-*b* for CG-SDTs. In such examples, the multiple CG-SDT configurations may be multiplexed in the RRC message. In some cases, receiving the RRC message including the multiplexed CG-SDT configurations and the RRCRelease message may be based on the UE 115-*b* transmitting the capability message at 410.

At 420, the UE 115-*b* may transition out of the RRC connected state based on receiving the RRCRelease message included in the RRC message at 415.

At 425, the UE 115-*b* may transmit to the network device 105-*b* an initial CG-SDT message that includes at least one CCCH message using time and frequency resources associated with one or more of the multiplexed of CG-SDT configurations received at 415. The UE 115-*b* may determine which of the one or more multiplexed CG-SDT configurations to use for the initial CG-SDT message based on a comparison of the respective time and frequency resources associated with each of the multiplexed CG-SDT configurations.

At 430, the UE 115-*b* may receive from the network device 105-*b* a feedback message in response to the initial CG-SDT message. In some examples, the feedback message may include an ACK message (e.g., identified by the UE 115-*b* implicitly or explicitly) which may indicate to the UE 115-*b* successful reception of the initial CG-SDT message. Additionally or alternatively, the feedback message may include a DG (e.g., identified by the UE 115-*b* explicitly by monitoring a PDCCH configured by the network device 105-*b*) which may indicate to the UE 115-*b* that the network device 105-*b* did not receive the initial CG-SDT message. In some cases, the UE 115-*b* may use the DG to retransmit the initial CG-SDT message to the network device 105-*b*.

At 435, the UE 115-*b* may transmit subsequent CG-SDT data to the network device 105-*b* based on the feedback message including the ACK message at 430. In some examples, the UE 115-*d* may use the time and frequency resources associated with the multiple CG-SDT configurations to transmit the subsequent CG-SDT data.

Figure 5:
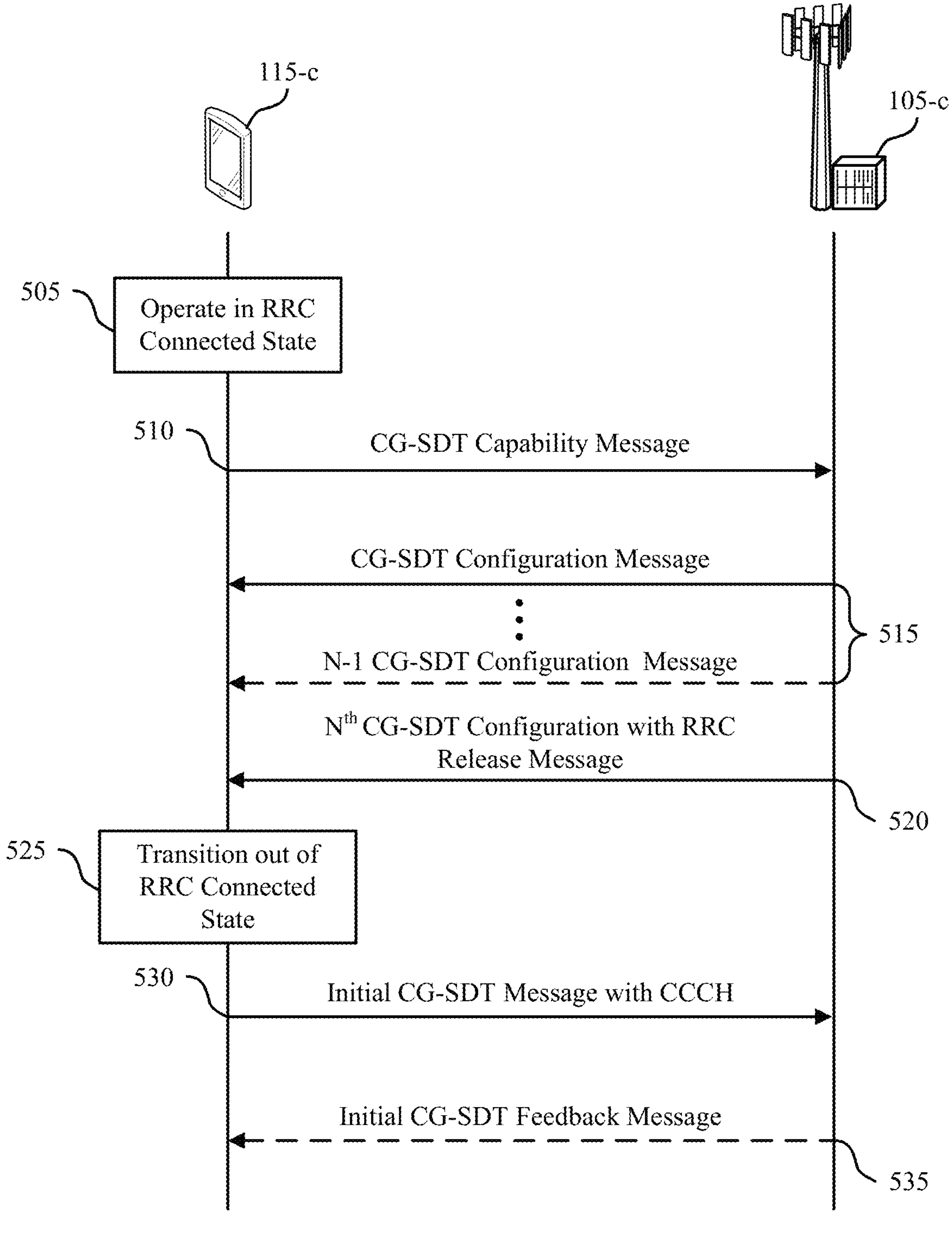
FIG. 5 illustrates an example of a process flow that supports multiple CG-SDT configurations in accordance with aspects of the present disclosure.

FIG. 5 illustrates an example of a process flow 500 that supports multiple CG-SDT configurations in accordance with aspects of the present disclosure. In some examples, process flow 500 may implement aspects of wireless communications system 100, wireless communications system 200, or a combination thereof. Process flow 500 includes a UE 115-*c* and a network device 105-*c* which may be respective examples of a UE 115 and a network device 105, as described with reference to FIGS. 1 and 2. Alternative examples of the following may be implemented, where some steps are performed in a different order than described or are not performed at all. In some cases, steps may include additional features not mentioned below, or further steps may be added. In addition, while process flow 500 shows processes between a single UE 115 and a single network device 105, it should be understood that these processes may occur between any number of network devices and network device types.

At 505, the UE 115-*c* may operate in accordance with an RRC connected state. For example, while operating in the RRC connected state, the UE 115-*c* may transmit to the network device 105-*c*, uplink control information (e.g., via a PUCCH) and uplink data (e.g., via a PUSCH). Additionally or alternatively, the UE 115-*c* may also receive from the network device 105-*c*, downlink control data (e.g., via a PDCCH) and downlink data (e.g., via a PDSCH).

At 510, the UE 115-*c* may transmit a CG-SDT capability message. In some examples, the CG-SDT capability message may indicate support for multiple CG-SDT configurations at the UE 115-*c*.

At 515, the UE 115-*c* may receive from the network device 105-*c* receive one or more RRC messages, where each RRC message may include a respective CG-SDT configuration for use at the UE 115-*c*. At 520, the UE may receive an $N^{th}$ RRC message including an $N^{th}$ CG-SDT configuration and an RRCRelease message with a SuspendConfig.

At 525, the UE 115-*c* may transition out of the RRC connected state based on receiving the $N^{th}$ RRC message including the RRCRelease message with a SuspendConfig at 520.

At 530, the UE 115-*c* may transmit to the network device 105-*c* an initial CG-SDT message that includes at least one CCCH message using time and frequency resources associated with one or more of the CG-SDT configurations received at 515 and 520. The UE 115-*c* may determine which of the one or more CG-SDT configurations to use for the initial CG-SDT message based on a comparison of the respective time and frequency resources associated with each of the CG-SDT configurations.

At 530, the UE 115-*c* may receive from the network device 105-*c* a feedback message in response to the initial CG-SDT message. In some examples, the feedback message may include an ACK message (e.g., identified by the UE 115-*c* implicitly or explicitly) which may indicate to the UE 115-*c* successful reception of the initial CG-SDT message. Additionally or alternatively, the feedback message may include a DG (e.g., identified by the UE 115-*c* explicitly by monitoring a PDCCH configured by the network device 105-*c*) which may indicate to the UE 115-*c* that the network device 105-*c* did not receive the initial CG-SDT message. In some cases, the UE 115-*c* may use the DG to retransmit the initial CG-SDT message to the network device 105-*c*.

At 535, the UE 115-*c* may transmit subsequent CG-SDT data to the network device 105-*c* based on the feedback message including the ACK message at 530. In some examples, the UE 115-*d* may use the time and frequency resources associated with the multiple CG-SDT configurations to transmit the subsequent CG-SDT data.

Figure 6:
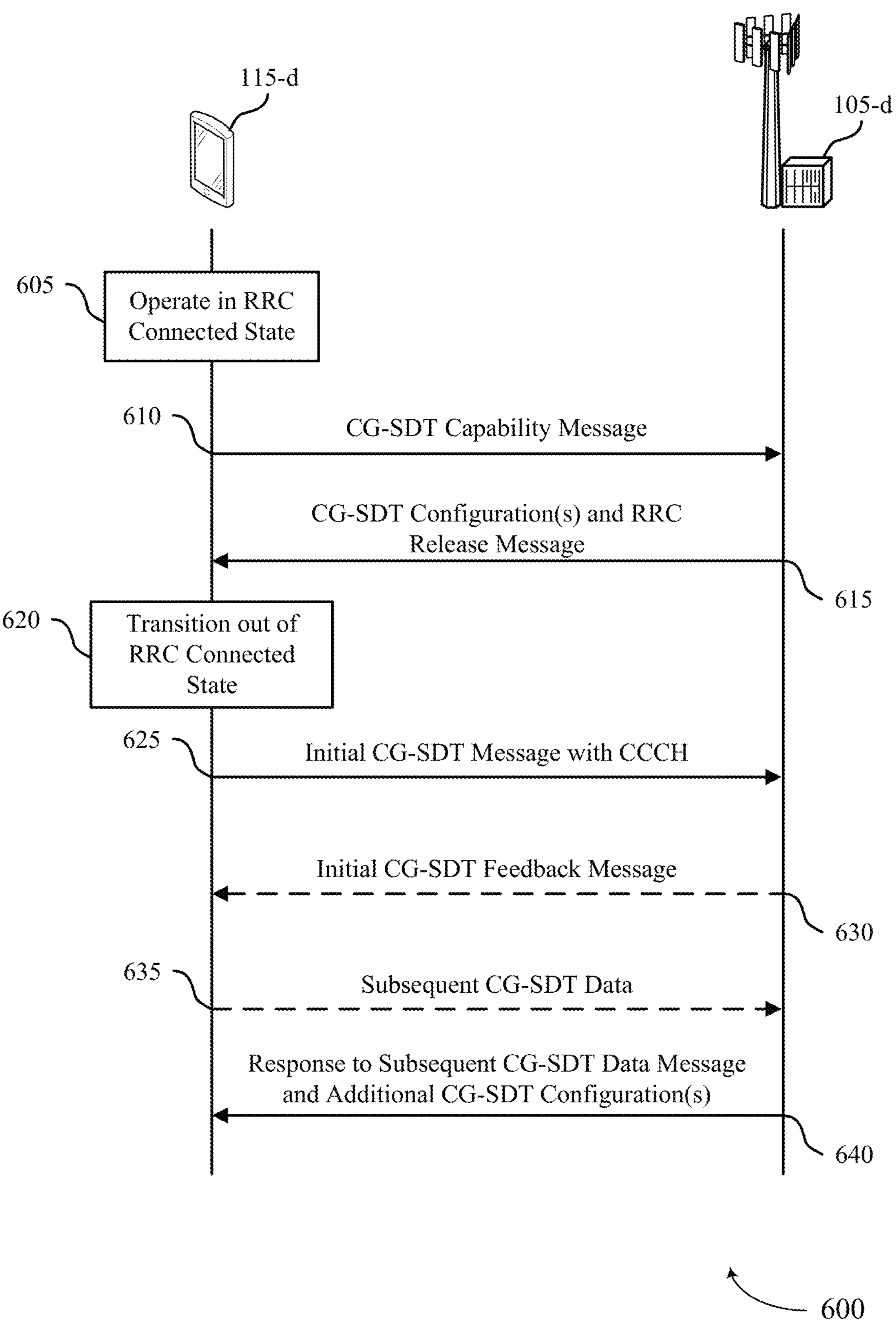
FIG. 6 illustrates an example of a process flow that supports multiple CG-SDT configurations in accordance with aspects of the present disclosure.

FIG. 6 illustrates an example of a process flow 600 that supports multiple CG-SDT configurations in accordance with aspects of the present disclosure. In some examples, process flow 600 may implement aspects of wireless communications system 100, wireless communications system 200, or a combination thereof. Process flow 600 includes a UE 115-*d* and a network device 105-*d* which may be respective examples of a UE 115 and a network device 105, as described with reference to FIGS. 1 and 2. Alternative examples of the following may be implemented, where some steps are performed in a different order than described or are not performed at all. In some cases, steps may include additional features not mentioned below, or further steps may be added. In addition, while process flow 600 shows processes between a single UE 115 and a single network device 105, it should be understood that these processes may occur between any number of network devices and network device types.

At 605, the UE 115-*d* may operate in accordance with an RRC connected state. For example, while operating in the RRC connected state, the UE 115-*d* may transmit to the network device 105-*d*, uplink control information (e.g., via a PUCCH) and uplink data (e.g., via a PUSCH). Additionally or alternatively, the UE 115-*d* may also receive from the network device 105-*d*, downlink control data (e.g., via a PDCCH) and downlink data (e.g., via a PDSCH).

At 610, the UE 115-*d* may transmit a CG-SDT capability message. In some examples, the CG-SDT capability message may indicate support for multiple CG-SDT configurations at the UE 115-*d*.

At 615, the UE 115-*d* may receive from the network device 105-*d* one or more RRC messages. In some examples, the UE 115-*d* may receive one RRC message that includes an RRCRelease message with a SuspendConfig and multiple multiplexed CG-SDT configurations for use at the UE 115-*d*, as described with reference to FIG. 4. In some examples, the UE 115-*d* may receive one or more RRC messages, where each RRC message may include a respective CG-SDT configuration for use at the UE 115-*d*, and where the $N^{th}$ CG-SDT configuration may include and RRCRelease message with a SuspendConfig, as described with reference to FIG. 5.

At 620, the UE 115-*d* may transition out of the RRC connected state based on receiving the RRCRelease message with a SuspendConfig at 615.

At 625, the UE 115-*d* may transmit to the network device 105-*d* an initial CG-SDT message that includes at least one CCCH message using time and frequency resources associated with one or more of the CG-SDT configurations received at 615. The UE 115-*d* may determine which of the one or more CG-SDT configurations to use for the initial CG-SDT message based on a comparison of the respective time and frequency resources associated with each of the CG-SDT configurations.

At 630, the UE 115-*d* may receive from the network device 105-*d* a feedback message in response to the initial CG-SDT message. In some examples, the feedback message may include an ACK message (e.g., identified by the UE 115-*d* implicitly or explicitly) which may indicate to the UE 115-*d* successful reception of the initial CG-SDT message. Additionally or alternatively, the feedback message may include a DG (e.g., identified by the UE 115-*d* explicitly by monitoring a PDCCH configured by the network device 105-*d*) which may indicate to the UE 115-*d* that the network device 105-*d* did not receive the initial CG-SDT message. In some cases, the UE 115-*d* may use the DG to retransmit the initial CG-SDT message to the network device 105-*d*.

At 635, the UE 115-*d* may transmit subsequent CG-SDT data to the network device 105-*d* based on the feedback message including the ACK message at 630. In some examples, the UE 115-*d* may use the time and frequency resources associated with the multiple CG-SDT configurations to transmit the subsequent CG-SDT data.

At 640, the UE 115-*d* may receive a response to the subsequent CG-SDT data message which may include additional CG-SDT configurations while the UE 115-*d* is operating outside of the RRC connected state. In some examples, the network may include the additional CG-SDT configurations based on the quality parameters associated with receiving the subsequent CG-SDT data at 635. For example, the network device 105-*d* may determine that the channel quality associated with the subsequent CG-SDT data is below a configured quality threshold or that a buffer associated with the UE 115-*d* is above a configured threshold. As such, the network device may transmit the additional CG-SDT configurations to configure the UE 115-*d* with additional SDT resources. In some examples, the response message may be an RRC message indicating to change or amend the current CG-SDT configurations at the UE 115-*d*. In some examples, the UE 115-*d* may receive the response message by monitoring a PDCCH in a search space configured by the network device 105-*d* at 615.

Figure 7:
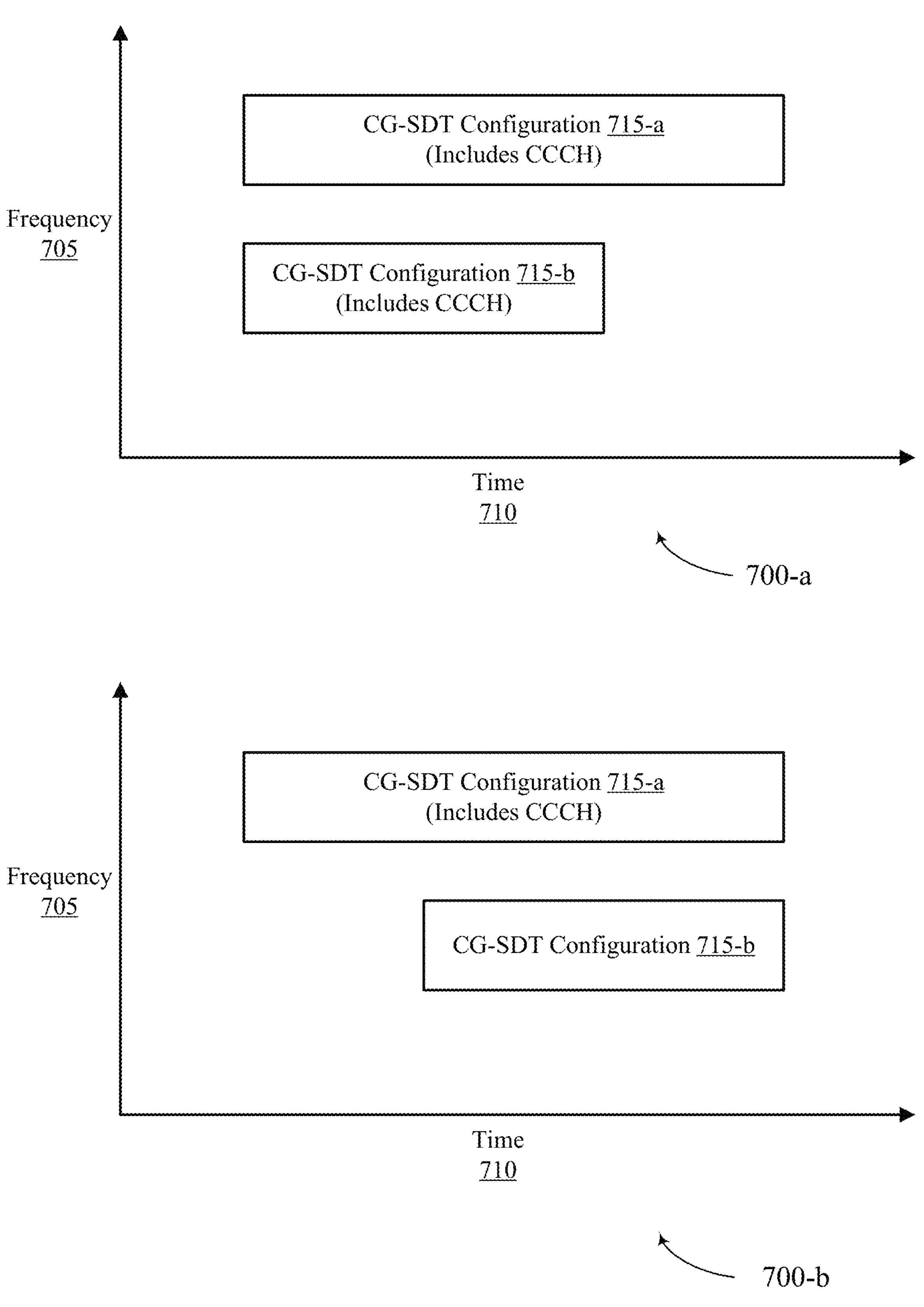
FIG. 7 illustrates an example of CG-SDT resource diagrams that support multiple CG-SDT configurations in accordance with aspects of the present disclosure.

FIG. 7 illustrates examples of CG-SDT resource diagrams 700-*a* and 700-*b* that support multiple CG-SDT configurations in accordance with aspects of the present disclosure. In some examples, the CG-SDT resource diagrams 700-*a* and 700-*b* may implement one or more aspects of the wireless communications systems 100 and 200, process flows 400 through 600, or a combination thereof. For instance, CG- SDT configurations 715-*a* and 715-*b* may be examples of CG-SDT configurations as described with reference to FIGS. 2 through 6. While examples are discussed herein, any number of devices and device types may be used to accomplish implementations described in the present disclosure. CG-SDT resource diagrams 700-*a* and 700-*b* may support techniques for a UE 115 to determine a set of resources to use for an initial CG-SDT message when the UE 115 is configured with multiple CG-SDT configurations 715.

Based on a UE 115 transitioning out of an RRC connected state, the UE 115 may determine to transmit an initial CG-SDT message that includes a CCCH to set up one or more SDT bearers and AS security token exchange and verification. As illustrated with reference to CG-SDT resource diagrams 700-*a* and 700-*b*, a network device 105 may configure a UE 115 with multiple CG-SDT configurations 715 (e.g., CG-SDT configurations 715-*a* and 715-*b*) with frequency 705 and time 710 resources that at least partially overlap in time 710. As such, the UE 115 may transmit an initial CG-SDT message to the network device 105 in accordance with the techniques described with reference to CG-SDT resource diagram 700-*a*, CG-SDT resource diagram 700-*b*, or both.

In accordance with the techniques described with reference to CG-SDT resource diagram 700-*a*, the UE 115 may determine to include a CCCH message in an initial CG-SDT transmission and associated retransmissions for both CG-SDT configurations 715-*a* and 715-*b*. As such, the initial CG-SDT transmissions for both CG-SDT configurations 715-*a* and 715-*b* may be associated with a same uplink HARQ process of CG-SDT. In some examples, the initial CG-SDT transmissions for both CG-SDT configurations 715-*a* and 715-*b* may include the same contents, where the contents is transmitted on the resources associated with the respective CG-SDT configuration.

In accordance with the techniques described with reference to CG-SDT resource diagram 700-*b*, the UE 115 may determine to include a CCCH message in an initial CG-SDT transmission and associated retransmissions for either the CG-SDT configuration 715-*a* or CG-SDT configuration 715-*b*, but may refrain from including a CCCH message in both. For example, as illustrated in CG-SDT resource diagram 700-*b*, the UE 115 determines to include the CCCH in the initial CG-SDT transmission associated with the CG-SDT configuration 715-*a* and refrains from including a CCCH in the initial CG-SDT transmission associated with the CG-SDT configuration 715-*b*. As such, the initial CG-SDT transmission associated with the CG-SDT configuration 715-*a* may be associated with a first uplink process of CG-SDT.

Figure 8:
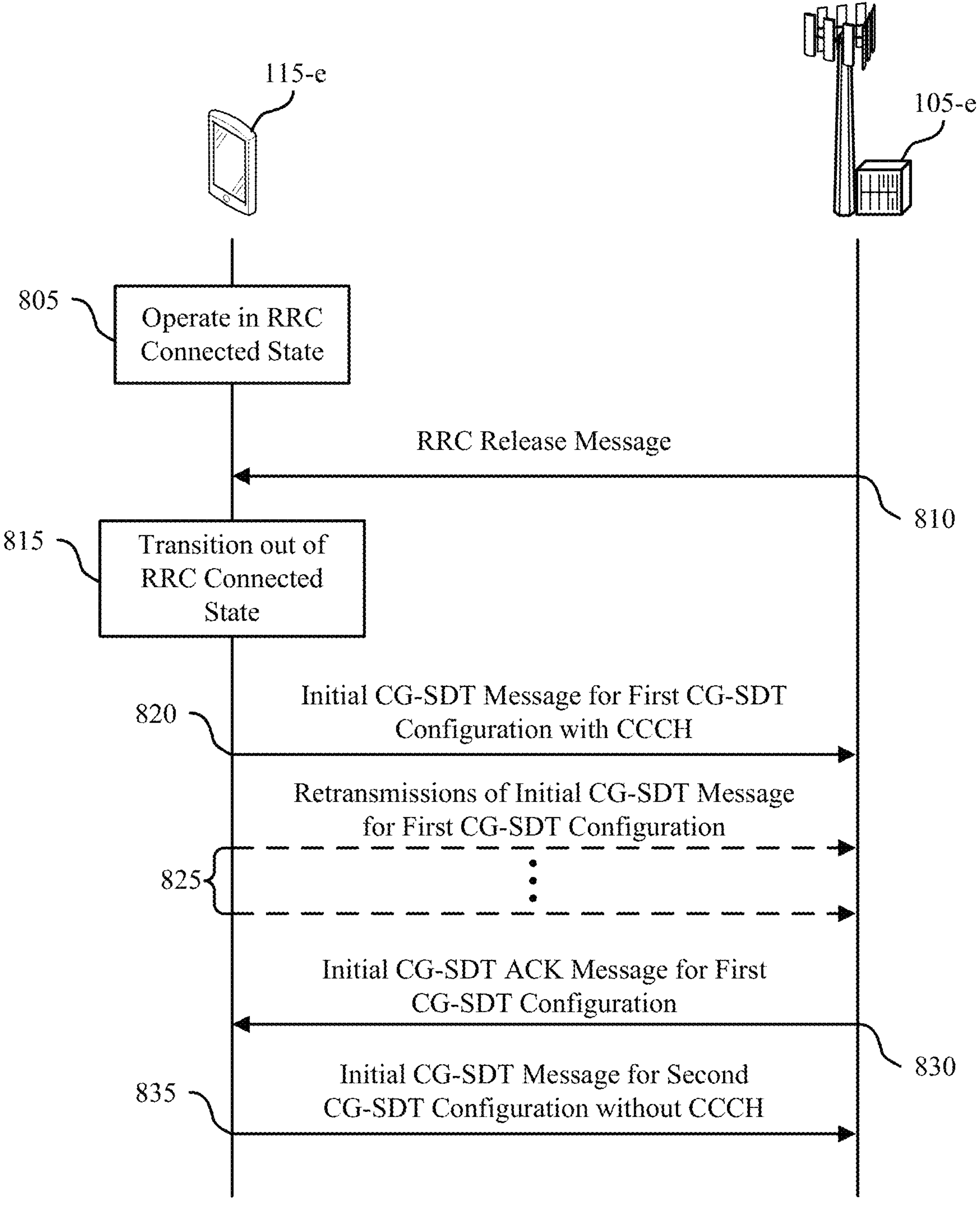
FIG. 8 illustrates an example of a process flow that supports multiple CG-SDT configurations in accordance with aspects of the present disclosure.

FIG. 8 illustrates an example of a process flow 800 that supports multiple CG-SDT configurations in accordance with aspects of the present disclosure. In some examples, the process flow 800 may implement one or more aspects of the wireless communications systems 100 and 200, process flows 400 through 600, or a combination thereof. Process flow 800 includes a UE 115-*e* and a network device 105-*e* which may be respective examples of a 115 and a network device 105, as described with reference to FIGS. 1 and 2. Alternative examples of the following may be implemented, where some steps are performed in a different order than described or are not performed at all. In some cases, steps may include additional features not mentioned below, or further steps may be added. In addition, while process flow 800 shows processes between a single UE 115 and a single network device 105, it should be understood that these processes may occur between any number of network devices and network device types.

At 805, the UE 115-*e* may operate in accordance with an RRC connected state. For example, while operating in the RRC connected state, the UE 115-*e* may transmit to the network device 105-*e*, uplink control information (e.g., via a PUCCH) and uplink data (e.g., via a PUSCH). Additionally or alternatively, the UE 115-*e* may also receive from the network device 105-*e*, downlink control data (e.g., via a PDCCH) and downlink data (e.g., via a PDSCH).

At 810, the UE 115-*e* may receive from the network device 105-*e* an RRCRelease message with a SuspendConfig. In some examples, the UE 115-*e* may receive the RRCRelease message in at least one RRC message that includes one or more CG-SDT configurations for use at the UE 115-*e* in accordance with the techniques described herein, including with reference to FIGS. 4 through 6.

At 815, the UE 115-*e* may transition out of the RRC connected state based on receiving the RRCRelease message at 810.

At 820, the UE 115-*e* may transmit a first initial CG-SDT message for a first CG-SDT configuration that includes a CCCH message. In some examples, the UE 115-*e* may transmit the initial CG-SDT using time and frequency resources associated with a first CG-SDT configuration.

At 825, if the UE 115-*e* does not receive a feedback message in response to the initial CG-SDT message transmitted at 820, the UE 115-*e* may perform one or more retransmissions of the first initial CG-SDT message for the first CG-SDT configuration that includes the CCCH message. In some examples, the UE 115-*e* may continue to retransmit the first initial CG-SDT message until the UE 115-*e* receive an ACK feedback message in response.

At 830, the UE 115-*e* may receive the ACK feedback message in response to transmitting the first initial CG-SDT message.

At 835, the UE 115-*e* may transmit a second CG-SDT message without a CCCH message using time and frequency resources associated with a second CG-SDT configuration. The UE 115-*e* may refrain from including the CCCH message in the second CG-SDT message based on receiving the ACK feedback message in response to transmitting the first initial CG-SDT message.

Figure 9:
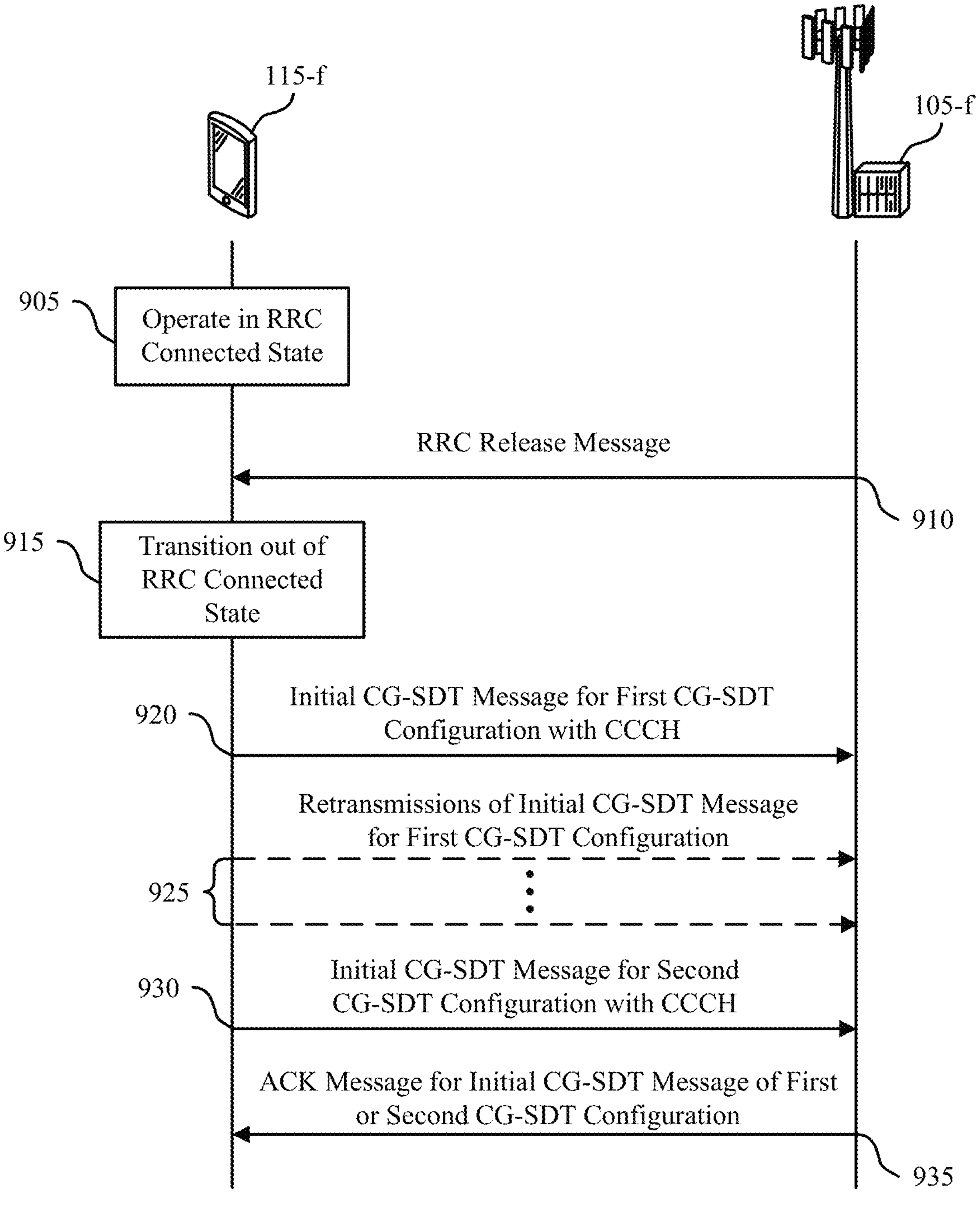
FIG. 9 illustrates an example of a process flow that supports multiple CG-SDT configurations in accordance with aspects of the present disclosure.

FIG. 9 illustrates an example of a process flow 900 that supports multiple CG-SDT configurations in accordance with aspects of the present disclosure. In some examples, the process flow 800 may implement one or more aspects of the wireless communications systems 100 and 200, process flows 400 through 600, or a combination thereof. Process flow 900 includes a UE 115-*f* and a network device 105-*f* which may be respective examples of a 115 and a network device 105, as described with reference to FIGS. 1 and 2. Alternative examples of the following may be implemented, where some steps are performed in a different order than described or are not performed at all. In some cases, steps may include additional features not mentioned below, or further steps may be added. In addition, while process flow 900 shows processes between a single UE 115 and a single network device 105, it should be understood that these processes may occur between any number of network devices and network device types.

At 905, the UE 115-*f* may operate in accordance with an RRC connected state. For example, while operating in the RRC connected state, the UE 115-*f* may transmit to the network device 105-*f*, uplink control information (e.g., via a PUCCH) and uplink data (e.g., via a PUSCH). Additionally or alternatively, the UE 115-*f* may also receive from the network device 105-*f*, downlink control data (e.g., via a PDCCH) and downlink data (e.g., via a PDSCH).

At 910, the UE 115-*f* may receive from the network device 105-*f* an RRCRelease message with a SuspendConfig. In some examples, the UE 115-*f* may receive the RRCRelease message in at least one RRC message that includes one or more CG-SDT configurations for use at the UE 115-*f* in accordance with the techniques described herein, including with reference to FIGS. 4 through 6.

At 915, the UE 115-*f* may transition out of the RRC connected state based on receiving the RRCRelease message at 910.

At 920, the UE 115-*f* may transmit a first initial CG-SDT message for a first CG-SDT configuration that includes a CCCH message. In some examples, the UE 115-*f* may transmit the initial CG-SDT using time and frequency resources associated with a first CG-SDT configuration.

At 925, if the UE 115-*f* does not receive a feedback message in response to the initial CG-SDT message transmitted at 920, the UE 115-*f* may perform one or more retransmissions of the first initial CG-SDT message for the first CG-SDT configuration that includes the CCCH message. In some examples, the UE 115-*f* may continue to retransmit the first initial CG-SDT message until the UE 115-*f* receive an ACK feedback message in response.

At 930, the UE 115-*f* may transmit a second initial CG-SDT message with a CCCH message using time and frequency resources associated with a second CG-SDT configuration. In some examples, the UE 115-*f* may include the CCCH message in the second CG-SDT message based on not receiving the ACK feedback message in response to transmitting the first initial CG-SDT message. In some examples, the UE 115-*f* may include the CCCH message in the second CG-SDT message independent of receiving the ACK feedback message in response to transmitting the first initial CG-SDT message.

At 935, the UE 115-*f* may receive the ACK feedback message in response to the first initial CG-SDT message, the second initial CG-SDT message, or both.

Figure 10:
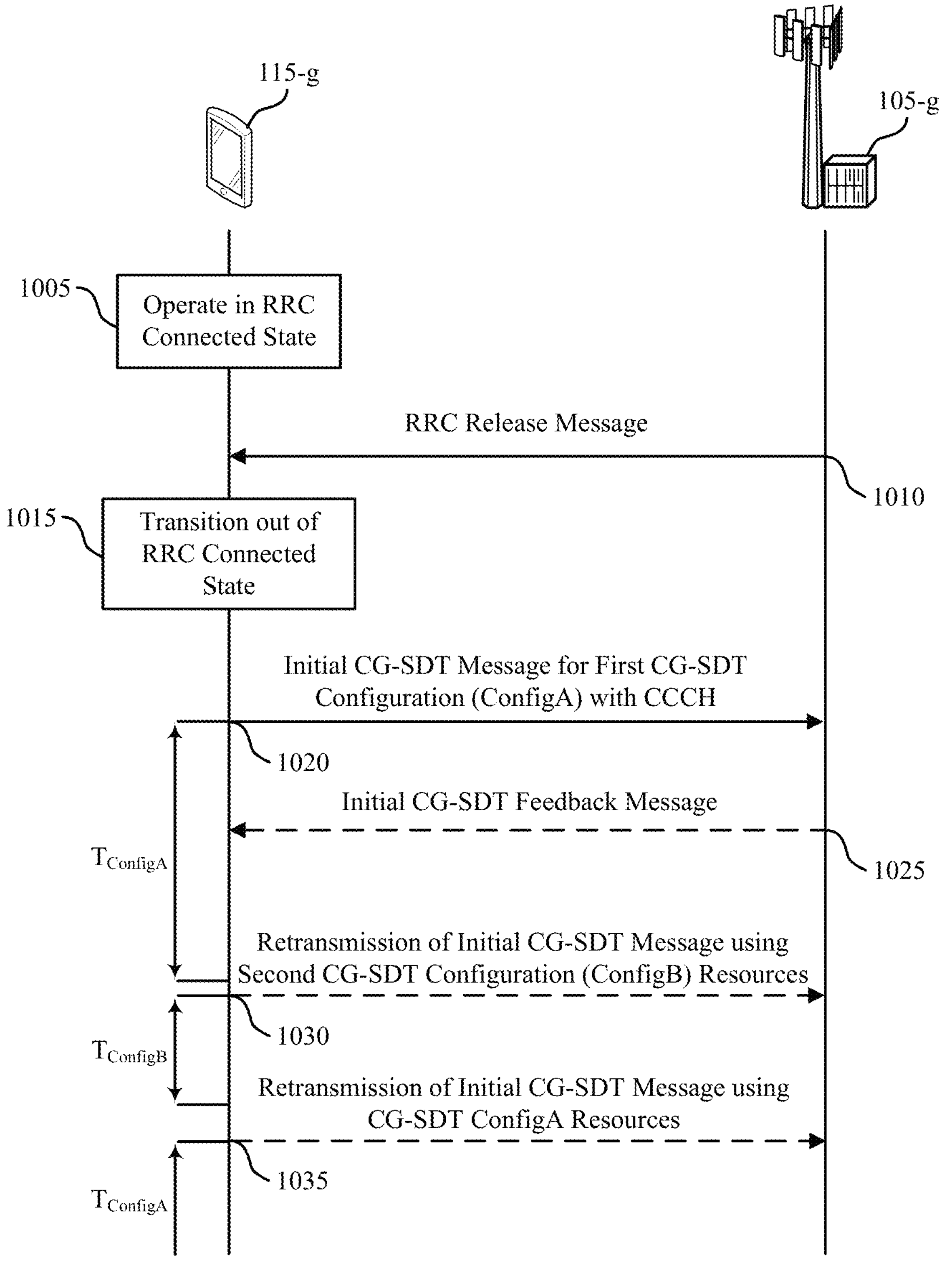
FIG. 10 illustrates an example of a process flow that supports multiple CG-SDT configurations in accordance with aspects of the present disclosure.

FIG. 10 illustrates an example of a process flow 1000 that supports multiple CG-SDT configurations in accordance with aspects of the present disclosure. In some examples, the process flow 1000 may implement one or more aspects of the wireless communications systems 100 and 200, process flows 400 through 600, or a combination thereof. Process flow 1000 includes a UE 115-*g* and a network device 105-*g* which may be respective examples of a UE 115 and a network device 105, as described with reference to FIGS. 1 and 2. Alternative examples of the following may be implemented, where some steps are performed in a different order than described or are not performed at all. In some cases, steps may include additional features not mentioned below, or further steps may be added. In addition, while process flow 1000 shows processes between a single UE 115 and a single network device 105, it should be understood that these processes may occur between any number of network devices and network device types.

At 1005, the UE 115-*g* may operate in accordance with an RRC connected state. For example, while operating in the RRC connected state, the UE 115-*g* may transmit to the network device 105-*g*, uplink control information (e.g., via a PUCCH) and uplink data (e.g., via a PUSCH). Additionally or alternatively, the UE 115-*g* may also receive from the network device 105-*g*, downlink control data (e.g., via a PDCCH) and downlink data (e.g., via a PDSCH).

At 1010, the UE 115-*g* may receive from the network device 105-*g* an RRCRelease message with a SuspendConfig. In some examples, the UE 115-*g* may receive the RRCRelease message in at least one RRC message that includes one or more CG-SDT configurations for use at the UE 115-*g* in accordance with the techniques described herein, including with reference to FIGS. 4 through 6.

At 1015, the UE 115-*g* may transition out of the RRC connected state based on receiving the RRCRelease message at 1010.

At 1020, the UE 115-*g* may transmit an initial CG-SDT message for a first CG-SDT configuration that includes a CCCH message. In some examples, when multiple HARQ processes are configured for CG-SDT at the UE 115-*g*, the UE 115-*g* may refrain from triggering multiple HARQ processes in the transmission and retransmission phase of the initial CG-SDT message with CCCH. As such, the HARQ processes associated with subsequent CG-SDT data may not start before the UE 115-*g* receives ACK feedback for the initial CG-SDT message with CCCH.

At 1025, the UE 115-*g* may receive a feedback message in response to the initial CG-SDT message at 1020. For instance, the feedback message may be an example of an ACK message (e.g., the UE 115-*g* identifies implicitly or explicitly) that indicates successful reception for the initial CG-SDT message including the CCCH at the network device 105-*g*. Additionally or alternatively, the feedback message may include a DG for use at the UE 115-*g* in a retransmission of the initial CG-SDT message. In some examples, however, the UE 115-*g* may not receive a feedback message during a defined duration of time. For example, the RRCRelease message at 1010 may include one or more RRC configured windows associated with respective CG-SDT configurations (e.g., $T_{ConfigA}$ and $T_{ConfigB}$), during which the UE 115-*g* may monitor a PDCCH configured by the network device 105-*g* for the feedback message.

If the UE 115-*g* does not receive a feedback message during the RRC configured window associated with the initial CG-SDT message (e.g., $T_{ConfigA}$), at 1030 the UE 115-*g* may retransmit the initial CG-SDT message. In some cases, the UE 115-*g* may retransmit the initial CG-SDT message autonomously using next available and valid CG-SDT resources after $T_{ConfigA}$ expires. For example, as illustrated in FIG. 10, at 1030 the UE 115-*g* may retransmit the initial CG-SDT message associated with the first CG-SDT configuration using resources associated with a second CG-SDT configuration (e.g., ConfigB). As such, the UE 115-*g* may retransmit the initial CG-SDT message and start the RRC configured window associated with the CG-SDT resources used (e.g., $T_{ConfigB}$).

If the UE 115-*g* does not receive a feedback message during $T_{ConfigB}$, at 1035 the UE 115-*g* may retransmit the initial CG-SDT message autonomously using next available and valid CG-SDT resources after $T_{ConfigB}$ expires. For example, as illustrated in FIG. 10, at 1035 the UE 115-*g* may retransmit the initial CG-SDT message associated with the first CG-SDT configuration using resources associated with the first CG-SDT configuration. As such, the UE 115-*g* may retransmit the initial CG-SDT message and start the RRC configured window associated with the CG-SDT resources used (e.g., $T_{ConfigA}$) The techniques described herein may also be generalized to subsequent CG-SDT data transmissions that may not include a CCCH message if the UE 115-*g* has received an ACK message for the initial CG-SDT message.

Figure 11:
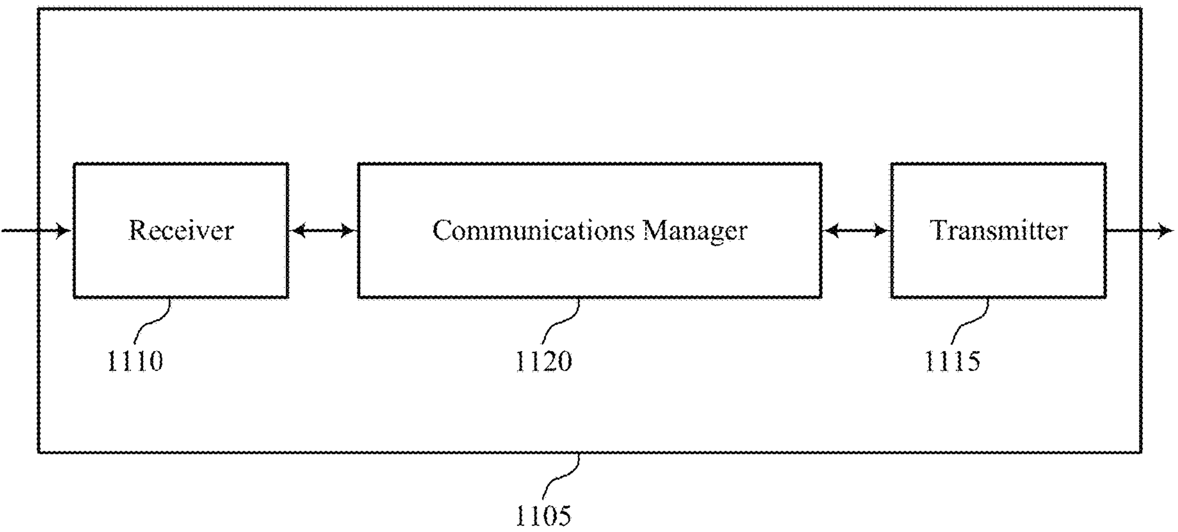
FIGS. 11 and 12 show block diagrams of devices that support multiple CG-SDT configurations in accordance with aspects of the present disclosure.

FIG. 11 shows a block diagram 1100 of a device 1105 that supports multiple configured grant small data transmission configurations in accordance with aspects of the present disclosure. The device 1105 may be an example of aspects of a UE 115 as described herein. The device 1105 may include a receiver 1110, a transmitter 1115, and a communications manager 1120. The device 1105 may also include at least one processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to multiple configured grant small data transmission configurations). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to multiple configured grant small data transmission configurations). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of multiple configured grant small data transmission configurations as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include at least one processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, at least one processor and memory coupled with the at least one processor may be configured to perform one or more of the functions described herein (e.g., by executing, by the at least one processor, instructions stored in the memory).

Additionally or alternatively, in some examples, the communications manager 1120, the receiver 1110, the transmitter 1115, or various combinations or components thereof may be implemented in code (e.g., as communications management software) executed by at least one processor. If implemented in code executed by at least one processor, the functions of the communications manager 1120, the receiver 1110, the transmitter 1115, or various combinations or components thereof may be performed by a general-purpose processor, a DSP, a central processing unit (CPU), a graphics processing unit (GPU), an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

For example, the communications manager 1120 may be configured as or otherwise support a means for receiving one or more downlink messages that collectively indicate a set of multiple configured grant small data transmission configurations and a configuration for a downlink bandwidth part and an uplink bandwidth part for configured grant small data transmissions, each of the set of multiple configured grant small data transmission configurations being associated with respective time and frequency resources in the downlink bandwidth part and the uplink bandwidth part. The communications manager 1120 may be configured as or otherwise support a means for transitioning out of a radio resource control connected state based on receiving at least one of the one or more downlink messages. The communications manager 1120 may be configured as or otherwise support a means for transmitting an initial configured grant small data transmission that includes at least one common control channel message using time and frequency resources associated with one or more of the set of multiple configured grant small data transmission configurations in the uplink bandwidth part, the one or more of the set of multiple configured grant small data transmission configurations determined based on a comparison of the respective time and frequency resources associated with the set of multiple configured grant small data transmission configurations. The communications manager 1120 may be configured as or otherwise support a means for monitoring for a response to the initial configured grant small data transmission in the downlink bandwidth part.

By including or configuring the communications manager 1120 in accordance with examples as described herein, the device 1105 (e.g., at least one processor controlling or otherwise coupled to the receiver 1110, the transmitter 1115, the communications manager 1120, or a combination thereof) may support techniques for improved communications between network devices for CG-SDT which may reduce processing, reduce power consumption, result in a more efficient utilization of communication resources, increase spectral efficiency, and reduce signaling overhead.

Figure 12:
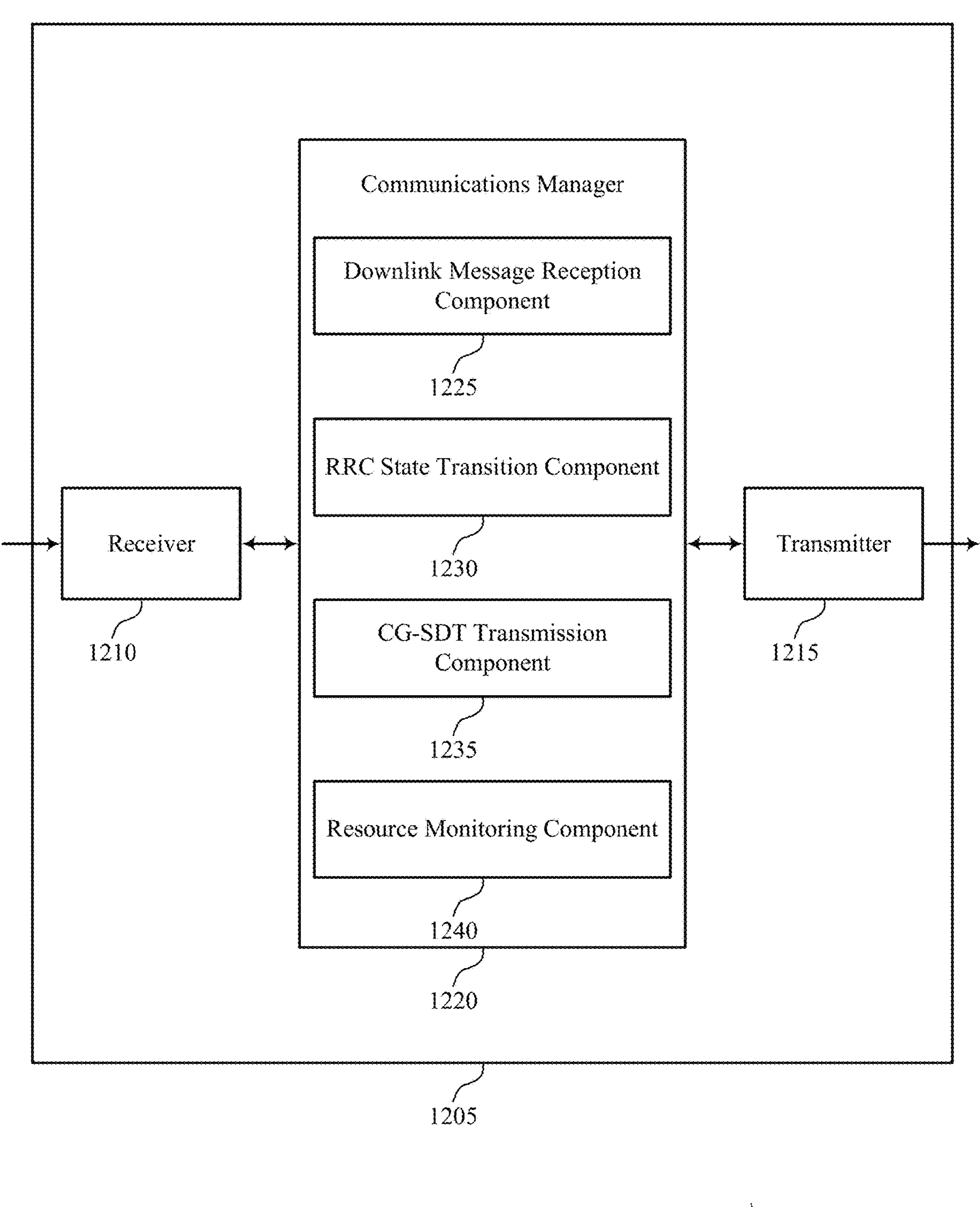

FIG. 12 shows a block diagram 1200 of a device 1205 that supports multiple configured grant small data transmission configurations in accordance with aspects of the present disclosure. The device 1205 may be an example of aspects of a device 1105 or a UE 115 as described herein. The device 1205 may include a receiver 1210, a transmitter 1215, and a communications manager 1220. The device 1205 may also include at least one processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to multiple configured grant small data transmission configurations). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to multiple configured grant small data transmission configurations). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of multiple configured grant small data transmission configurations as described herein. For example, the communications manager 1220 may include a downlink message reception component 1225, an RRC state transition component 1230, a CG-SDT transmission component 1235, a resource monitoring component 1240, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The downlink message reception component 1225 may be configured as or otherwise support a means for receiving one or more downlink messages that collectively indicate a set of multiple configured grant small data transmission configurations and a configuration for a downlink bandwidth part and an uplink bandwidth part for configured grant small data transmissions, each of the set of multiple configured grant small data transmission configurations being associated with respective time and frequency resources in the downlink bandwidth part and the uplink bandwidth part. The RRC state transition component 1230 may be configured as or otherwise support a means for transitioning out of a radio resource control connected state based on receiving at least one of the one or more downlink messages. The CG-SDT transmission component 1235 may be configured as or otherwise support a means for transmitting an initial configured grant small data transmission that includes at least one common control channel message using time and frequency resources associated with one or more of the set of multiple configured grant small data transmission configurations in the uplink bandwidth part, the one or more of the set of multiple configured grant small data transmission configurations determined based on a comparison of the respective time and frequency resources associated with the set of multiple configured grant small data transmission configurations. The resource monitoring component 1240 may be configured as or otherwise support a means for monitoring for a response to the initial configured grant small data transmission in the downlink bandwidth part.

Figure 13:
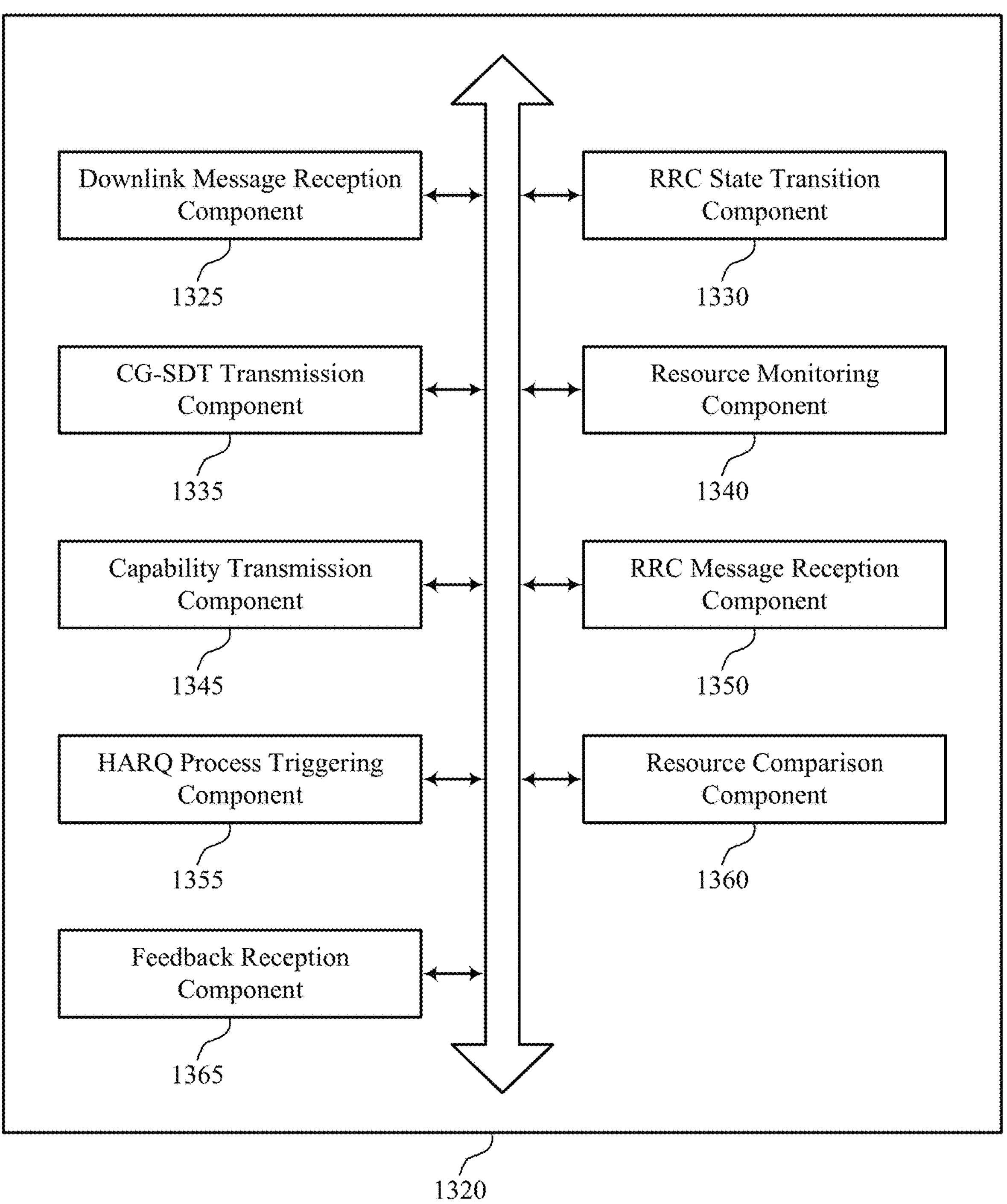
FIG. 13 shows a block diagram of a communications manager that supports multiple CG-SDT configurations in accordance with aspects of the present disclosure.

FIG. 13 shows a block diagram 1300 of a communications manager 1320 that supports multiple configured grant small data transmission configurations in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of multiple configured grant small data transmission configurations as described herein. For example, the communications manager 1320 may include a downlink message reception component 1325, an RRC state transition component 1330, a CG-SDT transmission component 1335, a resource monitoring component 1340, a capability transmission component 1345, an RRC message reception component 1350, an HARQ process triggering component 1355, a resource comparison component 1360, a feedback reception component 1365, or any combination thereof. Each of these components may communicate, directly or indirectly, with one another (e.g., via one or more buses).

The downlink message reception component 1325 may be configured as or otherwise support a means for receiving one or more downlink messages that collectively indicate a set of multiple configured grant small data transmission configurations and a configuration for a downlink bandwidth part and an uplink bandwidth part for configured grant small data transmissions, each of the set of multiple configured grant small data transmission configurations being associated with respective time and frequency resources in the downlink bandwidth part and the uplink bandwidth part. The RRC state transition component 1330 may be configured as or otherwise support a means for transitioning out of a radio resource control connected state based on receiving at least one of the one or more downlink messages. The CG-SDT transmission component 1335 may be configured as or otherwise support a means for transmitting an initial configured grant small data transmission that includes at least one common control channel message using time and frequency resources associated with one or more of the set of multiple configured grant small data transmission configurations in the uplink bandwidth part, the one or more of the set of multiple configured grant small data transmission configurations determined based on a comparison of the respective time and frequency resources associated with the set of multiple configured grant small data transmission configurations. The resource monitoring component 1340 may be configured as or otherwise support a means for monitoring for a response to the initial configured grant small data transmission in the downlink bandwidth part.

In some examples, the capability transmission component 1345 may be configured as or otherwise support a means for transmitting a UE capability message indicating support for multiple configured grant small data transmission configurations before transitioning out of the radio resource control connected state, where receiving the one or more downlink messages is based on transmitting the UE capability message.

In some examples, to support receiving the one or more downlink messages, the RRC message reception component 1350 may be configured as or otherwise support a means for receiving a radio resource control message including the set of multiple configured grant small data transmission configurations and a radio resource control release message.

In some examples, to support receiving the one or more downlink messages, the RRC message reception component 1350 may be configured as or otherwise support a means for receiving multiple radio resource control messages, where each radio resource control message of the multiple radio resource control messages includes a respective configured grant small data transmission configuration of the set of multiple configured grant small data transmission configurations, and where a last of the multiple radio resource control messages includes a radio resource control release message.

In some examples, to support receiving the one or more downlink messages, the RRC state transition component 1330 may be configured as or otherwise support a means for receiving a first radio resource control message including a configured grant small data transmission configuration from the set of multiple configured grant small data transmission configurations and also including a radio resource control release message. In some examples, to support receiving the one or more downlink messages, the RRC message reception component 1350 may be configured as or otherwise support a means for receiving one or more additional radio resource control messages including each remaining configured grant small data transmission configuration from the set of multiple configured grant small data transmission configurations after the UE transitions out of the radio resource control connected state.

In some examples, to support transmitting the initial configured grant small data transmission that includes the at least one common control channel message, the CG-SDT transmission component 1335 may be configured as or otherwise support a means for transmitting an indication of one or more small data transmission bearers, UE assistance information for a configured grant, a buffer status report, a power head room report, a measurements report, a request for on-demand delivery of system information or modified system information, a request for on-demand transmission of downlink reference signals, a request for a paging restriction, an access stratum security token exchange, an access stratum security verification, or a combination thereof, to be used for transmission of a remainder of the configured grant small data transmissions.

In some examples, to support receiving the one or more downlink messages, the downlink message reception component 1325 may be configured as or otherwise support a means for receiving the one or more downlink messages that collectively indicate the set of multiple configured grant small data transmission configurations and the configuration for the downlink bandwidth part and the uplink bandwidth part for the configured grant small data transmissions prior to the UE transitioning out of the radio resource control connected state.

In some examples, the downlink message reception component 1325 may be configured as or otherwise support a means for receiving a configuration for control resource sets and search space sets for use in monitoring a physical downlink control channel on the downlink bandwidth part. In some examples, the downlink message reception component 1325 may be configured as or otherwise support a means for receiving an indication to reduce an occurrence of radio resource measurements associated with radio resource management. In some examples, the downlink message reception component 1325 may be configured as or otherwise support a means for receiving configurations for one or more of downlink reference signals, downlink small data via unicast or multicast, paging early indications, or discontinuous reception.

In some examples, to support transmitting the initial configured grant small data transmission, the resource comparison component 1360 may be configured as or otherwise support a means for determining that the respective time and frequency resources associated with two or more of the set of multiple configured grant small data transmission configurations overlap for transmission of the initial configured grant small data transmission. In some examples, to support transmitting the initial configured grant small data transmission, the CG-SDT transmission component 1335 may be configured as or otherwise support a means for transmitting a set of multiple initial configured grant small data transmissions on the respective time and frequency resources corresponding to the two or more of the set of multiple configured grant small data transmission configurations, each of the set of multiple initial configured grant small data transmissions being associated with a same uplink hybrid automatic repeat request process.

In some examples, to support transmitting the initial configured grant small data transmission, the resource comparison component 1360 may be configured as or otherwise support a means for determining that the respective time and frequency resources associated with two or more of the set of multiple configured grant small data transmission configurations overlap for transmission of the initial configured grant small data transmission. In some examples, to support transmitting the initial configured grant small data transmission, the CG-SDT transmission component 1335 may be configured as or otherwise support a means for transmitting the initial configured grant small data transmission on only one of the respective time and frequency resources corresponding to the two or more of the set of multiple configured grant small data transmission configurations, the initial configured grant small data transmission being associated with a first uplink hybrid automatic repeat request process.

In some examples, to support transmitting the initial configured grant small data transmission, the resource comparison component 1360 may be configured as or otherwise support a means for determining that the respective time and frequency resources associated with the set of multiple configured grant small data transmission configurations do not overlap for transmission of the initial configured grant small data transmission. In some examples, to support transmitting the initial configured grant small data transmission, the CG-SDT transmission component 1335 may be configured as or otherwise support a means for transmitting the initial configured grant small data transmission using time and frequency resources associated with a first configured grant small data transmission configuration of the set of multiple configured grant small data transmission configurations. In some examples, to support transmitting the initial configured grant small data transmission, the feedback reception component 1365 may be configured as or otherwise support a means for receiving an acknowledgment feedback message in response to transmitting the initial configured grant small data transmission. In some examples, to support transmitting the initial configured grant small data transmission, the CG-SDT transmission component 1335 may be configured as or otherwise support a means for transmitting a second initial configured grant small data transmission without a common control channel message using time and frequency resources associated with a second configured grant small data transmission configuration of the set of multiple configured grant small data transmission configurations based on receiving the acknowledgment feedback message.

In some examples, to support transmitting the initial configured grant small data transmission, the resource comparison component 1360 may be configured as or otherwise support a means for determining that the respective time and frequency resources associated with the set of multiple configured grant small data transmission configurations do not overlap for transmission of the initial configured grant small data transmission. In some examples, to support transmitting the initial configured grant small data transmission, the CG-SDT transmission component 1335 may be configured as or otherwise support a means for transmitting the initial configured grant small data transmission using time and frequency resources associated with a first configured grant small data transmission configuration of the set of multiple configured grant small data transmission configurations. In some examples, to support transmitting the initial configured grant small data transmission, the feedback reception component 1365 may be configured as or otherwise support a means for failing to receive an acknowledgment feedback message in response to transmitting the initial configured grant small data transmission. In some examples, to support transmitting the initial configured grant small data transmission, the CG-SDT transmission component 1335 may be configured as or otherwise support a means for transmitting a second initial configured grant small data transmission with a second common control channel message using time and frequency resources associated with a second configured grant small data transmission configuration of the set of multiple configured grant small data transmission configurations based on failing to receive the acknowledgment feedback message.

In some examples, to support transmitting the initial configured grant small data transmission, the resource comparison component 1360 may be configured as or otherwise support a means for determining that the respective time and frequency resources associated with the set of multiple configured grant small data transmission configurations do not overlap for transmission of the initial configured grant small data transmission. In some examples, to support transmitting the initial configured grant small data transmission, the CG-SDT transmission component 1335 may be configured as or otherwise support a means for transmitting the initial configured grant small data transmission using time and frequency resources associated with a first configured grant small data transmission configuration of the set of multiple configured grant small data transmission configurations. In some examples, to support transmitting the initial configured grant small data transmission, the CG-SDT transmission component 1335 may be configured as or otherwise support a means for transmitting a second initial configured grant small data transmission that includes a second common control channel message using time and frequency resources associated with a second configured grant small data transmission configuration of the set of multiple configured grant small data transmission configurations.

In some examples, the HARQ process triggering component 1355 may be configured as or otherwise support a means for triggering only a single hybrid automatic repeat request processes associated with transmission of the initial configured grant small data transmission, even if different hybrid automatic repeat request processes are associated with the set of multiple configured grant small data transmission configurations.

In some examples, the CG-SDT transmission component 1335 may be configured as or otherwise support a means for refraining from transmitting additional configured grant small data transmissions after transmitting the initial configured grant small data transmission in an absence of receiving an acknowledgment message for the initial configured grant small data transmission.

In some examples, the CG-SDT transmission component 1335 may be configured as or otherwise support a means for retransmitting the initial configured grant small data transmission based on not receiving a feedback message during a radio resource control configured window associated with the initial configured grant small data transmission, the feedback message including either an acknowledgment message associated with the initial configured grant small data transmission or a dynamic retransmission grant.

In some examples, to support retransmitting the initial configured grant small data transmission, the CG-SDT transmission component 1335 may be configured as or otherwise support a means for retransmitting the initial configured grant small data transmission using a next available and valid time and frequency resources associated with the set of multiple configured grant small data transmission configurations based on each of the set of multiple configured grant small data transmission configurations being associated with a same small data transmission bearer.

In some examples, the set of multiple configured grant small data transmission configurations are associated with a same small data transmission bearer or different small data transmission bearers.

In some examples, to support transitioning out of the radio resource control connected state, the RRC state transition component 1330 may be configured as or otherwise support a means for transitioning into a radio resource control inactive state or a radio resource control idle state.

In some examples, the at least one common control channel message indicates a radio resource control resume request message.

Figure 14:
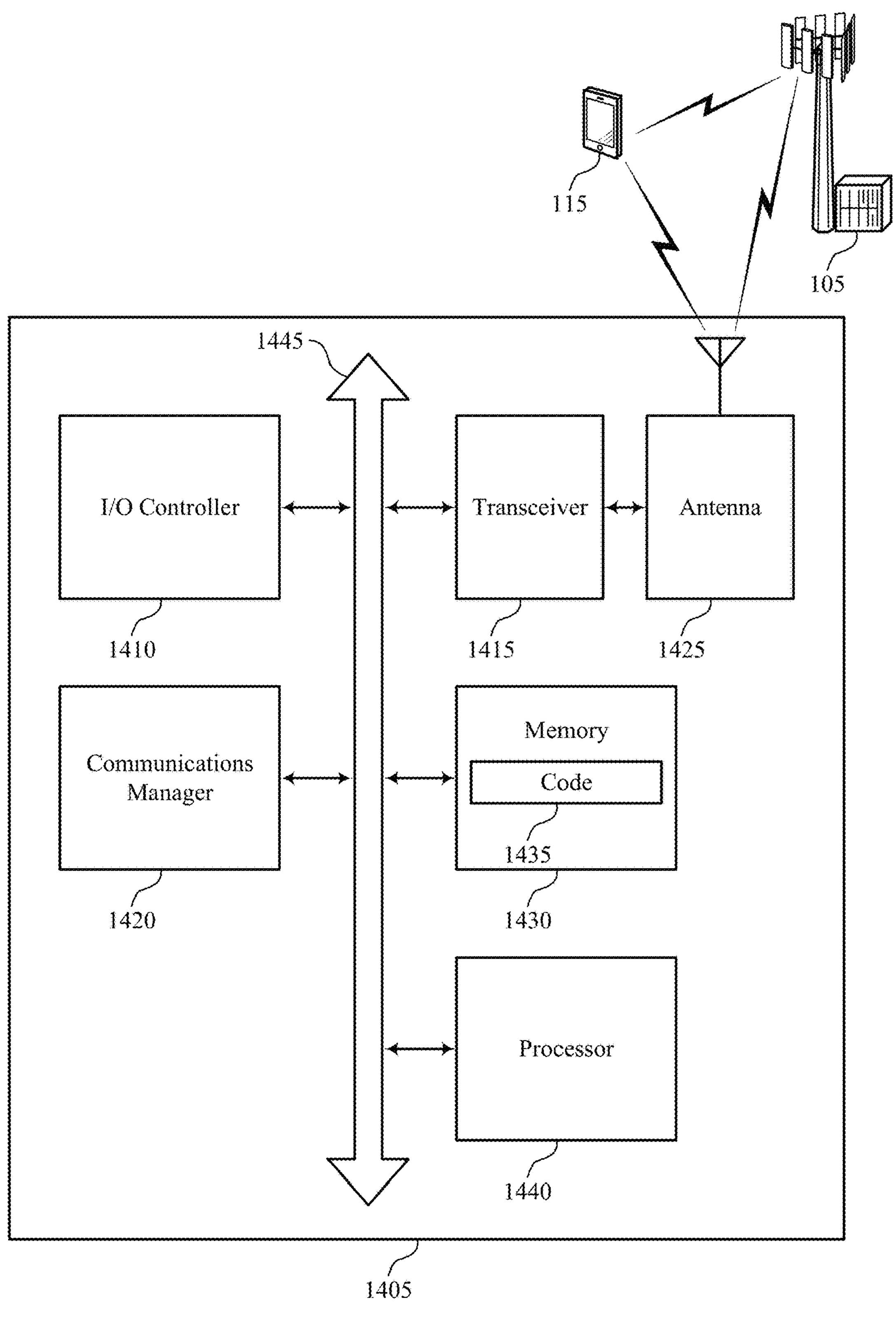
FIG. 14 shows a diagram of a system including a device that supports multiple CG-SDT configurations in accordance with aspects of the present disclosure.

FIG. 14 shows a diagram of a system 1400 including a device 1405 that supports multiple configured grant small data transmission configurations in accordance with aspects of the present disclosure. The device 1405 may be an example of or include the components of a device 1105, a device 1205, or a UE 115 as described herein. The device 1405 may communicate wirelessly with one or more network devices 105, UEs 115, or any combination thereof. The device 1405 may include components for bi-directional voice and data communications including components for transmitting and receiving communications, such as a communications manager 1420, an input/output (I/O) controller 1410, a transceiver 1415, an antenna 1425, a memory 1430, code 1435, and at least one processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. Additionally or alternatively, the I/O controller 1410 may represent or interact with a modem, a keyboard, a mouse, a touchscreen, or a similar device. In some cases, the I/O controller 1410 may be implemented as part of at least one processor, such as the at least one processor 1440. In some cases, a user may interact with the device 1405 via the I/O controller 1410 or via hardware components controlled by the I/O controller 1410.

In some cases, the device 1405 may include a single antenna 1425. However, in some other cases, the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include random access memory (RAM) and read-only memory (ROM). The memory 1430 may store computer-readable, computer-executable code 1435 including instructions that, when executed by the at least one processor 1440, cause the device 1405 to perform various functions described herein. The code 1435 may be stored in a non-transitory computer-readable medium such as system memory or another type of memory. In some cases, the code 1435 may not be directly for the at least one processor 1440 but may cause a computer (e.g., when compiled and executed) to perform functions described herein. In some cases, the memory 1430 may contain, among other things, a basic I/O system (BIOS) which may control basic hardware or software operation such as the interaction with peripheral components or devices.

The processor 1440 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the at least one processor 1440 may be configured to operate a memory array using a memory controller. In some other cases, a memory controller may be integrated into the at least one processor 1440. The processor 1440 may be configured to execute computer-readable instructions stored in a memory (e.g., the memory 1430) to cause the device 1405 to perform various functions (e.g., functions or tasks supporting multiple configured grant small data transmission configurations). For example, the device 1405 or a component of the device 1405 may include at least one processor 1440 and memory 1430 coupled with or to the at least one processor 1440, the at least one processor 1440 and memory 1430 configured to perform various functions described herein.

For example, the communications manager 1420 may be configured as or otherwise support a means for receiving one or more downlink messages that collectively indicate a set of multiple configured grant small data transmission configurations and a configuration for a downlink bandwidth part and an uplink bandwidth part for configured grant small data transmissions, each of the set of multiple configured grant small data transmission configurations being associated with respective time and frequency resources in the downlink bandwidth part and the uplink bandwidth part. The communications manager 1420 may be configured as or otherwise support a means for transitioning out of a radio resource control connected state based on receiving at least one of the one or more downlink messages. The communications manager 1420 may be configured as or otherwise support a means for transmitting an initial configured grant small data transmission that includes at least one common control channel message using time and frequency resources associated with one or more of the set of multiple configured grant small data transmission configurations in the uplink bandwidth part, the one or more of the set of multiple configured grant small data transmission configurations determined based on a comparison of the respective time and frequency resources associated with the set of multiple configured grant small data transmission configurations. The communications manager 1420 may be configured as or otherwise support a means for monitoring for a response to the initial configured grant small data transmission in the downlink bandwidth part.

By including or configuring the communications manager 1420 in accordance with examples as described herein, the device 1405 may support techniques for improved communications between network devices for CG-SDT which may improve communication reliability, reduce latency, improve user experience related to reduced processing, reduce power consumption, result in a more efficient utilization of communication resources, improve coordination between devices, increase battery life, increase spectral efficiency, and reduce signaling overhead.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the at least one processor 1440, the memory 1430, the code 1435, or any combination thereof. For example, the code 1435 may include instructions for the at least one processor 1440 to cause the device 1405 to perform various aspects of multiple configured grant small data transmission configurations as described herein, or the at least one processor 1440 and the memory 1430 may be otherwise configured to perform or support such operations.

Figure 15:
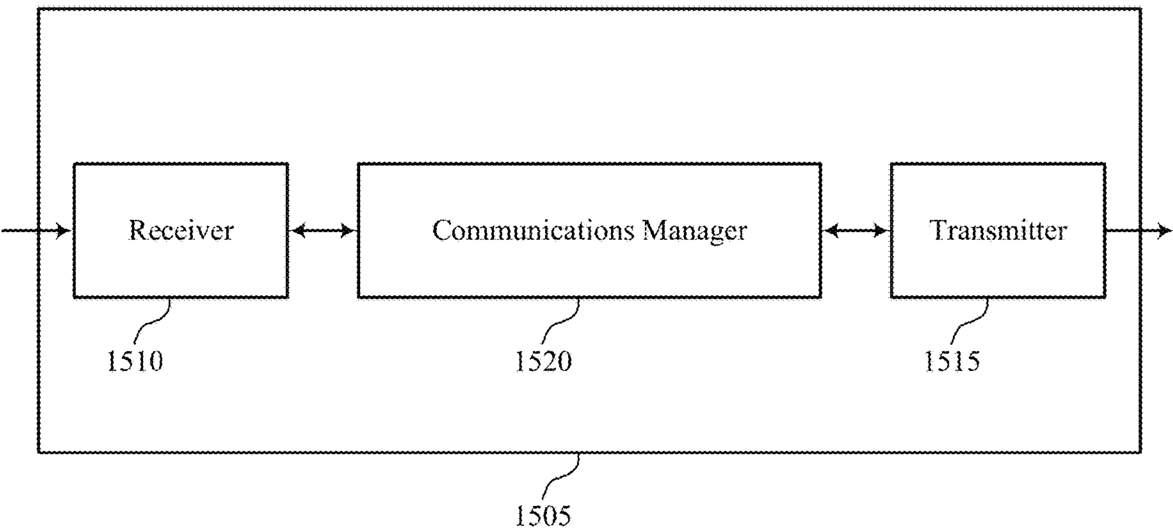
FIGS. 15 and 16 show block diagrams of devices that support multiple CG-SDT configurations in accordance with aspects of the present disclosure.

FIG. 15 shows a block diagram 1500 of a device 1505 that supports multiple configured grant small data transmission configurations in accordance with aspects of the present disclosure. The device 1505 may be an example of aspects of a network device 105 as described herein. The device 1505 may include a receiver 1510, a transmitter 1515, and a communications manager 1520. The device 1505 may also include at least one processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to multiple configured grant small data transmission configurations). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to multiple configured grant small data transmission configurations). In some examples, the transmitter 1515 may be co-located with a receiver 1510 in a transceiver module. The transmitter 1515 may utilize a single antenna or a set of multiple antennas.

The communications manager 1520, the receiver 1510, the transmitter 1515, or various combinations thereof or various components thereof may be examples of means for performing various aspects of multiple configured grant small data transmission configurations as described herein. For example, the communications manager 1520, the receiver 1510, the transmitter 1515, or various combinations or components thereof may support a method for performing one or more of the functions described herein.

In some examples, the communications manager 1520, the receiver 1510, the transmitter 1515, or various combinations or components thereof may be implemented in hardware (e.g., in communications management circuitry). The hardware may include at least one processor, a DSP, an ASIC, an FPGA or other programmable logic device, a discrete gate or transistor logic, discrete hardware components, or any combination thereof configured as or otherwise supporting a means for performing the functions described in the present disclosure. In some examples, at least one processor and memory coupled with the at least one processor may be configured to perform one or more of the functions described herein (e.g., by executing, by the at least one processor, instructions stored in the memory).

Additionally or alternatively, in some examples, the communications manager 1520, the receiver 1510, the transmitter 1515, or various combinations or components thereof may be implemented in code (e.g., as communications management software) executed by at least one processor. If implemented in code executed by at least one processor, the functions of the communications manager 1520, the receiver 1510, the transmitter 1515, or various combinations or components thereof may be performed by a general-purpose processor, a DSP, a CPU, a GPU, an ASIC, an FPGA, or any combination of these or other programmable logic devices (e.g., configured as or otherwise supporting a means for performing the functions described in the present disclosure).

In some examples, the communications manager 1520 may be configured to perform various operations (e.g., receiving, monitoring, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to receive information, transmit information, or perform various other operations as described herein.

For example, the communications manager 1520 may be configured as or otherwise support a means for transmitting one or more downlink messages that collectively indicate a set of multiple configured grant small data transmission configurations and a configuration for a downlink bandwidth part and an uplink bandwidth part for configured grant small data transmissions, each of the set of multiple configured grant small data transmission configurations being associated with respective time and frequency resources in the downlink bandwidth part and the uplink bandwidth part. The communications manager 1520 may be configured as or otherwise support a means for monitoring for an initial configured grant small data transmission that includes at least one common control channel message as part of using time and frequency resources associated with one or more of the set of multiple configured grant small data transmission configurations.

By including or configuring the communications manager 1520 in accordance with examples as described herein, the device 1505 (e.g., at least one processor controlling or otherwise coupled to the receiver 1510, the transmitter 1515, the communications manager 1520, or a combination thereof) may support techniques for improved communications between network devices for CG-SDT which may reduce processing, reduce power consumption, result in a more efficient utilization of communication resources, increase spectral efficiency, and reduce signaling overhead.

Figure 16:
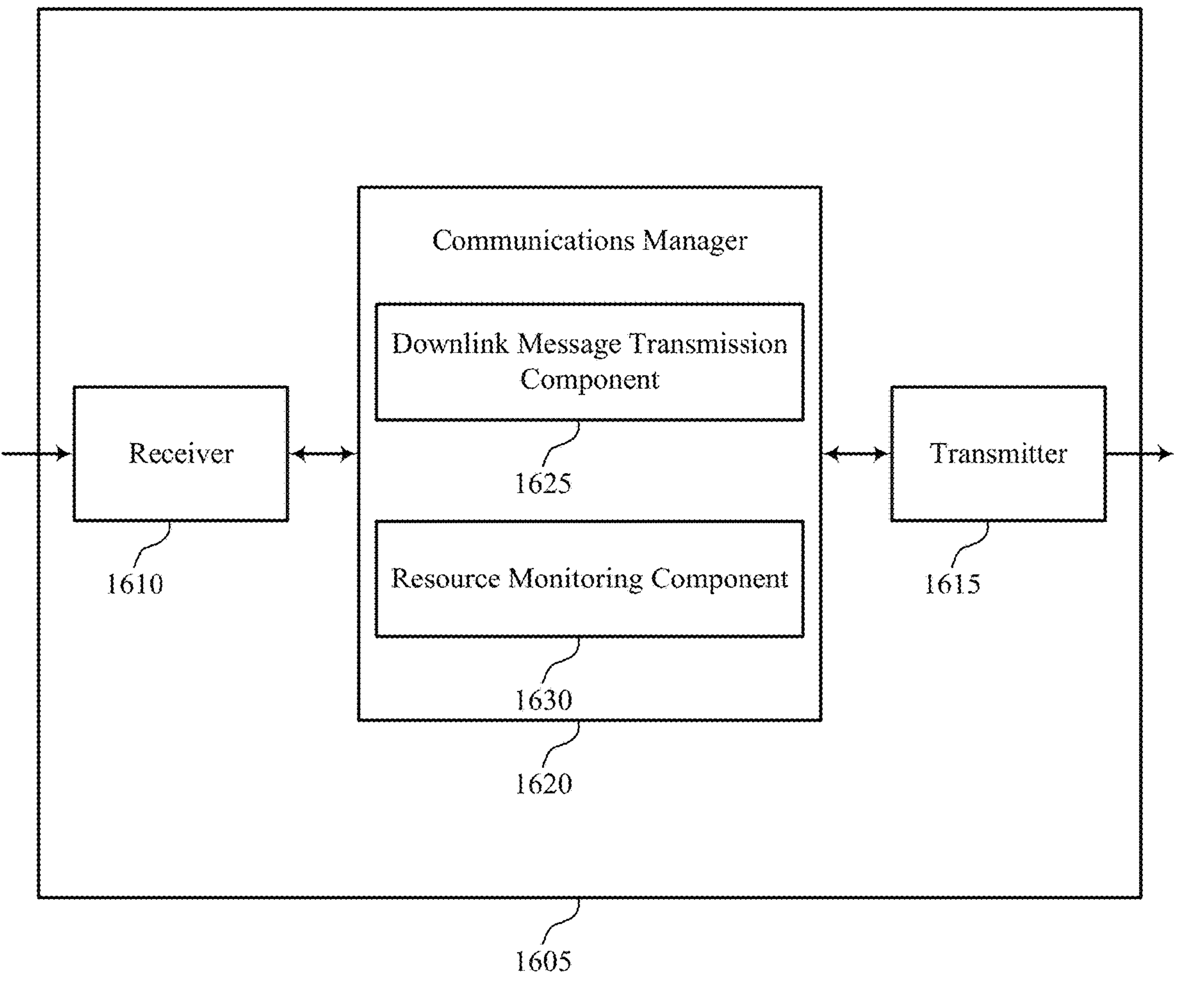

FIG. 16 shows a block diagram 1600 of a device 1605 that supports multiple configured grant small data transmission configurations in accordance with aspects of the present disclosure. The device 1605 may be an example of aspects of a device 1505 or a network device 105 as described herein. The device 1605 may include a receiver 1610, a transmitter 1615, and a communications manager 1620. The device 1605 may also include at least one processor. Each of these components may be in communication with one another (e.g., via one or more buses).

The receiver 1610 may provide a means for receiving information such as packets, user data, control information, or any combination thereof associated with various information channels (e.g., control channels, data channels, information channels related to multiple configured grant small data transmission configurations). Information may be passed on to other components of the device 1605. The receiver 1610 may utilize a single antenna or a set of multiple antennas.

The transmitter 1615 may provide a means for transmitting signals generated by other components of the device 1605. For example, the transmitter 1615 may transmit information such as packets, user data, control information, or any combination thereof associated with various information channels (e.g., control channels, data channels, information channels related to multiple configured grant small data transmission configurations). In some examples, the transmitter 1615 may be co-located with a receiver 1610 in a transceiver module. The transmitter 1615 may utilize a single antenna or a set of multiple antennas.

The device 1605, or various components thereof, may be an example of means for performing various aspects of multiple configured grant small data transmission configurations as described herein. For example, the communications manager 1620 may include a downlink message transmission component 1625 a resource monitoring component 1630, or any combination thereof. The communications manager 1620 may be an example of aspects of a communications manager 1520 as described herein. In some examples, the communications manager 1620, or various components thereof, may be configured to perform various operations (e.g., receiving, monitoring, transmitting) using or otherwise in cooperation with the receiver 1610, the transmitter 1615, or both. For example, the communications manager 1620 may receive information from the receiver 1610, send information to the transmitter 1615, or be integrated in combination with the receiver 1610, the transmitter 1615, or both to receive information, transmit information, or perform various other operations as described herein.

The downlink message transmission component 1625 may be configured as or otherwise support a means for transmitting one or more downlink messages that collectively indicate a set of multiple configured grant small data transmission configurations and a configuration for a downlink bandwidth part and an uplink bandwidth part for configured grant small data transmissions, each of the set of multiple configured grant small data transmission configurations being associated with respective time and frequency resources in the downlink bandwidth part and the uplink bandwidth part. The resource monitoring component 1630 may be configured as or otherwise support a means for monitoring for an initial configured grant small data transmission that includes at least one common control channel message as part of using time and frequency resources associated with one or more of the set of multiple configured grant small data transmission configurations.

Figure 17:
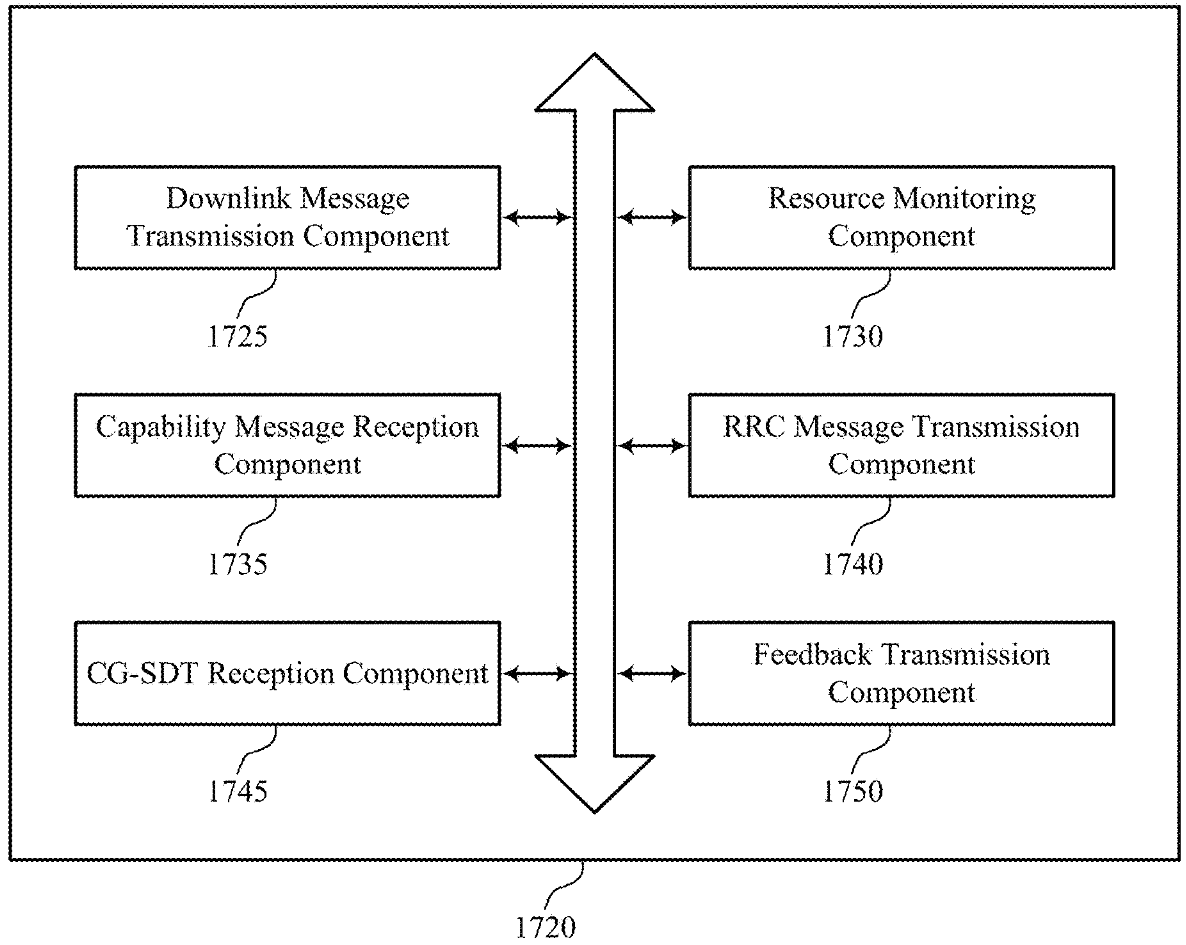
FIG. 17 shows a block diagram of a communications manager that supports multiple CG-SDT configurations in accordance with aspects of the present disclosure.

FIG. 17 shows a block diagram 1700 of a communications manager 1720 that supports multiple configured grant small data transmission configurations in accordance with aspects of the present disclosure. The communications manager 1720 may be an example of aspects of a communications manager 1520, a communications manager 1620, or both, as described herein. The communications manager 1720, or various components thereof, may be an example of means for performing various aspects of multiple configured grant small data transmission configurations as described herein. For example, the communications manager 1720 may include a downlink message transmission component 1725, a resource monitoring component 1730, a capability message reception component 1735, an RRC message transmission component 1740, a CG-SDT reception component 1745, a feedback transmission component 1750, or any combination thereof. Each of these components may communicate, directly or indirectly, with one another (e.g., via one or more buses).

The downlink message transmission component 1725 may be configured as or otherwise support a means for transmitting one or more downlink messages that collectively indicate a set of multiple configured grant small data transmission configurations and a configuration for a downlink bandwidth part and an uplink bandwidth part for configured grant small data transmissions, each of the set of multiple configured grant small data transmission configurations being associated with respective time and frequency resources in the downlink bandwidth part and the uplink bandwidth part. The resource monitoring component 1730 may be configured as or otherwise support a means for monitoring for an initial configured grant small data transmission that includes at least one common control channel message as part of using time and frequency resources associated with one or more of the set of multiple configured grant small data transmission configurations.

In some examples, the capability message reception component 1735 may be configured as or otherwise support a means for receiving a capability message indicating support for multiple configured grant small data transmission configurations, where transmitting the one or more downlink messages is based on transmitting the capability message.

In some examples, to support transmitting the one or more downlink messages, the RRC message transmission component 1740 may be configured as or otherwise support a means for transmitting a radio resource control message including the set of multiple configured grant small data transmission configurations and a radio resource control release message.

In some examples, to support transmitting the one or more downlink messages, the RRC message transmission component 1740 may be configured as or otherwise support a means for transmitting multiple radio resource control messages, where each radio resource control message of the multiple radio resource control messages includes a respective configured grant small data transmission configuration of the set of multiple configured grant small data transmission configurations, and where a last of the multiple radio resource control messages includes a radio resource control release message.

In some examples, to support transmitting the one or more downlink messages, the RRC message transmission component 1740 may be configured as or otherwise support a means for transmitting a first radio resource control message including a configured grant small data transmission configuration from the set of multiple configured grant small data transmission configurations and also including a radio resource control release message. In some examples, to support transmitting the one or more downlink messages, the RRC message transmission component 1740 may be configured as or otherwise support a means for transmitting one or more additional radio resource control messages including each remaining configured grant small data transmission configuration from the set of multiple configured grant small data transmission configurations after receiving the initial configured grant small data transmission.

In some examples, to support monitoring for the initial configured grant small data transmission that includes the at least one common control channel message, the CG-SDT reception component 1745 may be configured as or otherwise support a means for receiving an indication of one or more small data transmission bearers, UE assistance information for a configured grant, a buffer status report, a power head room report, a measurements report, a request for on-demand delivery of system information or modified system information, a request for on-demand transmission of downlink reference signals, a request for a paging restriction, an access stratum security token exchange, an access stratum security verification, or a combination thereof, to be used for transmission of a remainder of the configured grant small data transmissions.

In some examples, to support transmitting the one or more downlink messages, the downlink message transmission component 1725 may be configured as or otherwise support a means for transmitting, to a UE, the one or more downlink messages that collectively indicate the set of multiple configured grant small data transmission configurations and the configuration for the downlink bandwidth part and the uplink bandwidth part for the configured grant small data transmissions prior to the UE transitioning out of a radio resource control connected state.

In some examples, the downlink message transmission component 1725 may be configured as or otherwise support a means for transmitting a configuration for control resource sets and search space sets for use in monitoring a physical downlink control channel on the downlink bandwidth part. In some examples, the downlink message transmission component 1725 may be configured as or otherwise support a means for transmitting an indication to reduce an occurrence of radio resource measurements associated with radio resource management. In some examples, the downlink message transmission component 1725 may be configured as or otherwise support a means for transmitting configurations for one or more of downlink reference signals, downlink small data via unicast or multicast, paging early indications, or discontinuous reception.

In some examples, the respective time and frequency resources associated with two or more of the set of multiple configured grant small data transmission configurations overlap for transmission, by the UE, of the initial configured grant small data transmission.

In some examples, the CG-SDT reception component 1745 may be configured as or otherwise support a means for receiving a set of multiple initial configured grant small data transmissions on the respective time and frequency resources corresponding to the two or more of the set of multiple configured grant small data transmission configurations, each of the set of multiple initial configured grant small data transmissions being associated with a same uplink hybrid automatic repeat request process.

In some examples, the CG-SDT reception component 1745 may be configured as or otherwise support a means for receiving the initial configured grant small data transmission on only one of the respective time and frequency resources corresponding to the two or more of the set of multiple configured grant small data transmission configurations, the initial configured grant small data transmission being associated with a first uplink hybrid automatic repeat request process.

In some examples, the respective time and frequency resources associated with the set of multiple configured grant small data transmission configurations do not overlap for transmission, by the UE, of the initial configured grant small data transmission.

In some examples, the CG-SDT reception component 1745 may be configured as or otherwise support a means for receiving the initial configured grant small data transmission using time and frequency resources associated with a first configured grant small data transmission configuration of the set of multiple configured grant small data transmission configurations. In some examples, the feedback transmission component 1750 may be configured as or otherwise support a means for transmitting an acknowledgment feedback message in response to receiving the initial configured grant small data transmission. In some examples, the CG-SDT reception component 1745 may be configured as or otherwise support a means for receiving a second initial configured grant small data transmission without a common control channel message using time and frequency resources associated with a second configured grant small data transmission configuration of the set of multiple configured grant small data transmission configurations based on transmitting the acknowledgment feedback message.

In some examples, the CG-SDT reception component 1745 may be configured as or otherwise support a means for receiving the initial configured grant small data transmission using time and frequency resources associated with a first configured grant small data transmission configuration of the set of multiple configured grant small data transmission configurations. In some examples, the feedback transmission component 1750 may be configured as or otherwise support a means for refraining from transmitting an acknowledgment feedback message in response to transmitting the initial configured grant small data transmission. In some examples, the CG-SDT reception component 1745 may be configured as or otherwise support a means for receiving a second initial configured grant small data transmission with a second common control channel message using time and frequency resources associated with a second configured grant small data transmission configuration of the set of multiple configured grant small data transmission configurations based on refraining from transmitting the acknowledgment feedback message.

In some examples, the CG-SDT reception component 1745 may be configured as or otherwise support a means for receiving the initial configured grant small data transmission using time and frequency resources associated with a first configured grant small data transmission configuration of the set of multiple configured grant small data transmission configurations. In some examples, the CG-SDT reception component 1745 may be configured as or otherwise support a means for receiving a second initial configured grant small data transmission that includes a second common control channel message using time and frequency resources associated with a second configured grant small data transmission configuration of the set of multiple configured grant small data transmission configurations.

In some examples, the feedback transmission component 1750 may be configured as or otherwise support a means for refraining from transmitting a feedback message during a radio resource control configured window associated with the initial configured grant small data transmission, the feedback message including either an acknowledgment message associated with the initial configured grant small data transmission or a dynamic retransmission grant. In some examples, the CG-SDT reception component 1745 may be configured as or otherwise support a means for receiving a retransmission of the initial configured grant small data transmission based on refraining from transmitting the feedback message.

In some examples, to support receiving the retransmission of the initial configured grant small data transmission, the CG-SDT reception component 1745 may be configured as or otherwise support a means for receiving the retransmission of the initial configured grant small data transmission using a next available and valid time and frequency resources associated with the set of multiple configured grant small data transmission configurations based on each of the set of multiple configured grant small data transmission configurations being associated with a same small data transmission bearer.

In some examples, the set of multiple configured grant small data transmission configurations are associated with a same small data transmission bearer or different small data transmission bearers.

In some examples, at least one downlink message of the one or more downlink messages includes a radio resource control release message indicating for a receiving UE to transition from a radio resource control connected state to a radio resource control inactive state or a radio resource control idle state.

In some examples, the at least one common control channel message indicates a radio resource control resume request message.

Figure 18:
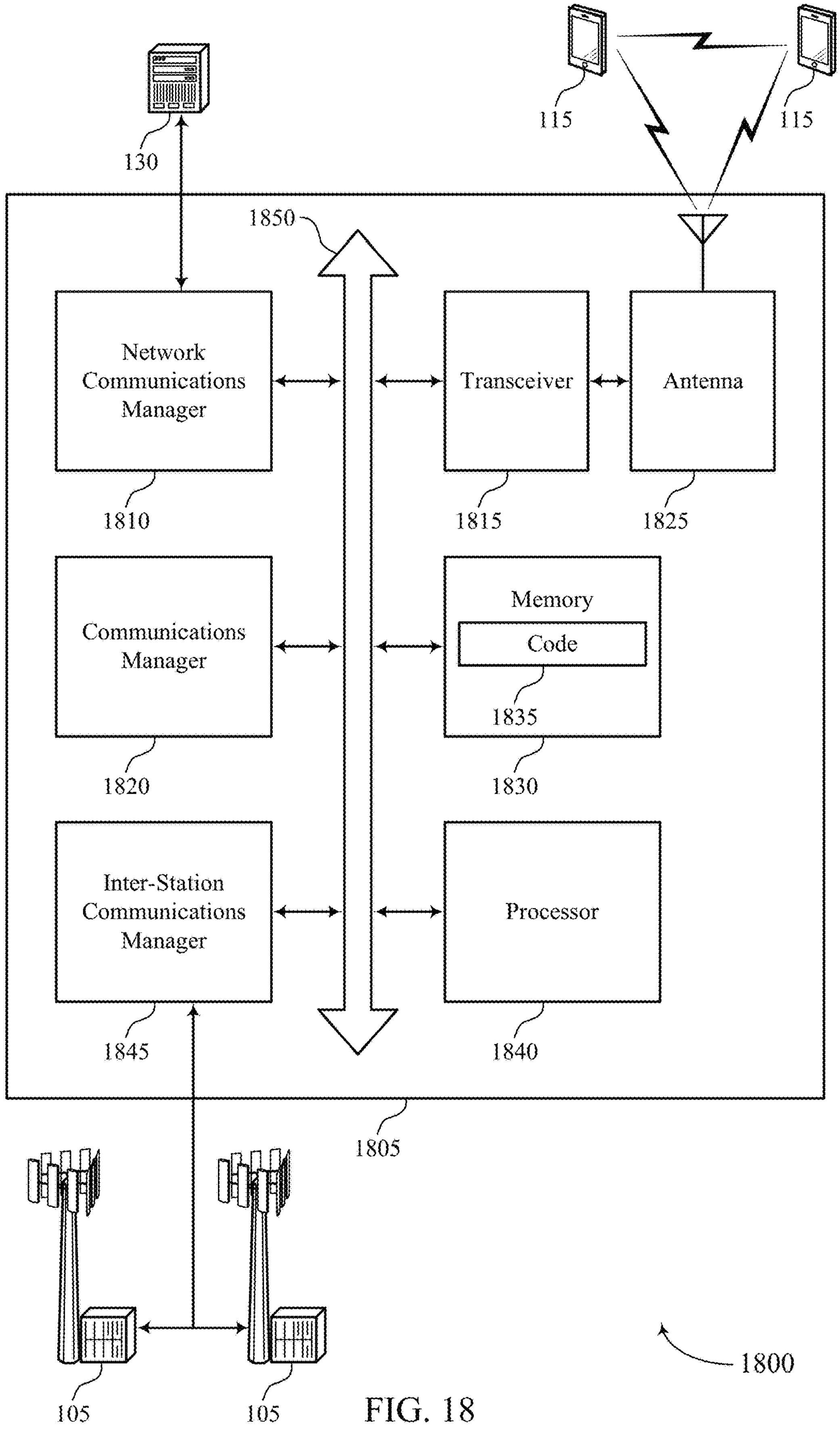
FIG. 18 shows a diagram of a system including a device that supports multiple CG-SDT configurations in accordance with aspects of the present disclosure.

FIG. 18 shows a diagram of a system 1800 including a device 1805 that supports multiple configured grant small data transmission configurations in accordance with aspects of the present disclosure. The device 1805 may be an example of or include the components of a device 1505, a device 1605, or a network device 105 as described herein. The device 1805 may communicate wirelessly with one or more network devices 105, UEs 115, or any combination thereof. The device 1805 may include components for bi-directional voice and data communications including components for transmitting and receiving communications, such as a communications manager 1820, a network communications manager 1810, a transceiver 1815, an antenna 1825, a memory 1830, code 1835, at least one processor 1840, and an inter-station communications manager 1845. These components may be in electronic communication or otherwise coupled (e.g., operatively, communicatively, functionally, electronically, electrically) via one or more buses (e.g., a bus 1850).

The network communications manager 1810 may manage communications with a core network 130 (e.g., via one or more wired backhaul links). For example, the network communications manager 1810 may manage the transfer of data communications for client devices, such as one or more UEs 115.

In some cases, the device 1805 may include a single antenna 1825. However, in some other cases the device 1805 may have more than one antenna 1825, which may be capable of concurrently transmitting or receiving multiple wireless transmissions. The transceiver 1815 may communicate bi-directionally, via the one or more antennas 1825, wired, or wireless links as described herein. For example, the transceiver 1815 may represent a wireless transceiver and may communicate bi-directionally with another wireless transceiver. The transceiver 1815 may also include a modem to modulate the packets, to provide the modulated packets to one or more antennas 1825 for transmission, and to demodulate packets received from the one or more antennas 1825. The transceiver 1815, or the transceiver 1815 and one or more antennas 1825, may be an example of a transmitter 1515, a transmitter 1615, a receiver 1510, a receiver 1610, or any combination thereof or component thereof, as described herein.

The memory 1830 may include RAM and ROM. The memory 1830 may store computer-readable, computer-executable code 1835 including instructions that, when executed by the at least one processor 1840, cause the device 1805 to perform various functions described herein. The code 1835 may be stored in a non-transitory computer-readable medium such as system memory or another type of memory. In some cases, the code 1835 may not be directly for the at least one processor 1840 but may cause a computer (e.g., when compiled and executed) to perform functions described herein. In some cases, the memory 1830 may contain, among other things, a BIOS which may control basic hardware or software operation such as the interaction with peripheral components or devices.

The processor 1840 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the at least one processor 1840 may be configured to operate a memory array using a memory controller. In some other cases, a memory controller may be integrated into the at least one processor 1840. The processor 1840 may be configured to execute computer-readable instructions stored in a memory (e.g., the memory 1830) to cause the device 1805 to perform various functions (e.g., functions or tasks supporting multiple configured grant small data transmission configurations). For example, the device 1805 or a component of the device 1805 may include at least one processor 1840 and memory 1830 coupled with or to the at least one processor 1840, the at least one processor 1840 and memory 1830 configured to perform various functions described herein.

The inter-station communications manager 1845 may manage communications with other network devices 105, and may include a controller or scheduler for controlling communications with UEs 115 in cooperation with other network devices 105. For example, the inter-station communications manager 1845 may coordinate scheduling for transmissions to UEs 115 for various interference mitigation techniques such as beamforming or joint transmission. In some examples, the inter-station communications manager 1845 may provide an X2 interface within an LTE/LTE-A wireless communications network technology to provide communication between network devices 105.

For example, the communications manager 1820 may be configured as or otherwise support a means for transmitting one or more downlink messages that collectively indicate a set of multiple configured grant small data transmission configurations and a configuration for a downlink bandwidth part and an uplink bandwidth part for configured grant small data transmissions, each of the set of multiple configured grant small data transmission configurations being associated with respective time and frequency resources in the downlink bandwidth part and the uplink bandwidth part. The communications manager 1820 may be configured as or otherwise support a means for monitoring for an initial configured grant small data transmission that includes at least one common control channel message as part of using time and frequency resources associated with one or more of the set of multiple configured grant small data transmission configurations.

By including or configuring the communications manager 1820 in accordance with examples as described herein, the device 1805 may support techniques for improved communications between network devices for CG-SDT which may improve communication reliability, reduce latency, improve user experience related to reduced processing, reduce power consumption, result in a more efficient utilization of communication resources, improve coordination between devices, increase battery life, increase spectral efficiency, and reduce signaling overhead.

In some examples, the communications manager 1820 may be configured to perform various operations (e.g., receiving, monitoring, transmitting) using or otherwise in cooperation with the transceiver 1815, the one or more antennas 1825, or any combination thereof. Although the communications manager 1820 is illustrated as a separate component, in some examples, one or more functions described with reference to the communications manager 1820 may be supported by or performed by the at least one processor 1840, the memory 1830, the code 1835, or any combination thereof. For example, the code 1835 may include instructions for the at least one processor 1840 to cause the device 1805 to perform various aspects of multiple configured grant small data transmission configurations as described herein, or the at least one processor 1840 and the memory 1830 may be otherwise configured to perform or support such operations.

Figure 19:
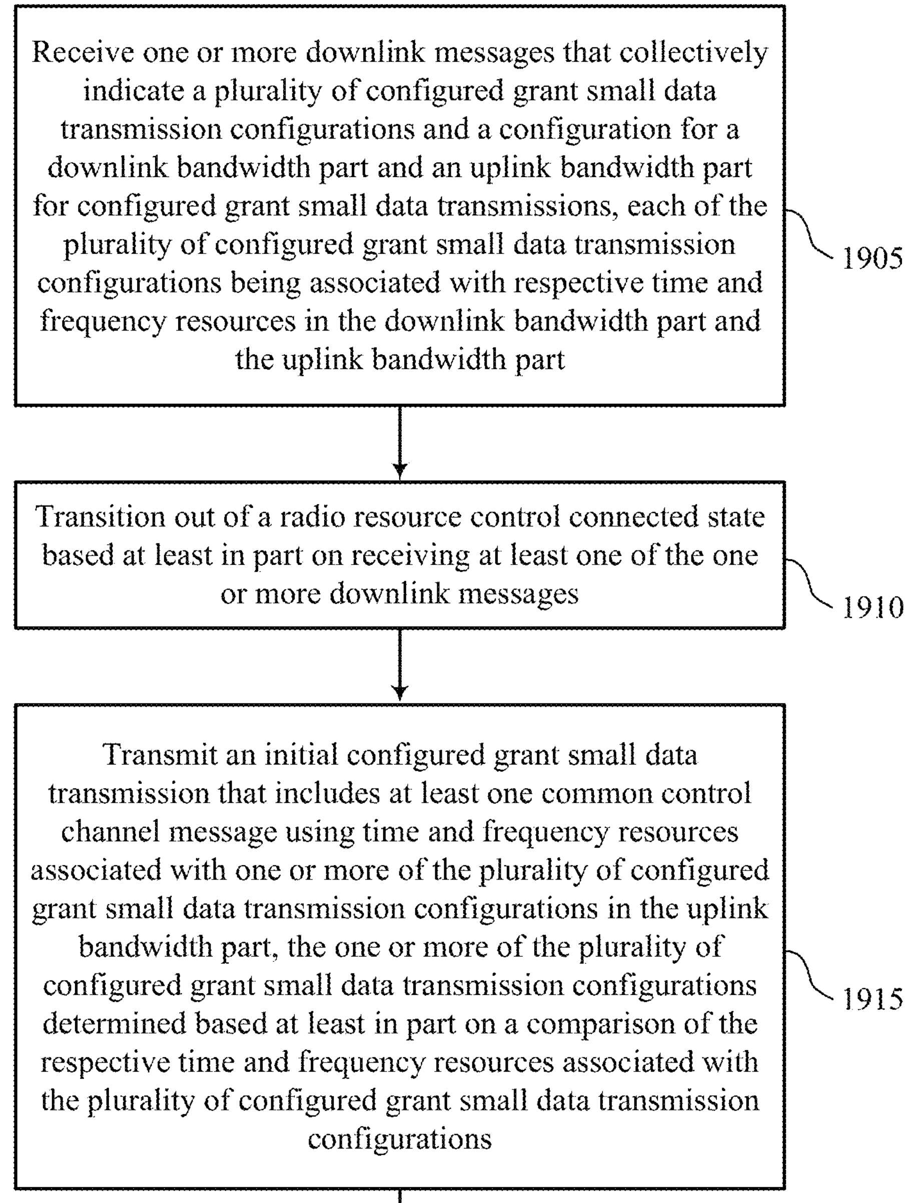

FIG. 19 shows a flowchart illustrating a method 1900 that supports multiple configured grant small data transmission configurations in accordance with aspects of the present disclosure. The operations of the method 1900 may be implemented by a UE or its components as described herein. For example, the operations of the method 1900 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 1905, the method may include receiving one or more downlink messages that collectively indicate a set of multiple configured grant small data transmission configurations and a configuration for a downlink bandwidth part and an uplink bandwidth part for configured grant small data transmissions, each of the set of multiple configured grant small data transmission configurations being associated with respective time and frequency resources in the downlink bandwidth part and the uplink bandwidth part. The operations of 1905 may be performed in accordance with examples as disclosed herein. In some examples, aspects of the operations of 1905 may be performed by a downlink message reception component 1325 as described with reference to FIG. 13.

At 1910, the method may include transitioning out of a radio resource control connected state based on receiving at least one of the one or more downlink messages. The operations of 1910 may be performed in accordance with examples as disclosed herein. In some examples, aspects of the operations of 1910 may be performed by an RRC state transition component 1330 as described with reference to FIG. 13.

At 1915, the method may include transmitting an initial configured grant small data transmission that includes at least one common control channel message using time and frequency resources associated with one or more of the set of multiple configured grant small data transmission configurations in the uplink bandwidth part, the one or more of the set of multiple configured grant small data transmission configurations determined based on a comparison of the respective time and frequency resources associated with the set of multiple configured grant small data transmission configurations. The operations of 1915 may be performed in accordance with examples as disclosed herein. In some examples, aspects of the operations of 1915 may be performed by a CG-SDT transmission component 1335 as described with reference to FIG. 13.

At 1920, the method may include monitoring for a response to the initial configured grant small data transmission in the downlink bandwidth part. The operations of 1920 may be performed in accordance with examples as disclosed herein. In some examples, aspects of the operations of 1920 may be performed by a resource monitoring component 1340 as described with reference to FIG. 13.

Figure 20:
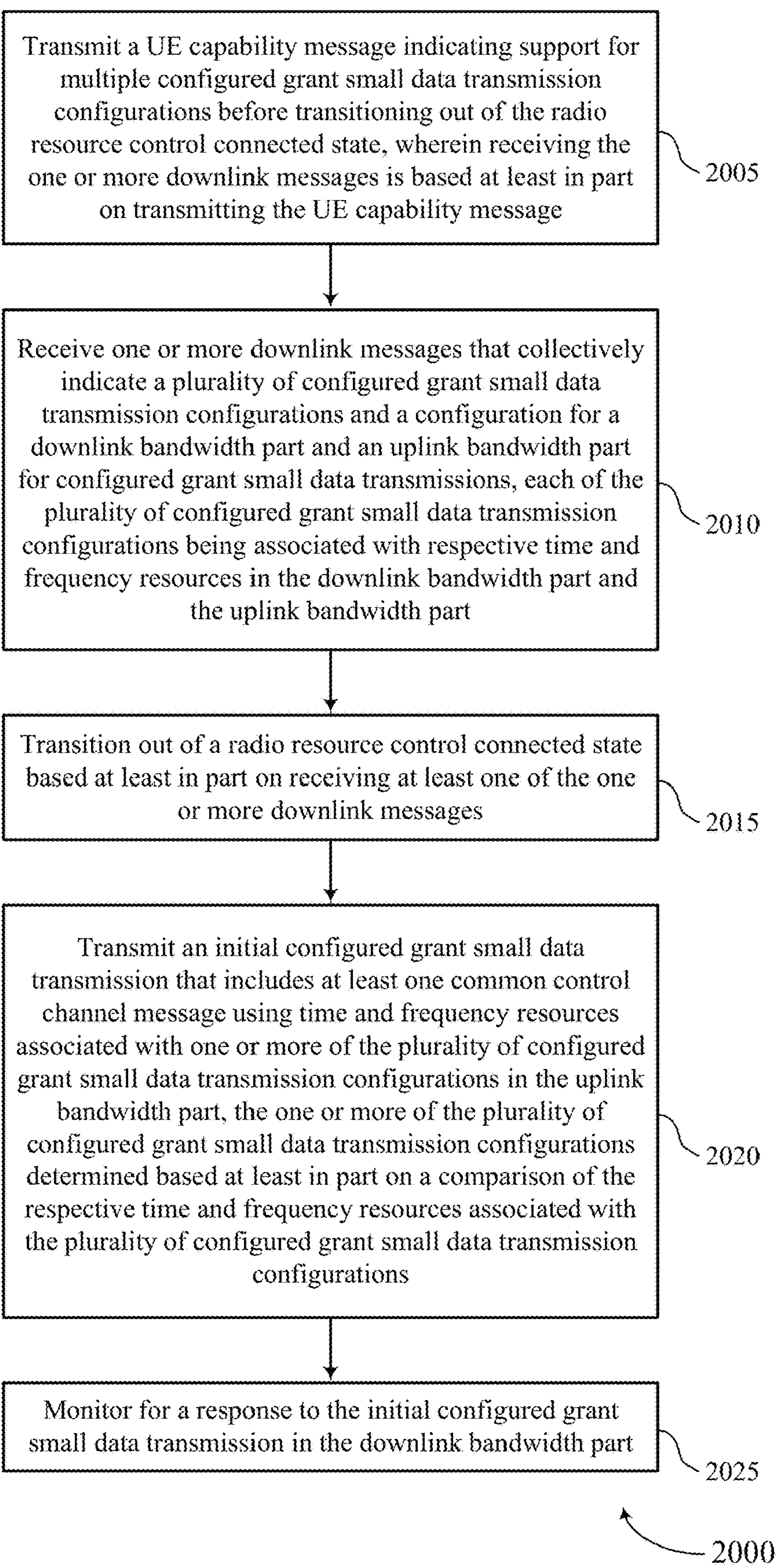

FIG. 20 shows a flowchart illustrating a method 2000 that supports multiple configured grant small data transmission configurations in accordance with aspects of the present disclosure. The operations of the method 2000 may be implemented by a UE or its components as described herein. For example, the operations of the method 2000 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 2005, the method may include transmitting a UE capability message indicating support for multiple configured grant small data transmission configurations before transitioning out of the radio resource control connected state, where receiving the one or more downlink messages is based on transmitting the UE capability message. The operations of 2005 may be performed in accordance with examples as disclosed herein. In some examples, aspects of the operations of 2005 may be performed by a capability transmission component 1345 as described with reference to FIG. 13.

At 2010, the method may include receiving one or more downlink messages that collectively indicate a set of multiple configured grant small data transmission configurations and a configuration for a downlink bandwidth part and an uplink bandwidth part for configured grant small data transmissions, each of the set of multiple configured grant small data transmission configurations being associated with respective time and frequency resources in the downlink bandwidth part and the uplink bandwidth part. The operations of 2010 may be performed in accordance with examples as disclosed herein. In some examples, aspects of the operations of 2010 may be performed by a downlink message reception component 1325 as described with reference to FIG. 13.

At 2015, the method may include transitioning out of a radio resource control connected state based on receiving at least one of the one or more downlink messages. The operations of 2015 may be performed in accordance with examples as disclosed herein. In some examples, aspects of the operations of 2015 may be performed by an RRC state transition component 1330 as described with reference to FIG. 13.

At 2020, the method may include transmitting an initial configured grant small data transmission that includes at least one common control channel message using time and frequency resources associated with one or more of the set of multiple configured grant small data transmission configurations in the uplink bandwidth part, the one or more of the set of multiple configured grant small data transmission configurations determined based on a comparison of the respective time and frequency resources associated with the set of multiple configured grant small data transmission configurations. The operations of 2020 may be performed in accordance with examples as disclosed herein. In some examples, aspects of the operations of 2020 may be performed by a CG-SDT transmission component 1335 as described with reference to FIG. 13.

At 2025, the method may include monitoring for a response to the initial configured grant small data transmission in the downlink bandwidth part. The operations of 2025 may be performed in accordance with examples as disclosed herein. In some examples, aspects of the operations of 2025 may be performed by a resource monitoring component 1340 as described with reference to FIG. 13.

FIG. 21 shows a flowchart illustrating a method 2100 that supports multiple configured grant small data transmission configurations in accordance with aspects of the present disclosure. The operations of the method 2100 may be implemented by a network device or its components as described herein. For example, the operations of the method 2100 may be performed by a network device 105 as described with reference to FIGS. 1 through 10 and 15 through 18. In some examples, a network device may execute a set of instructions to control the functional elements of the network device to perform the described functions. Additionally or alternatively, the network device may perform aspects of the described functions using special-purpose hardware.

At 2105, the method may include transmitting one or more downlink messages that collectively indicate a set of multiple configured grant small data transmission configurations and a configuration for a downlink bandwidth part and an uplink bandwidth part for configured grant small data transmissions, each of the set of multiple configured grant small data transmission configurations being associated with respective time and frequency resources in the downlink bandwidth part and the uplink bandwidth part. The operations of 2105 may be performed in accordance with examples as disclosed herein. In some examples, aspects of the operations of 2105 may be performed by a downlink message transmission component 1725 as described with reference to FIG. 17.

At 2110, the method may include monitoring for an initial configured grant small data transmission that includes at least one common control channel message as part of using time and frequency resources associated with one or more of the set of multiple configured grant small data transmission configurations. The operations of 2110 may be performed in accordance with examples as disclosed herein. In some examples, aspects of the operations of 2110 may be performed by a resource monitoring component 1730 as described with reference to FIG. 17.

FIG. 22 shows a flowchart illustrating a method 2200 that supports multiple configured grant small data transmission configurations in accordance with aspects of the present disclosure. The operations of the method 2200 may be implemented by a network device or its components as described herein. For example, the operations of the method 2200 may be performed by a network device 105 as described with reference to FIGS. 1 through 10 and 15 through 18. In some examples, a network device may execute a set of instructions to control the functional elements of the network device to perform the described functions. Additionally or alternatively, the network device may perform aspects of the described functions using special-purpose hardware.

At 2205, the method may include receiving a capability message indicating support for multiple configured grant small data transmission configurations, where transmitting the one or more downlink messages is based on transmitting the capability message. The operations of 2205 may be performed in accordance with examples as disclosed herein. In some examples, aspects of the operations of 2205 may be performed by a capability message reception component 1735 as described with reference to FIG. 17.

At 2210, the method may include transmitting one or more downlink messages that collectively indicate a set of multiple configured grant small data transmission configurations and a configuration for a downlink bandwidth part and an uplink bandwidth part for configured grant small data transmissions, each of the set of multiple configured grant small data transmission configurations being associated with respective time and frequency resources in the downlink bandwidth part and the uplink bandwidth part. The operations of 2210 may be performed in accordance with examples as disclosed herein. In some examples, aspects of the operations of 2210 may be performed by a downlink message transmission component 1725 as described with reference to FIG. 17.

At 2215, the method may include monitoring for an initial configured grant small data transmission that includes at least one common control channel message as part of using time and frequency resources associated with one or more of the set of multiple configured grant small data transmission configurations. The operations of 2215 may be performed in accordance with examples as disclosed herein. In some examples, aspects of the operations of 2215 may be performed by a resource monitoring component 1730 as described with reference to FIG. 17.

The following provides an overview of aspects of the present disclosure:

Aspect 1: A method for wireless communications at a UE including: receiving one or more downlink messages that collectively indicate a set of CG-SDT configurations and a configuration for a downlink BWP and an uplink BWP for CG-SDTs, each of the set of CG-SDT configurations being associated with respective time and frequency resources in the downlink BWP and the uplink BWP; transitioning out of a RRC connected state based on receiving at least one of the one or more downlink messages; transmitting an initial CG-SDT that includes at least one common control channel message using time and frequency resources associated with one or more of the set of CG-SDT configurations in the uplink BWP, the one or more of the set of CG-SDT configurations determined based on a comparison of the respective time and frequency resources associated with the set of CG-SDT configurations; and monitoring for a response to the initial CG-SDT in the downlink BWP.

Aspect 2: The method of aspect 1, further including: transmitting a UE capability message indicating support for multiple CG-SDT configurations before transitioning out of the RRC connected state, where receiving the one or more downlink messages is based on transmitting the UE capability message.

Aspect 3: The method of any of aspects 1 through 2, where receiving the one or more downlink messages further includes: receiving a RRC message including the set of CG-SDT configurations and a RRC release message.

Aspect 4: The method of any of aspects 1 through 3, where receiving the one or more downlink messages further includes: receiving multiple RRC messages, where each RRC message of the multiple RRC messages includes a respective CG-SDT configuration of the set of CG-SDT configurations, and where a last of the multiple RRC messages includes a RRC release message.

Aspect 5: The method of any of aspects 1 through 4, where receiving the one or more downlink messages further includes: receiving a first RRC message including a CG-SDT configuration from the set of CG-SDT configurations and also including a RRC release message; and receiving one or more additional RRC messages including each remaining CG-SDT configuration from the set of CG-SDT configurations after the UE transitions out of the RRC connected state.

Aspect 6: The method of any of aspects 1 through 5, where transmitting the initial CG-SDT that includes the at least one common control channel message further includes: transmitting an indication of one or more small data transmission bearers, UE assistance information for a configured grant, a buffer status report, a power head room report, a measurements report, a request for on-demand delivery of system information or modified system information, a request for on-demand transmission of downlink reference signals, a request for a paging restriction, an AS security token exchange, an AS security verification, or a combination thereof, to be used for transmission of a remainder of the CG-SDTs.

Aspect 7: The method of any of aspects 1 through 6, where receiving the one or more downlink messages further includes: receiving the one or more downlink messages that collectively indicate the set of CG-SDT configurations and the configuration for the downlink BWP and the uplink BWP for the CG-SDTs prior to the UE transitioning out of the RRC connected state.

Aspect 8: The method of aspect 7, further including: receiving a configuration for control resource sets and search space sets for use in monitoring a physical downlink control channel on the downlink BWP; receiving an indication to reduce an occurrence of radio resource measurements associated with radio resource management; and receiving configurations for one or more of downlink reference signals, downlink small data via unicast or multicast, paging early indications, or discontinuous reception.

Aspect 9: The method of any of aspects 7 through 8, where transmitting the initial CG-SDT further includes: determining that the respective time and frequency resources associated with two or more of the set of CG-SDT configurations overlap for transmission of the initial CG-SDT; and transmitting a set of initial CG-SDTs on the respective time and frequency resources corresponding to the two or more of the set of CG-SDT configurations, each of the set of initial CG-SDTs being associated with a same uplink HARQ process.

Aspect 10: The method of any of aspects 7 through 9, where transmitting the initial CG-SDT further includes: determining that the respective time and frequency resources associated with two or more of the set of CG-SDT configurations overlap for transmission of the initial CG-SDT; and transmitting the initial CG-SDT on only one of the respective time and frequency resources corresponding to the two or more of the set of CG-SDT configurations, the initial CG-SDT being associated with a first uplink HARQ process.

Aspect 11: The method of any of aspects 7 through 10, where transmitting the initial CG-SDT further includes: determining that the respective time and frequency resources associated with the set of CG-SDT configurations do not overlap for transmission of the initial CG-SDT; transmitting the initial CG-SDT using time and frequency resources associated with a first CG-SDT configuration of the set of CG-SDT configurations; receiving an ACK feedback message in response to transmitting the initial CG-SDT; and transmitting a second initial CG-SDT without a common control channel message using time and frequency resources associated with a second CG-SDT configuration of the set of CG-SDT configurations based on receiving the ACK feedback message.

Aspect 12: The method of any of aspects 7 through 11, where transmitting the initial CG-SDT further includes: determining that the respective time and frequency resources associated with the set of CG-SDT configurations do not overlap for transmission of the initial CG-SDT; transmitting the initial CG-SDT using time and frequency resources associated with a first CG-SDT configuration of the set of CG-SDT configurations; failing to receive an ACK feedback message in response to transmitting the initial CG-SDT; and transmitting a second initial CG-SDT with a second common control channel message using time and frequency resources associated with a second CG-SDT configuration of the set of CG-SDT configurations based on failing to receive the ACK feedback message.

Aspect 13: The method of any of aspects 7 through 12, where transmitting the initial CG-SDT further includes: determining that the respective time and frequency resources associated with the set of CG-SDT configurations do not overlap for transmission of the initial CG-SDT; transmitting the initial CG-SDT using time and frequency resources associated with a first CG-SDT configuration of the set of CG-SDT configurations; and transmitting a second initial CG-SDT that includes a second common control channel message using time and frequency resources associated with a second CG-SDT configuration of the set of CG-SDT configurations.

Aspect 14: The method of any of aspects 1 through 13, further including: triggering only a single HARQ processes associated with transmission of the initial CG-SDT, even if different HARQ processes are associated with the set of CG-SDT configurations.

Aspect 15: The method of any of aspects 1 through 14, further including: refraining from transmitting additional CG-SDTs after transmitting the initial CG-SDT in an absence of receiving an ACK message for the initial CG-SDT.

Aspect 16: The method of any of aspects 1 through 15, further including: retransmitting the initial CG-SDT based on not receiving a feedback message during a RRC configured window associated with the initial CG-SDT, the feedback message including either an ACK message associated with the initial CG-SDT or a dynamic retransmission grant.

Aspect 17: The method of aspect 16, where retransmitting the initial CG-SDT further includes: retransmitting the initial CG-SDT using a next available and valid time and frequency resources associated with the set of CG-SDT configurations based on each of the set of CG-SDT configurations being associated with a same small data transmission bearer.

Aspect 18: The method of any of aspects 1 through 17, where the set of CG-SDT configurations are associated with a same small data transmission bearer or different small data transmission bearers.

Aspect 19: The method of any of aspects 1 through 18, where transitioning out of the RRC connected state further includes: transitioning into a RRC inactive state or a RRC idle state.

Aspect 20: The method of any of aspects 1 through 19, where the at least one common control channel message indicates a RRC resume request message.

Aspect 21: A method for wireless communications at a network entity including: transmitting one or more downlink messages that collectively indicate a set of CG-SDT configurations and a configuration for a downlink BWP and an uplink BWP for CG-SDTs, each of the set of CG-SDT configurations being associated with respective time and frequency resources in the downlink BWP and the uplink BWP; and monitoring for an initial CG-SDT that includes at least one common control channel message as part of using time and frequency resources associated with one or more of the set of CG-SDT configurations.

Aspect 22: The method of aspect 21, further including: receiving a capability message indicating support for multiple CG-SDT configurations, where transmitting the one or more downlink messages is based on transmitting the capability message.

Aspect 23: The method of any of aspects 21 through 22, where transmitting the one or more downlink messages further includes: transmitting a RRC message including the set of CG-SDT configurations and a RRC release message.

Aspect 24: The method of any of aspects 21 through 23, where transmitting the one or more downlink messages further includes: transmitting multiple RRC messages, where each RRC message of the multiple RRC messages includes a respective CG-SDT configuration of the set of CG-SDT configurations, and where a last of the multiple RRC messages includes a RRC release message.

Aspect 25: The method of any of aspects 21 through 24, where transmitting the one or more downlink messages further includes: transmitting a first RRC message including a CG-SDT configuration from the set of CG-SDT configurations and also including a RRC release message; and transmitting one or more additional RRC messages including each remaining CG-SDT configuration from the set of CG-SDT configurations after receiving the initial CG-SDT.

Aspect 26: The method of any of aspects 21 through 25, where monitoring for the initial CG-SDT that includes the at least one common control channel message further includes: receiving an indication of one or more small data transmission bearers, UE assistance information for a configured grant, a buffer status report, a power head room report, a measurements report, a request for on-demand delivery of system information or modified system information, a request for on-demand transmission of downlink reference signals, a request for a paging restriction, an AS security token exchange, an AS security verification, or a combination thereof, to be used for transmission of a remainder of the CG-SDTs.

Aspect 27: The method of any of aspects 21 through 26, where transmitting the one or more downlink messages further includes: transmitting, to a UE, the one or more downlink messages that collectively indicate the set of CG-SDT configurations and the configuration for the downlink BWP and the uplink BWP for the CG-SDTs prior to the UE transitioning out of a RRC connected state.

Aspect 28: The method of aspect 27, further including: transmitting a configuration for control resource sets and search space sets for use in monitoring a physical downlink control channel on the downlink BWP; transmitting an indication to reduce an occurrence of radio resource measurements associated with radio resource management; and transmitting configurations for one or more of downlink reference signals, downlink small data via unicast or multicast, paging early indications, or discontinuous reception.

Aspect 29: The method of any of aspects 27 through 28, where the respective time and frequency resources associated with two or more of the set of CG-SDT configurations overlap for transmission, by the UE, of the initial CG-SDT.

Aspect 30: The method of aspect 29, further including: receiving a set of initial CG-SDTs on the respective time and frequency resources corresponding to the two or more of the set of CG-SDT configurations, each of the set of initial CG-SDTs being associated with a same uplink HARQ process.

Aspect 31: The method of any of aspects 29 through 30, further including: receiving the initial CG-SDT on only one of the respective time and frequency resources corresponding to the two or more of the set of CG-SDT configurations, the initial CG-SDT being associated with a first uplink HARQ process.

Aspect 32: The method of any of aspects 27 through 31, where the respective time and frequency resources associated with the set of CG-SDT configurations do not overlap for transmission, by the UE, of the initial CG-SDT.

Aspect 33: The method of aspect 32, further including: receiving the initial CG-SDT using time and frequency resources associated with a first CG-SDT configuration of the set of CG-SDT configurations; transmitting an ACK feedback message in response to receiving the initial CG-SDT; and receiving a second initial CG-SDT without a common control channel message using time and frequency resources associated with a second CG-SDT configuration of the set of CG-SDT configurations based on transmitting the ACK feedback message.

Aspect 34: The method of any of aspects 32 through 33, further including: receiving the initial CG-SDT using time and frequency resources associated with a first CG-SDT configuration of the set of CG-SDT configurations; refraining from transmitting an ACK feedback message in response to transmitting the initial CG-SDT; and receiving a second initial CG-SDT with a second common control channel message using time and frequency resources associated with a second CG-SDT configuration of the set of CG-SDT configurations based on refraining from transmitting the ACK feedback message.

Aspect 35: The method of any of aspects 32 through 34, further including: receiving the initial CG-SDT using time and frequency resources associated with a first CG-SDT configuration of the set of CG-SDT configurations; and receiving a second initial CG-SDT that includes a second common control channel message using time and frequency resources associated with a second CG-SDT configuration of the set of CG-SDT configurations.

Aspect 36: The method of any of aspects 27 through 35, further including: refraining from transmitting a feedback message during a RRC configured window associated with the initial CG-SDT, the feedback message including either an ACK message associated with the initial CG-SDT or a dynamic retransmission grant; and receiving a retransmission of the initial CG-SDT based on refraining from transmitting the feedback message.

Aspect 37: The method of aspect 36, where receiving the retransmission of the initial CG-SDT further includes: receiving the retransmission of the initial CG-SDT using a next available and valid time and frequency resources associated with the set of CG-SDT configurations based on each of the set of CG-SDT configurations being associated with a same small data transmission bearer.

Aspect 38: The method of any of aspects 21 through 37, where the set of CG-SDT configurations are associated with a same small data transmission bearer or different small data transmission bearers.

Aspect 39: The method of any of aspects 21 through 38, where at least one downlink message of the one or more downlink messages includes a RRC release message indicating for a receiving UE to transition from a RRC connected state to a RRC inactive state or a RRC idle state.

Aspect 40: The method of any of aspects 21 through 39, where the at least one common control channel message indicates a RRC resume request message.

Aspect 41: An apparatus including at least one processor; memory coupled with the at least one processor; and instructions stored in the memory and for the at least one processor to cause the apparatus to perform a method of any of aspects 1 through 20.

Aspect 42: An apparatus including at least one means for performing a method of any of aspects 1 through 20.

Aspect 43: A non-transitory computer-readable medium storing code the code including instructions for at least one processor to perform a method of any of aspects 1 through 20.

Aspect 44: An apparatus including at least one processor; memory coupled with the at least one processor; and instructions stored in the memory and for the at least one processor to cause the apparatus to perform a method of any of aspects 21 through 40.

Aspect 45: An apparatus including at least one means for performing a method of any of aspects 21 through 40.

Aspect 46: A non-transitory computer-readable medium storing code the code including instructions for at least one processor to perform a method of any of aspects 21 through 40.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor, but in the alternative, the at least one processor may be any processor, controller, microcontroller, or state machine. At least one processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by at least one processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by at least one processor, the functions may be stored on or transmitted over as one or more instructions or code on a computer-readable medium. Other examples and implementations are within the scope of the disclosure and appended claims. For example, due to the nature of software, functions described herein may be implemented using software executed by at least one processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" encompasses a wide variety of actions and, therefore, "determining" can include calculating, computing, processing, deriving, investigating, looking up (such as via looking up in a table, a database, or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:
- one or more memories storing processor-executable code; and
- one or more processors coupled with the one or more memories and individually or collectively operable to execute the code to cause the UE to:
- receive, prior to transitioning out of a radio resource control connected state, one or more downlink messages that collectively indicate a plurality of configured grant small data transmission configurations and a configuration for a bandwidth part for configured grant small data transmissions;
- transition out of the radio resource control connected state based at least in part on receiving at least one of the one or more downlink messages; and
- transmit an initial configured grant small data transmission that includes at least one common control channel message over resources associated with one or more of the plurality of configured grant small data transmission configurations.

2. The UE of claim 1, wherein the one or more processors are individually or collectively further operable to execute the code to cause the UE to:
- transmit a UE capability message indicating support for multiple configured grant small data transmission configurations before transitioning out of the radio resource control connected state, wherein receiving the one or more downlink messages is based at least in part on transmitting the UE capability message.

3. The UE of claim 1, wherein, to receive the one or more downlink messages, the one or more processors are individually or collectively operable to execute the code to cause the UE to:
- receive a radio resource control release message comprising an indication to initiate a small data transmission associated with the plurality of configured grant small data transmission configurations and a suspension configuration.

4. The UE of claim 1, wherein, to receive the one or more downlink messages, the one or more processors are individually or collectively operable to execute the code to cause the UE to:
- receive multiple radio resource control messages, wherein each radio resource control message of the multiple radio resource control messages comprises a respective configured grant small data transmission configuration of the plurality of configured grant small data transmission configurations, and wherein a last of the multiple radio resource control messages comprises a radio resource control release message.

5. The UE of claim 1, wherein, to receive the one or more downlink messages, the one or more processors are individually or collectively operable to execute the code to cause the UE to:
- receive a first radio resource control message comprising a configured grant small data transmission configuration from the plurality of configured grant small data transmission configurations and also comprising a radio resource control release message; and
- receive one or more additional radio resource control messages comprising each remaining configured grant small data transmission configuration from the plurality of configured grant small data transmission configurations after a user equipment (UE) transitions out of the radio resource control connected state.

6. The UE of claim 1, wherein, to transmit the initial configured grant small data transmission that includes the at least one common control channel message, the one or more processors are individually or collectively operable to execute the code to cause the UE to:
- transmit an indication of one or more small data transmission bearers, UE assistance information for a configured grant, a buffer status report, a power head room report, a measurements report, a request for on-demand delivery of system information or modified system information, a request for on-demand transmission of downlink reference signals, a request for a paging restriction, an access stratum security token exchange, an access stratum security verification, or a combination thereof, to be used for transmission of a remainder of the configured grant small data transmissions.

7. The UE of claim 1, wherein the one or more processors are individually or collectively further operable to execute the code to cause the UE to:
- monitor for a response to the initial configured grant small data transmission.

8. The UE of claim 1, wherein the one or more processors are individually or collectively further operable to execute the code to cause the UE to:
- receive a configuration for control resource sets and search space sets for use in monitoring a physical downlink control channel on the bandwidth part;
- receive an indication to reduce an occurrence of radio resource measurements associated with radio resource management; and
- receive configurations for one or more of downlink reference signals, downlink small data via unicast or multicast, paging early indications, or discontinuous reception.

9. The UE of claim 1, wherein, to transmit the initial configured grant small data transmission, the one or more processors are individually or collectively further operable to execute the code to cause the UE to:
- determine that respective resources associated with two or more of the plurality of configured grant small data transmission configurations are associated with the bandwidth part and overlap for transmission of the initial configured grant small data transmission; and
- transmit a plurality of initial configured grant small data transmissions on the respective resources corresponding to the two or more of the plurality of configured grant small data transmission configurations, each of the plurality of initial configured grant small data transmissions being associated with a same uplink hybrid automatic repeat request process.

10. The UE of claim 1, wherein, to transmit the initial configured grant small data transmission, the one or more processors are individually or collectively further operable to execute the code to cause the UE to:

determine that respective resources associated with two or more of the plurality of configured grant small data transmission configurations overlap for transmission of the initial configured grant small data transmission; and transmit the initial configured grant small data transmission on only one of the respective resources corresponding to the two or more of the plurality of configured grant small data transmission configurations, the initial configured grant small data transmission being associated with a first uplink hybrid automatic repeat request process.

11. The UE of claim 1, wherein, to transmit the initial configured grant small data transmission, the one or more processors are individually or collectively further operable to execute the code to cause the UE to:

determine that respective resources associated with the plurality of configured grant small data transmission configurations do not overlap for transmission of the initial configured grant small data transmission;

transmit the initial configured grant small data transmission over resources associated with a first configured grant small data transmission configuration of the plurality of configured grant small data transmission configurations;

receive an acknowledgment feedback message in response to transmitting the initial configured grant small data transmission; and transmit a second initial configured grant small data transmission without a common control channel message over resources associated with a second configured grant small data transmission configuration of the plurality of configured grant small data transmission configurations based at least in part on receiving the acknowledgment feedback message.

12. The UE of claim 1, wherein, to transmit the initial configured grant small data transmission, the one or more processors are individually or collectively further operable to execute the code to cause the UE to:

determine that respective resources associated with the plurality of configured grant small data transmission configurations do not overlap for transmission of the initial configured grant small data transmission;

transmit the initial configured grant small data transmission over resources associated with a first configured grant small data transmission configuration of the plurality of configured grant small data transmission configurations;

fail to receive an acknowledgment feedback message in response to transmitting the initial configured grant small data transmission; and transmit a second initial configured grant small data transmission with a second common control channel message over resources associated with a second configured grant small data transmission configuration of the plurality of configured grant small data transmission configurations based at least in part on failing to receive the acknowledgment feedback message.

13. The UE of claim 1, wherein, to transmit the initial configured grant small data transmission, the one or more processors are individually or collectively further operable to execute the code to cause the UE to:

determine that respective resources associated with the plurality of configured grant small data transmission configurations do not overlap for transmission of the initial configured grant small data transmission;

transmit the initial configured grant small data transmission over resources associated with a first configured grant small data transmission configuration of the plurality of configured grant small data transmission configurations; and transmit a second initial configured grant small data transmission that includes a second common control channel message over resources associated with a second configured grant small data transmission configuration of the plurality of configured grant small data transmission configurations.

14. The UE of claim 1, wherein the one or more processors are individually or collectively further operable to execute the code to cause the UE to:

trigger only a single hybrid automatic repeat request processes associated with transmission of the initial configured grant small data transmission, even if different hybrid automatic repeat request processes are associated with the plurality of configured grant small data transmission configurations.

15. The UE of claim 1, wherein the one or more processors are individually or collectively further operable to execute the code to cause the UE to:

receive an acknowledgment message for the initial configured grant small data transmission; and transmit additional configured grant small data transmissions after receiving the acknowledgment message.

16. The UE of claim 1, wherein the one or more processors are individually or collectively further operable to execute the code to cause the UE to:

retransmit the initial configured grant small data transmission based at least in part on not receiving a feedback message during a radio resource control configured window associated with the initial configured grant small data transmission, the feedback message comprising either an acknowledgment message associated with the initial configured grant small data transmission or a dynamic retransmission grant.

17. The UE of claim 16, wherein, to retransmit the initial configured grant small data transmission, the one or more processors are individually or collectively further operable to execute the code to cause the UE to:

retransmit the initial configured grant small data transmission over a next available and valid resources associated with the plurality of configured grant small data transmission configurations based at least in part on each of the plurality of configured grant small data transmission configurations being associated with a same small data transmission bearer.

18. The UE of claim 1, wherein the plurality of configured grant small data transmission configurations is associated with different small data transmission bearers.

19. The UE of claim 1, wherein, to transition out of the radio resource control connected state, the one or more processors are individually or collectively further operable to execute the code to cause the UE to:

transition into a radio resource control inactive state or a radio resource control idle state.

20. The UE of claim 1, wherein the at least one common control channel message indicates a radio resource control resume request message.

21. A method for wireless communications at a user equipment (UE) comprising:

receiving, prior to transitioning out of a radio resource control connected state, one or more downlink messages that collectively indicate a plurality of configured grant small data transmission configurations and a configuration for a bandwidth part for configured grant small data transmissions;

transitioning out of the radio resource control connected state based at least in part on receiving at least one of the one or more downlink messages; and transmitting an initial configured grant small data transmission that includes at least one common control channel message over resources associated with one or more of the plurality of configured grant small data transmission configurations.

22. The method of claim 21, further comprising:

transmitting a UE capability message indicating support for multiple configured grant small data transmission configurations before transitioning out of the radio resource control connected state, wherein receiving the one or more downlink messages is based at least in part on transmitting the UE capability message.

23. The method of claim 21, wherein receiving the one or more downlink messages further comprises:

receiving a radio resource control release message comprising an indication to initiate a small data transmission associated with the plurality of configured grant small data transmission configurations and a suspension configuration.

24. The method of claim 21, wherein receiving the one or more downlink messages further comprises:

receiving multiple radio resource control messages, wherein each radio resource control message of the multiple radio resource control messages comprises a respective configured grant small data transmission configuration of the plurality of configured grant small data transmission configurations, and wherein a last of the multiple radio resource control messages comprises a radio resource control release message.

25. The method of claim 21, wherein receiving the one or more downlink messages further comprises:

receiving a first radio resource control message comprising a configured grant small data transmission configuration from the plurality of configured grant small data transmission configurations and also comprising a radio resource control release message; and receiving one or more additional radio resource control messages comprising each remaining configured grant small data transmission configuration from the plurality of configured grant small data transmission configurations after the UE transitions out of the radio resource control connected state.

26. The method of claim 21, wherein transmitting the initial configured grant small data transmission that includes the at least one common control channel message further comprises:

transmitting an indication of one or more small data transmission bearers, UE assistance information for a configured grant, a buffer status report, a power head room report, a measurements report, a request for on-demand delivery of system information or modified system information, a request for on-demand transmission of downlink reference signals, a request for a paging restriction, an access stratum security token exchange, an access stratum security verification, or a combination thereof, to be used for transmission of a remainder of the configured grant small data transmissions.

27. The method of claim 21, further comprising:

monitoring for a response to the initial configured grant small data transmission.

28. The method of claim 21, further comprising:

receiving a configuration for control resource sets and search space sets for use in monitoring a physical downlink control channel on the bandwidth part;

receiving an indication to reduce an occurrence of radio resource measurements associated with radio resource management; and receiving configurations for one or more of downlink reference signals, downlink small data via unicast or multicast, paging early indications, or discontinuous reception.

29. A network entity for wireless communication, comprising:

one or more memories storing processor-executable code; and one or more processors coupled with the one or more memories and individually or collectively operable to execute the code to cause the network entity to:

transmit, to a user equipment (UE) prior to the UE transitioning out of a radio resource control connected state, one or more downlink messages that collectively indicate a plurality of configured grant small data transmission configurations and a configuration for a bandwidth part for configured grant small data transmissions; and monitor for an initial configured grant small data transmission that includes at least one common control channel message transmitted over resources associated with one or more of the plurality of configured grant small data transmission configurations.

30. A method for wireless communications at a network entity comprising:

transmitting, to a user equipment (UE) prior to the UE transitioning out of a radio resource control connected state, one or more downlink messages that collectively indicate a plurality of configured grant small data transmission configurations and a configuration for a bandwidth part for configured grant small data transmissions; and monitoring for an initial configured grant small data transmission that includes at least one common control channel message transmitted over resources associated with one or more of the plurality of configured grant small data transmission configurations.

* * * * *